(12) United States Patent
Northcutt et al.

(10) Patent No.: US 7,702,925 B2
(45) Date of Patent: Apr. 20, 2010

(54) METHOD AND APPARATUS FOR CONTENT PROTECTION IN A PERSONAL DIGITAL NETWORK ENVIRONMENT

(75) Inventors: J. Duane Northcutt, Menlo Park, CA (US); Seung Ho Hwang, Palo Alto, CA (US); James D. Lyle, Santa Clara, CA (US); James G. Hanko, Redwood City, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 11/803,051

(22) Filed: May 11, 2007

(65) Prior Publication Data

US 2007/0220279 A1 Sep. 20, 2007

Related U.S. Application Data

(63) Continuation of application No. 10/968,741, filed on Oct. 19, 2004, now abandoned, which is a continuation-in-part of application No. 10/679,055, filed on Oct. 3, 2003, now Pat. No. 7,502,470.

(60) Provisional application No. 60/439,903, filed on Jan. 13, 2003.

(51) Int. Cl.
*G06F 21/00* (2006.01)

(52) U.S. Cl. .......................... 713/193; 705/59

(58) Field of Classification Search ............. 713/150, 713/156, 164, 168, 170, 171, 189, 193; 380/200, 380/210–212, 239, 255

See application file for complete search history.

(56) References Cited

U.S. PATENT DOCUMENTS 6,389,538 B1 5/2002 Gruse et al.

(Continued)

OTHER PUBLICATIONS

*High-Bandwidth Digital Content Protection System*, Revision 1.0, by Intel Corporation, Feb. 17, 2000, pp. 1-60.

(Continued)

*Primary Examiner*—Gilberto Barron, Jr.
*Assistant Examiner*—Abdulhakim Nobahar
(74) *Attorney, Agent, or Firm*—Blakely, Sokoloff, Taylor & Zafman, LLP

(57) ABSTRACT

In some embodiments, the invention is a personal digital network ("PDN") including hardware (sometimes referred to as Ingress circuitry) configured to transcrypt encrypted content that enters the PDN. Typically, the transcryption (decryption followed by re-encryption) is performed in hardware within the Ingress circuitry and the re-encryption occurs before the decrypted content is accessible by hardware or software external to the Ingress circuitry. Typically, transcrypted content that leaves the Ingress circuitry remains in re-encrypted form within the PDN whenever it is transferred between integrated circuits or is otherwise easily accessible by software, until it is decrypted within hardware (sometimes referred to as Egress circuitry) for display or playback or output from the PDN. Typically, the PDN is implemented so that no secret in Ingress or Egress circuitry (for use or transfer by the Ingress or Egress circuitry) is accessible in unencrypted form to software or firmware within the PDN or to any entity external to the PDN. Other aspects of the invention are methods for protecting content in a PDN (e.g., an open computing system) and devices (e.g., multimedia graphics cards, set top boxes, or video processors) for use in a PDN.

16 Claims, 17 Drawing Sheets

U.S. PATENT DOCUMENTS

| | | | |
|---|---|---|---|
| 6,574,609 | B1 | 6/2003 | Downs et al. |
| 6,834,110 | B1 | 12/2004 | Marconcini et al. ......... 380/239 |
| 6,904,522 | B1* | 6/2005 | Benardeau et al. .......... 713/156 |
| 7,046,805 | B2* | 5/2006 | Fitzhardinge et al. ....... 380/212 |
| 7,055,038 | B2 | 5/2006 | Porter et al. |
| 2002/0095574 | A1* | 7/2002 | Kori ........................... 713/170 |
| 2002/0136406 | A1* | 9/2002 | Fitzhardinge et al. ....... 380/210 |
| 2002/0150248 | A1* | 10/2002 | Kovacevic .................. 380/210 |
| 2003/0145336 | A1 | 7/2003 | Matsuzaki et al. |
| 2003/0156218 | A1 | 8/2003 | Laksono |
| 2003/0236978 | A1 | 12/2003 | Evans et al. ................. 713/164 |
| 2004/0064694 | A1 | 4/2004 | Lee et al. |

OTHER PUBLICATIONS

*High-Bandwith Digital Content Protection System Revision 1.0 Erratum*, by Intel Corporation, Mar. 19, 2001, pp. 1-9.

*Upstream Link for High-bandwidth Digital Content Protection*, Revision 1.00, by Intel Corporation, Jan. 26, 2001, pp. 1-38.

APT Technologies, Inc., et al., "*Serial ATA: High Speed Serialized AT Attachment*", Revision 1.0, Aug. 29, 2001, pp. 1-306.

HDMI Licensing, LLC, "HDMI Download 1.0 Spec Adopter Agreement", p. 1, downloaded from the Internet on Dec. 24, 2002 from http://www/hdmi.com/download/download.asp.

HDMI Licensing, LLC, "*HDMI Founders Hitachi, Matsushita (Panasonic), Philips, Silicon Image, Sony, Thomson and Toshiba Release Final HDMI 1.0 Specification Admid Broad Industry Support*", pp. 1-2, downloaded from the Internet on Dec. 24, 2002 from http://www/hdmi.com/press/release_120909.asp.

KR PTO, "OA Mailed Jul. 30, 2008 for KR Patent Application 10-2007-7007140", (Jul. 30, 2008), Whole Document.

"PCT Search Report", International Search Report and Written Opinion; Application No. PCT/US05/37178; mailed Dec. 13, 2006; 12 pages.

CN PTO, "Office Action", CN PTO First Office Action mailed Jul. 4, 2008; CN Application No. 200580035237.2; 14 pages.

KR PTO, "Office Action", Korean Patent Application No. 10-2007-7007140; OA mailed Feb. 2, 2009; 6 pages.

"FOA Mailed Mar. 7, 2008 for U.S. Appl. No. 10/679,055", (Mar. 7, 2008), Whole Document.

"OA Mailed Apr. 5, 2007 for U.S. Appl. No. 10/679,055".

"IBM Response to DVB-CPT Call for Proposals for Content Protection & Copy Management", *xCP Cluster Protocol*, (Oct. 19, 2001), Whole Document.

\* cited by examiner

METHOD AND APPARATUS FOR CONTENT PROTECTION IN A PERSONAL DIGITAL NETWORK ENVIRONMENT

CROSS-REFERENCE TO RELATED APPLICATION

This application is a continuation of U.S. patent application Ser. No. 10/968,741, filed Oct. 19, 2004 now abandoned entitled "Method and Apparatus for Content Protection in a Personal Digital Network."

U.S. patent application Ser. No. 10/968,741, filed Oct. 19, 2004 entitled "Method and Apparatus for Content Protection in a Personal Digital Network" is a continuation-in-part of U.S. patent application Ser. No. 10/679,005, filed Oct. 3, 2003 entitled "Method and Apparatus for Content Protection within an Open Architecture System," now U.S. Pat. No. 7,502,470 which claims the benefit of U.S. Provisional Application No. 60/439,903, filed Jan. 13, 2003, entitled "Method and Apparatus for Content Protection Within an Open Architecture System."

TECHNICAL FIELD OF THE INVENTION

The invention pertains to methods and apparatus for content protection in a personal digital network ("PDN") environment. An example of a PDN is a network installed in a user's home that includes digital video (and audio) storage, playback, and processing devices and a personal computer for communicating with or controlling the devices. In accordance with the invention, encrypted content (e.g., high-definition digital video) that enters a PDN is transcrypted (decrypted and re-encrypted) securely in hardware (unless the content is already encrypted in the desired format upon entering the PDN). The content then remains in this transcrypted form within the PDN (e.g., whenever it is transferred between integrated circuits or is otherwise easily accessible by software or by an unauthorized entity) until it is again decrypted securely in hardware (and optionally undergoes additional processing in the hardware) for rendering (i.e., display and/or playback) for use outside of the PDN. In typical embodiments, no secret (e.g., key data or certificate) used for the transcryption of received content or decryption of encrypted content is accessible (in plain text form) by software either within or outside the PDN. This explicitly excludes access to the secret information by any form of software within the components of the PDN.

BACKGROUND OF THE INVENTION

The expression "use restriction set" (or "Use Restriction Set") herein denotes the set of all use restrictions to which content (of a specific type) is subject. The use restriction set for specific content can include any number of use restrictions (e.g., one use restriction or many use restrictions). For example, a use restriction set for video and audio data that define a movie could prohibit transmission of the data outside a specified location (e.g., a single device or network) without proscribing any use of the data within the location. For another example, a use restriction set for video and audio data that define a movie could prohibit all uses of the data except for a single viewing of the movie (a single viewing of the video data and playback of the corresponding audio data) at a specified location (e.g., a single viewing and playback by a specific device or a device set of specified type, or a single viewing and playback by any device of a specified network).

The invention pertains to methods and apparatus for content protection in a personal digital network environment, where "personal digital network environment" ("PDNE") denotes the environment defined by a "personal digital network." The expression "personal digital network" ("PDN") herein denotes a network (of components, each comprised of some combination of hardware and optionally also software or firmware) capable of receiving content (e.g., digital image data, video data, or audio data) subject to a Use Restriction Set and configured to use the content in at least one way (and optionally, in many or all ways) not forbidden by the Use Restriction Set. An example of a PDN is a network installed in the network user's home, which includes digital video (and audio) storage, rendering (i.e., display or playback), and processing devices, and a personal computer (or other computing system having open architecture) that is capable of communicating with or controlling such devices. An example of a simple PDN is a computing system having open architecture (e.g., a personal computer with peripheral devices) that is configured to receive encrypted video and audio content (e.g., by reading the content from a high definition DVD or other disc) and to display a video portion of the content and play back an audio portion of the content. The content entering a PDNE can but need not be video or audio data, and can be or include data indicative of any information that can be stored digitally (such as but not limited to pictures, text, games, financial records, and personal information).

A PDN can (but need not) be or include a home entertainment network. For example, a PDN could be implemented in a business environment or elsewhere, to protect financial data or other content that is neither digital video nor digital audio.

While a PDN may include a personal computer, one is not required. For example, a PDN can be a collection of devices that are not personal computers but are essentially peer-level consumer appliances (e.g., audio/video receivers, disc players, and/or recording/playback units), and the network management functions can be distributed among such devices without the need for a centralized master controller. Distribution of network management functions is often desirable, such as (for example) in cases in which it will be necessary or desirable to perform essential network management functions from any device (or any of many devices) of a PDN.

Computing systems having open architecture (sometimes referred to herein as "open architecture systems" or "open systems") are computing systems configured to allow end users to add or remove hardware components and/or software modules conveniently. It should be noted that consumer appliances can share design and implementation features with a personal computer, with the distinction between the two classes of devices being defined by their user-visible interfaces and functionality.

The expression "audiovisual subsystem" (or "audiovisual system") is sometimes used herein to denote a system or device capable of displaying images in response to video data and/or emitting sound in response to audio data. Audiovisual subsystems are commonly coupled to a PDN by some form of serial link. Examples of audiovisual systems include: an HDTV monitor (including an HDMI receiver capable of decrypting HDCP-encrypted video and audio data received over an HDMI link), loudspeakers, a Digital Video Recorder (DVR), and an audio/video processor.

In typical embodiments of the invention, content that enters a PDN can be used within the PDN in any way that does not conflict with the restrictions placed on it by the owner (or licensor) of the intellectual property that pertains to the content (e.g., in any way that does not violate the terms of agreement under which the content was legally acquired by the user or owner of the PDN). For example, a PDN might be capable of receiving a satellite transmission of encrypted video and audio data that define a movie, and the Use Restriction Set for the data might prohibit all uses of the data except for decryption of the data, and any number of viewings of the movie (i.e., any number of playbacks of the video data and/or the corresponding audio data) by any device or devices of the PDN within a specified period (e.g., a specific day or week) or any number of viewings of the movie (by any device or devices of the PDN) up to a maximum allowable number of viewings. Preferred embodiments of the invention permit content that enters a PDNE to be decrypted, copied, stored, displayed and/or played back by devices of the PDN, and transmitted between devices of the PDN, provided that the Use Restriction Set for the content does not proscribe such uses.

In accordance with typical embodiments of the invention, the Use Restriction Set for content received by a PDN is indicated by data (sometimes referred to herein as "rights data" or "permitted use data" or a "permitted use flag") that is associated with the content on entry into the PDNE, and this association is securely maintained throughout the content's existence within the PDNE in accordance with a basic set of rules that map to the Use Restriction Set.

The expression "transcryption" of encrypted data (data encrypted in accordance with a first protocol) herein denotes decryption of the encrypted data followed by re-encryption of the decrypted data in accordance with a second protocol, all performed within a physically secure device or system (e.g., a physically secure subsystem of a PDN) so that the data are never accessible outside the device in unencrypted form. The second protocol is typically different than the first protocol but could be the same as the first protocol (e.g., if different keys are used to perform the re-encryption than were used to perform the original encryption). Transcryption is performed, in accordance with the invention, whenever encrypted content enters a PDNE from another domain (e.g., from a secure transport domain such as a cable or satellite delivery system, or from a DVD-like disc distribution mechanism), unless the content is already encrypted in a desired format upon entering the PDNE.

Modern Personal Computers (PCs) have evolved from strictly computing devices into communication and entertainment devices. As a result, users expect to be able to view prerecorded video entertainment, including feature length movies, on their PC. In addition, the increased performance of processors makes it appear advantageous to use software on a PC's processor to, for example, decode and play DVD movies. However, the owners of entertainment intellectual property (e.g., copyrights in movies) rightly are concerned about unauthorized use and copying of their property when the relevant content enters such a PC.

It is contemplated that consumers of content will assemble PDNs (each of which could include, but often will not include, at least one PC), and that content providers will provide content to PDNs with the understanding that content entering each PDN will be used within the PDN in any way that is not proscribed by the owner (or licensor) of the intellectual property in the content. However, the owners of such intellectual property rightly are concerned about unauthorized use and copying of their property when the relevant content enters a PDN. This is because the open-systems nature of the PC makes it trivial to take highly valuable content (such as music or films) and distribute copies to untold millions of users who do not have the permission of the owner(s) of the relevant, highly valuable intellectual property to access this content.

Unfortunately, due to the very nature of software decode (in either open or closed system device implementations), content cannot be effectively protected in a conventional PDNE that employs software to decrypt content. At some point during the software decode process, both the keys and the decrypted content (e.g., plaintext video and audio data) are available within the registers and/or memory of the device, and therefore unauthorized copies of the keys or content can made and distributed without permission of the owner(s) of the relevant intellectual property.

If high quality copies of movies or other works can be made and distributed widely, e.g. via the Internet, then the intellectual property in such content quickly loses its value to the owner. In order to protect some such content, the Content Scrambling System (CSS) was created to encrypt video content for DVDs. CSS is a cryptographic scrambling mechanism used on top of an MPEG compressed version of the original, raw video data. Each device that can play DVD content must have one or more cryptographic keys that allow the content to be descrambled (i.e. decrypted).

A closed system (e.g., a standalone DVD player or other standalone consumer electronic gear) can provide considerable content protection if it is configured so that keys and decrypted content stay within the closed system. If both the keys and decrypted content stay within the closed system, there is no simple method for "cracking" the content protection method. A "closed" system (e.g., a standalone DVD player) does not provide a way for a user to add or remove hardware or software. Thus, it is relatively simple to ensure that keys are stored and used within the closed system in a way that does not reveal them outside the closed system. It is worth noting that even an intended closed system can suffer from the same vulnerabilities as an open system. For example, if a cable or satellite Set Top Box (STB) is implemented using an architecture similar to that of a PC, where software handles the secret keys, it is possible for the software to be modified so that this secret material is compromised.

However, protection of content within a closed system presents other problems. For example, how are keys and content delivered securely to a closed system? If both keys and content follow the same path, then there is an inherent unidirectional information flow to a closed system that precludes use of good authentication methods. An important aspect of preferred embodiments of the present invention is that such embodiments allow (but do not require) keys and content to follow different paths within a PDN and even within a content-handling integrated circuit (e.g., an integrated circuit embodiment of the inventive Ingress or Egress Node) within a PDN. These embodiments of the invention can make key distribution and management much more secure than it is in either conventional closed or open systems by ensuring that secret keying material is never directly visible to software. This is due to the fact that integrated circuits provide a much higher degree of security than is achievable in software implementations, owning to the physical security inherent in their packaging, the much larger investment in rare and expensive equipment needed to extract information from them, and the measures that can be taken to protect secret information. In addition, this approach is more secure because it enables the implementation of better methods to verify that a device (e.g., a closed subsystem of a PDN) is properly licensed and allowed to use content (subject to a Use Restriction Set for the content). The present invention improves the current state of the art for content protection in both closed and open systems.

Current standard definition DVD content can be decoded in software on PCs which are open systems rather than closed systems. At some point during the software decode process, both the CSS keys and the decrypted video content are available within the registers and/or memory of the PC. Since, in a PC, a user can either intentionally or unintentionally load malicious programs or drivers, and such modules can gain access to the keys and/or content, the CSS protection is easily circumvented. In fact, two widely published attacks have been made. First, the CSS key for the Xing software decoder was found by reverse engineering the software module, and this key was traded among hackers. In addition, a CSS decryption program called DeCSS was created and distributed.

So far, the economic damage of these breaches of the content protection system has been limited because the image quality of standard definition video is much lower than theatrical quality. That is, much of the intrinsic value of the original movie is lost in the conversion from the higher definition original to standard TV definition. In addition, until recently it has been impractical to transfer large files, like decrypted movies, between users.

Today, High Definition TV (HDTV) is becoming more popular, and is expected to supplant standard definition TV in a few years. In order to provide consumers with prerecorded material of sufficient quality, HDTV DVDs (HD-DVDs) are being designed. As in the case of standard DVD players, standalone players for HD-DVDs with something similar to CSS should provide strong content protection.

However, decoding content (e.g., HD-DVD content) within a conventional open system or other conventional PDN creates a vulnerability. This vulnerability is often referred to as the "software hole" in content protection systems. The essence of "software hole" vulnerability is that if software within an open system (or other element of a PDN) manipulates either unencrypted keys or plaintext content, the keys or content are easily revealed for unauthorized uses. For example, if an open computing system programmed with software is employed to decrypt content, both the keys and the decryption program must be visible to the processor and, therefore, visible to other, potentially malicious, software that is loaded within the system. The software hole is a serious problem because, if unauthorized copies of binary data (indicative of audiovisual content) can be made, the copies will allow display and playback of the content with essentially the same quality as the original theatrical release. In addition, modern network technology will easily enable a Napster-like trading of copies of movies. As a result, the owner of the intellectual property will quickly find that the property has become worthless.

When software decryption of standard DVDs was initially deployed, the "software hole" was not completely understood. Keys within decryption software were obscured and thought to be secure. This "security through obscurity" was quickly shown to be illusory when the Xing key was extracted. Since then, much of the effort of the computer industry has gone into secure methods of storing the decryption key (e.g., the Microsoft Palladium Initiative, later renamed as the Next Generation Secure Computing Base). However, although this would make stealing the keys more challenging, it does not substantially improve security of the keys and does nothing to protect the content. Note that if the authorized player can obtain the key without manual intervention (e.g. the user entering a password needed to decrypt the content protection key), then any other program using the same procedure or algorithm can also obtain the key. If such a program was written in a malicious manner, the key could, for example, be sent over the Internet to millions of others in a few seconds. Similarly, since a software decoder requires that the key and decryption process or algorithm be visible to the processor, it can be observed and emulated by the attacker, resulting in unauthorized decryption of the content.

Above-referenced U.S. patent application Ser. No. 10/679,055 describes methods and apparatus for avoiding the software hole problem (in an open system) by protecting both content and keys a closed subsystem within the open system, where "closed subsystem" denotes a subsystem (e.g., a single integrated circuit) that does not provide users a convenient way to add hardware or software thereto or remove hardware or software therefrom. U.S. patent application Ser. No. 10/679,055 teaches that the closed subsystem should be designed to prevent key data (used by the closed subsystem) and unencrypted content in the closed subsystem from being disclosed outside the closed subsystem.

The closed subsystem of U.S. patent application Ser. No. 10/679,055 could be referred to as being "embedded" in an open system, and is typically configured to generate the protected content by decrypting incoming content in hardware to generate raw content and then re-encrypting the raw content using a different content protection protocol (also in hardware, and in the same chip in which the raw content is generated) without revealing the raw content to any element of the open system outside the closed subsystem. Neither the raw content nor key data used for generating or re-encrypting the raw content is revealed to any element of the open system outside the closed subsystem. The closed subsystem can be configured to assert the re-encrypted content directly to an external system (a system external to the open system). The external system can include a cryptographic device, and the closed subsystem can be configured to disclose key data to the cryptographic device (e.g., as part of a verification operation) as necessary to enable the cryptographic device to decrypt the re-encrypted content. Alternatively, the re-encrypted content is asserted from the closed subsystem through at least one other element of the open system to an external system (e.g., the re-encrypted content is "tunneled" through the open system to the external system).

The trend in the industry for sending video content to display devices is to deliver the content in digital form over serial links.

Various serial links for transmitting encrypted or non-encrypted data are well known. One conventional serial link, used primarily in consumer electronics (e.g., for high-speed transmission of video data from a set-top box to a television set) or for high-speed transmission of video data from a host processor (e.g., a personal computer) to a monitor, is known as a transition minimized differential signaling interface ("TMDS" link). The characteristics of a TMDS link include the following:

1. video data are encoded and then transmitted as encoded words (each 8-bit word of digital video data is converted to an encoded 10-bit word before transmission);

a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);

b. the encoding of video data is performed such that the in-band words are transition minimized (a sequence of in-band words has a reduced or minimized number of transitions);

c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);

2. the encoded video data and a video clock signal are transmitted as differential signals (the video clock and encoded video data are transmitted as differential signals over conductor pairs);

3. three conductor pairs are employed to transmit the encoded video, and a fourth conductor pair is employed to transmit the video clock signal; and 4. signal transmission occurs in one direction, from a transmitter (typically associated with a desktop or portable computer, or other host) to a receiver (typically an element of a monitor or other display device).

A use of the TMDS serial link is the "Digital Visual Interface" interface ("DVI" link) adopted by the Digital Display Working Group. A DVI link can be implemented to include two TMDS links (which share a common conductor pair for transmitting a video clock signal) or one TMDS link, as well as additional control lines between the transmitter and receiver. A DVI link includes a transmitter, a receiver, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor.

Another serial link is the "High Definition Multimedia Interface" interface (sometimes referred to as an "HDMI" link or interface) developed Silicon Image, Inc., Matsushita Electric, Royal Philips Electronics, Sony Corporation, Thomson Multimedia, Toshiba Corporation, and Hitachi.

It is common practice today to use the cryptographic protocol known as the "High-bandwidth Digital Content Protection" ("HDCP") protocol to encrypt digital video to be transmitted over a DVI or HDMI link and to decrypt the data at the DVI (or HDMI) receiver. The HDCP protocol is described in the document "High-bandwidth Digital Content Protection System," Revision 1.0, dated Feb. 17, 2000, by Intel Corporation, and the document "High-bandwidth Digital Content Protection System Revision 1.0 Erratum," dated Mar. 19, 2001, by Intel Corporation. The full text of both of these documents is incorporated herein by reference.

A DVI-compliant (or HDMI-compliant) transmitter implementing the HDCP protocol asserts a stream of pseudo-randomly generated 24-bit words, known as cout[23:0], during each active period (i.e. when DE is high). In a DVI-compliant system, each active period is an active video period. In an HDMI-compliant system, each active period is a period in which video, audio, or other data are transmitted. Each 24-bit word of the cout data is "Exclusive Or'ed" (in logic circuitry in the transmitter) with a 24-bit word of RGB video data input to the transmitter, in order to encrypt the video data. The encrypted data are then encoded (according to the TMDS standard) for transmission. The same sequence of cout words is also generated in the receiver. After the encoded and encrypted data received at the receiver undergo TMDS decoding, the cout data are processed together with the decoded video in logic circuitry in order to decrypt the decoded data and recover the original input video data.

Before the transmitter begins to transmit HDCP encrypted, encoded video data, the transmitter and receiver communicate bidirectionally with each other to execute an authentication protocol (to verify that the receiver is authorized to receive protected content, and to establish shared secret values for use in encryption of input data and decryption of transmitted encrypted data). More specifically, each of the transmitter and the receiver is preprogrammed (e.g., at the factory) with a 40-bit word known as a key selection vector, and an array of forty 56-bit private keys. To initiate the first part of an authentication exchange between the transmitter and receiver, the transmitter asserts its key selection vector (known as "AKSV"), and a pseudo-randomly generated session value ("An") to the receiver. In response, the receiver sends its key selection vector (known as "BKSV") and a repeater bit (indicating whether the receiver is a repeater) to the transmitter, and the receiver also implements a predetermined algorithm using "AKSV" and the receiver's array of forty private keys to calculate a secret value ("Km"). In response to the value "BKSV" from the receiver, the transmitter implements the same algorithm using the value "BKSV" and the transmitter's array of forty private keys to calculate the same secret value ("Km") as does the receiver.

Each of the transmitter and the receiver then uses the shared value "Km," the session value "An," and the repeater bit to calculate a shared secret value (the session key "Ks"), a value ("R0") for use in determining whether the authentication is successful, and a value ("M0") for use during a second part of the authentication exchange. The second part of the authentication exchange is performed only if the repeater bit indicates that the receiver is a repeater, to determine whether the status of one or more downstream devices coupled to the repeater requires revocation of the receiver's authentication.

After the first part of the authentication exchange, and (if the second part of the authentication exchange is performed) if the receiver's key selection vector is not revoked as a result of the second part of the authentication exchange, each of the transmitter and the receiver generates a 56-bit frame key Ki (for initiating the encryption or decrypting a frame of video data), an initialization value Mi, and a value Ri used for link integrity verification. The Ki, Mi, and Ri values are generated in response to a control signal (identified as "ctl3" in FIG. 1), which is received at the appropriate circuitry in the transmitter, and is also sent by the transmitter to the receiver, during each vertical blanking period, when DE is low. As shown in the timing diagram of FIG. 1, the control signal "ctl3" is a single high-going pulse. In response to the Ki, Mi, and Ri values, each of the transmitter and receiver generates a sequence of pseudo-randomly generated 24-bit words cout [23:0]. Each 24-bit word of the cout data generated by the transmitter is "Exclusive Or'ed" (in logic circuitry in the transmitter) with a 24-bit word of a frame of video data (to encrypt the video data). Each 24-bit word of the cout data generated by the receiver is "Exclusive Or'ed" (in logic circuitry in the receiver) with a 24-bit word of the first received frame of encrypted video data (to decrypt this encrypted video data). The 24-bit words cout[23:0] generated by the transmitter are content encryption keys (for encrypting a line of input video data), and the 24-bit words cout[23:0] generated by the receiver are content decryption keys (for decrypting a received and decoded line of encrypted video data).

During each horizontal blanking interval (in response to each falling edge of the data enable signal DE) following assertion of the control signal ctl3, the transmitter performs a rekeying operation and the receiver performs the same rekeying operation to change (in a predetermined manner) the cout data words to be asserted during the next active video period. This continues until the next vertical blanking period, when the control signal ctl3 is again asserted to cause each of the transmitter and the receiver to calculate a new set of Ki and Mi values (with the index "i" being incremented in response to each assertion of the control signal ctl3). The Ri value is updated once every 128 frames. Actual encryption of input video data or decryption of received, decoded video data (or encryption of input video, audio, or other data, or decryption of received, decoded video, audio, or other data, in the case of an HDMI-compliant system) is performed, using the cout data words generated in response to the latest set of Ks, Ki and Mi values, only when DE is high (not during vertical or horizontal blanking intervals).

Each of the transmitter and receiver includes an HDCP cipher circuit (sometimes referred to herein as an "HDCP cipher") of the type shown in FIG. 2. The HDCP cipher includes linear feedback shift register (LFSR) module 80, block module 81 coupled to the output of LFSR module 80, and output module 82 coupled to an output of block module 81. LFSR module 80 is employed to re-key block module 81 in response to each assertion of an enable signal (the signal "ReKey" shown in FIG. 2), using the session key (Ks) and the current frame key (Ki). Block module 81 generates (and provides to module 80) the key Ks at the start of a session and generates (and applies to module 80) a new value of key Ki at the start of each frame of video data (in response to a rising edge of the control signal "ctl3," which occurs in the first vertical blanking interval of a frame). The signal "ReKey" is asserted to the FIG. 2 circuit at each falling edge of the DE signal (i.e., at the start of each vertical and each horizontal blanking interval), and at the end of a brief initialization period (during which module 81 generates an updated value of the frame key Ki) after each rising edge of signal "ctl3."

Module 80 consists of four linear feedback shift registers (having different lengths) and combining circuitry coupled to the shift registers and configured to assert a single output bit per clock interval to block module 81 during each of a fixed number of clock cycles (e.g., 56 cycles) commencing on each assertion of the signal "ReKey" when DE is low (i.e., in the horizontal blanking interval of each line of video data). This output bit stream is employed by block module 81 to re-key itself just prior to the start of transmission or reception of each line of video data.

Block module 81 comprises two halves, "Round Function K" and "Round Function B," as shown in FIG. 3. Round Function K includes 28-bit registers Kx, Ky, and Kz, seven S-Boxes (each a 4 input bit by 4 output bit S-Box including a look-up table) collectively labeled "S-Box K" in FIG. 3, and linear transformation unit K, connected as shown. Round Function B includes 28-bit registers Bx, By, and Bz, seven S-Boxes (each a 4 input bit by 4 output bit S-Box including a look-up table) collectively labeled "S-Box B" in FIG. 3, and linear transformation unit B, connected as shown. Round Function K and Round Function B are similar in design, but Round Function K performs one round of a block cipher per clock cycle to assert a different pair of 28-bit round keys (Ky and Kz) each clock cycle in response to the output of LFSR module 80, and Round Function B performs one round of a block cipher per clock cycle, in response to each 28-bit round key Ky from Round Function K and the output of LFSR module 80, to assert a different pair of 28-bit round keys (By and Bz) each clock cycle. The transmitter generates value An at the start of the authentication protocol and the receiver responds to it during the authentication procedure. The value An is used to randomize the session key. Block module 81 operates in response to the authentication value (An), and the initialization value (Mi) that is updated by output module 82 at the start of each frame (at each rising edge of the control signal "ctl3").

Each of linear transformation units K and B outputs 56 bits per clock cycle. These output bits are the combined outputs of eight diffusion networks in each transformation unit. Each diffusion network of linear transformation unit K produces seven output bits in response to seven of the current output bits of registers Ky and Kz. Each of four of the diffusion networks of linear transformation unit B produces seven output bits in response to seven of the current output bits of registers By, Bz, and Ky, and each of the four other diffusion networks of linear transformation unit B produces seven output bits in response to seven of the current output bits of registers By and Bz.

In Round Function K, one bit of register Ky takes its input from the bit stream asserted by module 80 when the ReKey signal is asserted. In Round Function B, one bit of register By takes its input from the bit stream asserted by module 80 when the ReKey signal is asserted.

Output module 82 performs a compression operation on the 28-bit keys (By, Bz, Ky and Kz) asserted to it (a total of 112 bits) by module 81 during each clock cycle, to generate one 24-bit block of pseudo-random bits cout[23:0] per clock cycle. Each of the 24 output bits of module 82 consists of the exclusive OR ("XOR") of nine terms as follows: (B0*K0)+ (B1*K1)+(B2*K2)+(B3*K3)+(B4K4)+(B5*K5)+ (B6*K6)+(B7)+(K7), where "*" denotes a logical AND operation and "+" denotes a logical XOR operation.

In the transmitter, logic circuitry 83 (shown in FIG. 2) receives each 24-bit word of cout data and each input 24-bit RGB video data word, and performs a bitwise XOR operation thereon in order to encrypt the video data, thereby generating a word of the "data_encrypted" data indicated in FIG. 2. Typically, the encrypted data subsequently undergoes TMDS encoding before it is transmitted to a receiver. In the receiver, logic circuitry 83 (shown in FIG. 2) receives each 24-bit block of cout data and each recovered 24-bit RGB video data word (after the recovered data has undergone TMDS decoding), and performs a bitwise XOR operation thereon in order to decrypt the recovered video data.

Throughout the specification the expression "TMDS-like link" will be used to denote a serial link capable of transmitting encoded data (e.g., encoded digital video data), and optionally also a clock for the encoded data, from a transmitter to a receiver, and optionally also capable of transmitting (bidirectionally or unidirectionally) one or more additional signals (e.g., encoded digital audio data or other encoded data) between the transmitter and receiver, that is or includes either a TMDS link or a link having some but not all of the characteristics of a TMDS link. Examples of TMDS-like links include links that differ from TMDS links only by encoding data as N-bit code words (where N is not equal to 10, and thus the code words are not 10-bit TMDS code words) and links that differ from TMDS links only by transmitting encoded video over more than three or less than three conductor pairs. Some TMDS-like links encode input video data (and other data) to be transmitted into encoded words comprising more bits than the incoming data using a coding algorithm other than the specific algorithm used in a TMDS link, and transmit the encoded video data as in-band characters and the other encoded data as out-of-band characters (HDMI-compliant systems encode audio data for transmission according to an encoding scheme that differs from the encoding scheme employed for video data). The characters need not be classified as in-band or out-of-band characters based according to whether they satisfy transition minimization and DC balance criteria. Rather, other classification criteria could be used. An example of an encoding algorithm, other than that used in a TMDS link but which could be used in a TMDS-like link, is IBM 8b10b coding. The classification (between in-band and out-of-band characters) need not be based on just a high or low number of transitions. For example, the number of transitions of each of the in-band and out-of-band characters could (in some embodiments) be in a single range (e.g., a middle range defined by a minimum and a maximum number of transitions).

The term "transmitter" is used herein in a broad sense to denote any unit capable of transmitting data over a link and optionally also encoding and/or encrypting the data to be transmitted. The term "receiver" is used herein in a broad sense to denote any unit capable of receiving data that has been transmitted over a link (and optionally also decoding and/or decrypting the received data). Unless otherwise specified, a link can but need not be a TMDS-like link or other serial link. The term transmitter can denote a transceiver that performs the functions of a receiver as well as the functions of a transmitter.

The expression "content key" herein denotes data that can be used by a cryptographic device to encrypt content (e.g., video, audio, or other content), or to denote data that can be used by a cryptographic device to decrypt encrypted content.

The term "key" is used herein to denote a content key, or data that can be used by a cryptographic device to generate or otherwise obtain (in accordance with a content protection protocol) a content key. The expressions "key" and "key data" are used interchangeably herein.

The term "stream" of data as used herein denotes that all the data are of the same type and are transmitted from a source to a destination device. All or some of the data of a "stream" of data together may constitute a single logical entity (e.g., a movie or song, or portion thereof).

The term "HDCP protocol" is used herein in a broad sense to denote both the conventional HDCP protocol and modified HDCP protocols that closely resemble the conventional HDCP protocol but differ therefrom in one or more respects. Some but not all embodiments of the invention implement an HDCP protocol. The conventional HDCP protocol encrypts (or decrypts) data during active video periods but not during blanking intervals between active video periods. An example of a modified HDCP protocol is a content protection protocol that differs from the conventional HDCP protocol only to the extent needed to accomplish decryption of data transmitted between active video periods (as well as decryption of video data transmitted during active video periods) or to accomplish encryption of data to be transmitted between active video periods (as well as encryption of video data to be transmitted during active video periods).

A example of an HDCP protocol that is a modified version of the conventional HDCP protocol is an "upstream" variation on the conventional HDCP protocol (to be referred to as an "upstream" protocol). A version of the upstream protocol is described in the *Upstream Link for High-bandwidth Digital Content Protection*, Revision 1.00, by Intel Corporation, Jan. 26, 2001 (referred to hereinafter as the "Upstream Specification"). In the upstream protocol, the "transmitter" is a processor programmed with software for implementing the upstream protocol to communicate with a graphics controller (with the graphics controller functioning as a "receiver"). Such a processor can send video data to the graphics controller after executing an authentication exchange in accordance with the "upstream" protocol. The processor and graphics controller can be elements of a personal computer configured to send encrypted video data from the graphics controller to a display device. The graphics controller and display device can be configured to execute another encryption protocol (e.g., the above-mentioned conventional HDCP protocol, which can be referred to in this context as the "downstream" HDCP protocol) to allow the graphics controller (this time functioning as a "transmitter") to encrypt video data and send the encrypted video to the display device, and to allow the display device (functioning as a "receiver") to decrypt the encrypted video.

However, in contrast to the present invention, the upstream protocol would not provide adequate protection to raw content that is present in a processor of a personal computer or PDN where the processor is programmed with software for implementing the upstream protocol (with the processor functioning as a "transmitter") to communicate with (and send the raw content to) a graphics controller functioning as a "receiver," to allow the graphics controller (this time functioning as a "transmitter") to encrypt the raw content and transmit the resulting encrypted content (in accordance with the "downstream" HDCP protocol) to a device (e.g., a display device) external to the open system.

There are a number of structural flaws in the upstream protocol, and a personal computer or PDN that implements the upstream protocol would be subject to at least one attack in which the attacker could access the raw content present within the personal computer or PDN. An example of such an attack is a "man-in-the-middle" attack, in which the upstream authentication requests (from the graphics controller) are intercepted and the corresponding responses (to the graphics controller) are forged. A personal computer that implements the upstream protocol is easily attacked for one fundamental reason: at least two of the system elements (the application and the video driver) are in software. They can be debugged, de-compiled, altered, and copied, with any resulting "hack" potentially distributed quickly and easily across the Internet. Thus, the upstream protocol is fundamentally flawed and will allow people of ordinary skills (and with no special hardware or tools) to bypass the intended HDCP protections. Furthermore, this can happen on a large scale, and can not readily be detected or counteracted.

Aspects of the present invention are generalizations of teaching of above-referenced U.S. patent application Ser. No. 10/679,055. These and some other aspects of the present invention are methods and apparatus for protecting content in a PDN, including by avoiding the above-described software hole problem. In accordance with some aspects of the present invention, plaintext content and secrets used to accomplish decryption of the content are protected within hardware (e.g., one or more integrated circuits) in a PDN, and are encrypted whenever present outside such hardware in the PDN.

SUMMARY OF THE INVENTION

In a class of embodiments, the invention is a personal digital network ("PDN") including "Ingress" circuitry (sometimes referred to as an Ingress "unit") configured to transcrypt all digital content (e.g., high-definition digital video or other video data and/or audio data) that enters the PDN (unless the content is already encrypted in a desired format upon entering the PDN). The transcryption (i.e., decryption from the input format followed by re-encryption into the internal PDN format) is performed in a secure manner in hardware within the Ingress circuitry and the re-encryption occurs before the decrypted content is accessible or vulnerable to attack by hardware or software external to the Ingress circuitry. The Ingress circuitry would not perform transcryption on content that is already in a desired encryption format upon entering the PDN (e.g., if the content distribution source uses the same content protection approach that is implemented by the inventive PDN).

The expression "controlled content" is sometimes used herein to denote encrypted content in a class that includes both "transcrypted content" (content that has been generated by transcrypting content in accordance with the invention) and encrypted content in a PDN that has not undergone transcryption in the PDN (e.g., in Ingress circuitry of the PDN) but is in the same encryption format as is transcrypted content generated by circuitry of the PDN (e.g., encrypted content in a PDN that is already in the desired encryption format upon entering the PDN). The expression "PDN encryption format" is used to denote the encryption format of transcrypted content that has been generated by (and output from) Ingress circuitry of a PDN. In operation of typical embodiments of the inventive PDN, Ingress circuitry of the PDN performs transcryption on content to generate transcrypted content having PDN encryption format. In some embodiments of the inventive PDN, Egress circuitry (to be described below) of the PDN performs transcryption on content to generate transcrypted content which can (but need not) have PDN encryption format.

In a class of embodiments, controlled content in a PDN (e.g., transcrypted content generated in Ingress circuitry of the PDN, or encrypted content that is already in PDN encryption format upon entering the PDN) remains in PDN encryption format within the PDN whenever it is transferred between integrated circuits or is otherwise is easily accessible by software or by any other unauthorized entity, until it is decrypted in secure fashion in hardware within "Egress" circuitry (sometimes referred to as an Egress "unit") in the PDN for consumption (e.g., display and/or playback) within the PDN and/or output from the PDN. Optionally, the Egress circuitry not only performs hardware decryption on controlled content to put the content in plaintext form, but also performs additional processing on the plaintext content (which can be compressed data). For example, the Egress circuitry could format and re-encrypt the plaintext content in hardware for consumption within the PDN or output from the PDN (e.g., to an external audiovisual system). For example, the Egress circuitry could convert plaintext content into conventional IEEE 1394 format with DTCP encryption to allow the content to be exported from the PDN to an external recording and playback device. For another example, the Egress circuitry could include MPEG audio and video decompression hardware for generating raw audio and video data from compressed plaintext content, and circuitry for performing HDCP encryption (and additional processing) on the raw audio and video data to generate HDCP-encrypted, HDMI-formatted data that can be transmitted securely to a receiver via an HDMI link. Typically, the inventive PDN is implemented so that no secret present in Ingress or Egress circuitry for use or transfer by the Ingress or Egress circuitry (e.g., key data used in Ingress circuitry for transcryption of content received by the PDN, or in Egress circuitry for decryption of controlled content) is accessible in unencrypted form by software within the PDN or by any entity external to the PDN.

In a class of embodiments, the inventive PDN includes at least one device that includes Lockbox circuitry (sometimes referred to herein as a "Lockbox"). Each such device (to be referred to as a "Node" of the PDN) comprises hardware (and optionally also software or firmware), and can be or include an integrated circuit. A PDN typically includes at least two Nodes (e.g., Nodes that implement video or audio storage, playback, and processing functions). Each Node can (but need not) include one or both of Ingress circuitry and Egress circuitry, as well as Lockbox circuitry. A Node that includes Ingress circuitry (Ingress circuitry is sometimes referred to herein as an Ingress unit) and Lockbox circuitry will be denoted as an "Ingress Node." A Node that includes Egress circuitry (Egress circuitry is sometimes referred to herein as an Egress unit) and Lockbox circuitry will be denoted as an "Egress Node." Each Ingress Node and Egress Node is capable of receiving content (e.g., one or both of digital video data and digital audio data) subject to a Use Restriction Set and is configured to use the content in at least one way (and optionally, in many or all ways) not forbidden by the Use Restriction Set.

In some embodiments of the inventive PDN, the Lockbox within each Node, the Ingress circuitry within each Ingress Node, and the Egress circuitry within each Egress Node is implemented in hardware. In a class of embodiments of the inventive PDN, each Lockbox, the Ingress circuitry within each Ingress Node, and the Egress circuitry within each Egress Node, is implemented as an integrated circuit or multi-chip set (which can include a microprocessor programmed with firmware) but does not include an external CPU programmed with software. In some embodiments, each Node of a PDN that embodies the invention optionally also includes at least one element programmed with firmware or software, subject to the restriction that each Node is configured so that secrets (in unencrypted form) can be manipulated within the Node only in hardware and without revealing any of them to software or firmware in the Node. Encrypted secrets (e.g., secrets that have been encrypted in hardware in a Node in accordance with the invention) can be revealed (in encrypted form) to software or firmware within the Node or to entities outside the Node. Thus, the Ingress circuitry within each Ingress Node, and the Egress circuitry within each Egress Node includes secure hardware and optionally also includes at least one element programmed with firmware or software, but the Ingress circuitry and/or Egress circuitry in each Node is configured to manipulate secrets (in unencrypted form) only in hardware and without revealing any of them (in unencrypted form) to any entity external to the Node or to software or firmware in the Node. The Lockbox within a Node typically includes (but need not include) secure hardware, and can but need not include at least one element programmed with firmware or software (e.g., a Lockbox could be a processor programmed with firmware or software). However, each Node (and each Lockbox within a Node) is configured to manipulate secrets (for use for content protection in a PDN including the Node) only in such a manner that none of the secrets is revealed (in unencrypted form) to any entity external to the Node (or to software or firmware in the Node). A Node (and/or a Lockbox within a Node) can be configured to manipulate secrets (in unencrypted form) in secure hardware if this is accomplished in a manner preventing any of the secrets from being revealed (in unencrypted form) to any entity external to the Node (or to software or firmware in the Node).

Each Ingress unit (in an Ingress Node of a PDN) is configured to decrypt and re-encrypt (in hardware) encrypted content that enters the PDN. Typically, the decryption and re-encryption (i.e., transcryption) is performed in a secure manner in hardware within the Ingress unit and the re-encryption occurs before the decrypted content is accessible or vulnerable to attack by any entity (hardware or software) external to the Ingress unit. The re-encrypted content that leaves the Ingress unit remains in re-encrypted form within the PDN whenever it is transferred between integrated circuits or is otherwise is easily accessible by software or by an unauthorized entity. Each Egress unit (in an Egress Node of a PDN) is configured to decrypt (in hardware) re-encrypted content in secure fashion for display (and/or playback) by and/or output from the PDN. The Lockbox circuitry ("Lockbox") within each Node is typically capable of storing, and typically does store secrets needed by at least one Ingress and/or Egress unit to perform authorized operations. When the Lockbox within an Ingress Node or Egress Node communicates with a Lockbox within another Node (e.g., to obtain a content key from the latter Node), it does so only over secure communication channels established between the Lockboxes. A "content key" is a key (preferably, a key securely generated using a cryptographically good source of randomness) that is used to decrypt or encrypt content within a PDN and is kept secret by the Nodes in a PDN. Communication within a Node (e.g., between Lockbox and Ingress circuitry within an Ingress Node) can be accomplished in any secure manner (e.g., in the same manner in which communication between Nodes is accomplished, or in a different manner). No secret present in a Node of a PDN for use by (or transfer to) any of Lockbox, Ingress, and Egress circuitry within the Node is transmitted in unencrypted form to another Node of the PDN, and typically, no such secret in unencrypted form is accessible by software or firmware within the PDN or any entity external to the PDN (although it may be accessible by hardware within a Node). In typical embodiments, the PDN employs effective authentication mechanisms to defeat attempts to obtain unauthorized access to content in which an attacker tries to emulate a Node (e.g., an authentication exchange must be successfully completed between an Ingress (or Egress) node and another Node before either of the Nodes will transfer to the other any secret potentially useful to the attacker, and the attacker will lack the capability to successfully complete such an exchange). In order to bypass the protection afforded by such embodiments of the inventive PDN, it would be necessary to execute the very difficult (and typically impractical) operation of breaking into one or more of the Lockbox, Ingress, and Egress circuitry within a Node and modifying (or essentially modifying) circuitry within each opened hardware unit. Furthermore, this activity would have to be performed for each physical system that is to be attacked, and cannot be simply distributed and downloaded over the Internet (as can be done with software).

In typical embodiments of the inventive PDN, in order for an Ingress Node to perform an ingress operation (e.g., to transcrypt content using a content key), the Node's Lockbox must either have the content key stored within it (or, equivalently, must have it securely stored externally, with the ability to cache it locally and retrieve it from such cache) or it must securely request and obtain the content key from the Lockbox of another Node. Circuitry and communication within a Node (e.g., communication between a Lockbox and Ingress circuitry within a Node) can be implemented in any way, although preferably as simply as possible. Regardless of what mechanism is used to communicate between Nodes in a PDN, it must be possible to communicate between Nodes securely—i.e., in such a way as to ensure that information can be exchanged only between two, authenticated, Nodes, and no third-party can read, modify, or replay the communications. If a Node is implemented as a single chip, the chip's package may provide sufficient security for communication between elements of the Node, so that no further security measures (beyond the physical security provided by the chip) is needed for communication between the elements within the chip. If elements of a Node are implemented on the same PC board or in the same box or cabinet, secure communication between these elements might be accomplished using a simple cryptographic mechanism of sufficient robustness (e.g., by securely creating and mutually agreeing upon a session key). In contrast, communication between Nodes is always performed in a standardized way (e.g., an initial exchange is performed to authenticate the endpoints and establish a secure channel between the Nodes, and any secrets to be sent between the Nodes are then sent in encrypted form over the secure, point to point, channel). For example, in a PDN including two nodes, a cryptographic mechanism proprietary to the manufacturer of one of the Nodes could be used for intra-Node communication between elements of that Node, another mechanism could be used for intra-Node communication within the other Node, but both Nodes would be configured to communicate with each other in a standardized way. In a class of embodiments, a Node is configured to use a symmetric encryption mechanism to communicate with other Nodes, and to use the same mechanism for intra-Node communication between elements thereof, thus allowing the sharing of hardware for intra-Node and inter-Node communication (more specifically, Nodes would typically be configured to use an asymmetric mechanism to authenticate each other and exchange keys to be used for subsequent symmetric encryption. After such an authentication and key exchange, a symmetric mechanism would be used until it becomes necessary to replace symmetric keys, at which point the Nodes would again use an asymmetric mechanism to accomplish replacement of symmetric keys. Some type of key expansion/scheduling method could also be used to replace symmetric keys with updated keys at desired intervals). At the time of manufacture of a Node that is to use the same symmetric mechanism for communication with other Nodes and for intra-Node communication, the same symmetric key could be stored (e.g., as a result of integrated circuit fabrication techniques) into the Node's Lockbox and into all other elements of the Node that could participate in intra-Node communication with the Lockbox (this symmetric key could be used to transfer other, more temporary, symmetric keys, to reduce the re-use of key material).

In some embodiments of the inventive PDN, some devices of the PDN are Nodes (each Node including a Lockbox and optionally also including Ingress and/or Egress circuitry) and other devices of the PDN include no Lockbox and thus are not Nodes. It is expected that different elements (e.g., different Nodes) of typical embodiments of the inventive PDN will be manufactured and provided by separate and independent suppliers, although this need not be the case.

In typical implementations of the inventive PDN, the Ingress (or Egress) circuitry within each Ingress (or Egress) Node is configured to perform only authorized operations, and must obtain at least one secret from a Lockbox before performing any authorized operation (e.g., any authorized decryption operation) on content. However, each Lockbox is configured so that it will not provide any such secret to another Node without first determining (e.g., as a result of an authentication exchange) that the other Node is authorized to perform each operation that the secret could enable the other Node to perform. It may also be necessary for Nodes to exchange information about the applicable content Use Restriction Set. In order for Egress (Ingress) circuitry to perform an operation on content, two Nodes may need to negotiate and/or one of the Nodes may need to provide status information to the other and/or one of the Nodes may need to relinquish it's own rights to content (e.g., in order to enable another Node to perform a specific operation on the content). For example, a Lockbox in a first Node may revoke permissions from an Egress Node (after providing a key or other secret to the Egress Node) unless the Egress Node provides specific status information to the first Node within a predetermined time window. For example, the Egress Node may need to tell the Lockbox in the first Node that Egress circuitry in the Egress Node has (or has not) in fact rendered specific content or otherwise put the content into form for use in another place. It is of course desirable to limit the complexity of interchanges between Nodes, for both security and cost reasons. In some embodiments, the least complex (and thus preferred) technique for accomplishing permission revocation may be to require an Egress or Ingress Node to assert requests to a second (permission-giving) Node for continuing permission on regular intervals, with each request containing current status data (e.g., data indicating how many of a sequence of operations have been completed by the Egress or Ingress Node), and to configure the Lockbox of the second Node so that it revokes (automatically) permissions granted to the Egress or Ingress Node (in the sense that it withholds from the Egress or Ingress Node at least one secret needed by the Egress or Ingress Node to perform an operation that the Egress or Ingress Node wishes to perform) unless it receives predetermined requests and/or status data. For example, an Egress Node may need a sequence of keys to perform a requested operation, and the Lockbox of a second Node may be configured so that after it has provided one key in the sequence to the Egress Node, it will provide the next key in the sequence to the Egress Node only after receiving status data of a predetermined type from the Egress Node. In other embodiments, these objectives can be met by having the Egress Node monitor it's own status and discard the content key should it no longer be able to guarantee that the Use Restriction Set conditions are met.

Using techniques of the types described in the previous paragraph, all Egress and Ingress circuitry in a PDN can be prevented from generating (or outputting) content other than in an authorized manner and in an authorized format. For example, if a PDN is authorized to output content over an HDMI link in HDCP-encrypted format, Egress circuitry of the PDN could be configured to use one or more secrets obtained from a Lockbox to decrypt re-encrypted content (generated by Ingress circuitry of the PDN), re-encrypt the content using an HDCP protocol and format the HDCP-encrypted content for transmission over an HDMI link, and to transmit the formatted content over an HDMI link to an HDMI receiver external to the PDN such that only a licensed HDMI receiver (e.g., in a high definition monitor) can decrypt and display the transmitted content. For example, an Egress Node could continue to decrypt (and allow to be decompressed) a video stream, which is in turn re-encrypted under HDCP for transmission over an HDMI link. In the event that the HDMI link reports that the HDCP connection is no longer valid, the Egress Node could stop the decryption of the stream, discard the content key, and report the exception. For another example, if an embodiment of the inventive PDN is authorized to output a down-scaled analog version of plaintext content, Egress circuitry thereof could be configured to use one or more secrets obtained from a Lockbox to allow (in response to digital data indicative of re-encrypted content generated by Ingress circuitry of the PDN) the generation of an analog signal indicative of the plaintext content and to output the analog signal from the PDN to a receiver (e.g., an analog display device). In both examples, the Lockbox is configured in accordance with the invention so that it would not provide any such secret to the Egress unit without first determining (e.g., as a result of an authentication exchange) that the Egress unit is authorized to perform each operation that the secret enables the Egress unit to perform. Furthermore, the Egress Node can be relied upon to accurately report the use it intends to put the content to, and the Lockbox will not provide content keys to an Egress Node whose stated use would be in violation of the Use Restriction Set associated with the content.

A Lockbox (for use in a Node of a PDN in accordance with the invention) is typically configured so that it does not provide any secret to another Node without first determining (e.g., as a result of an authentication exchange) that the other Node is authorized to perform each operation that the secret enables the other Node to perform. Such authentication exchanges could (and likely would) be implicit when a Lockbox provides secrets to Egress (or Ingress) circuitry permanently installed in the same Node as the Lockbox (e.g., where both the Lockbox and Egress circuitry are implemented in different chips permanently installed within one set-top box). Implicit authentication exchanges could be performed between Lockbox and Egress (or Ingress) circuitry permanently installed in a common device (usable as a Node), if during manufacture of the device, a shared secret is permanently stored in each of the Lockbox and Egress (or Ingress) circuitry (e.g., by baking into silicon of or otherwise burning the shared secret into each of the Egress or Ingress circuitry and the Lockbox). Such a shared secret could then be used by the Lockbox and Egress (or Ingress) circuitry to authenticate each other and distribute key material from the Lockbox to the Egress or Ingress circuitry (e.g., to update periodically the keys used by the Egress or Ingress circuitry to operate on content, so as to limit key re-use and thereby decrease the device's susceptibility to various attacks).

In a class of embodiments, content that enters a PDN is decrypted in hardware (e.g., in Ingress circuitry within a chip) and the decrypted (plaintext) content is re-encrypted (e.g., using the 256 bit AES, CTR mode, protocol) in the hardware before the plaintext content is exposed outside the hardware (e.g., before the decrypted content leaves a chip that includes the Ingress circuitry) in accordance with the invention. In this way, only re-encrypted content (not a plaintext version of the content) is exposed outside secure decryption hardware (which hardware also performs the re-encryption), and the content is well-protected within the PDN even after the initial decryption in hardware. Just before the re-encrypted content leaves the PDN or is consumed (e.g., displayed) within the PDN, it is decrypted in accordance with the invention in hardware (e.g., in Egress circuitry within a chip) without exposing the decrypted (plaintext) content outside such hardware.

In another class of embodiments, the invention is a method and apparatus for performing decryption and re-encryption (transcryption) in hardware on content entering a PDN and retaining the content in re-encrypted form within the PDN after it has left the transcryption hardware (e.g., Ingress circuitry within a chip) and before it enters another hardware unit (e.g., Egress circuitry within another chip) in which it is decrypted (and optionally undergoes additional processing) for display and/or playback by (and/or output from) the PDN. No secret (e.g., key data or certificate) used in the PDN to accomplish content transcryption or decryption of controlled content is accessible in unencrypted form by software or firmware within the PDN or any entity external to the PDN. It should be appreciated that certificates used by Lockbox, Ingress, and Egress circuitry in many embodiments of the inventive PDN do not need to be kept secret. In fact, such certificates will often be openly and freely shared (rather than handled as secrets) within the PDN provided that they are cryptographically verifiable (traceable through digital signatures to a root of trust).

In some embodiments, the inventive PDN is a computing system (e.g., a PC) having an open system architecture. For example, a conventional open computing system can be modified in accordance with the invention to include a first Node, an Ingress Node, and an Egress Node (each Node typically but not necessarily implemented as a separate chip), with the Ingress Node coupled and configured so that content that enters the system is transcrypted in the Ingress circuitry of the Ingress Node, to protect the content within the system in accordance with the invention.

Other aspects of the invention are methods for protecting content in a PDN (e.g., an open computing system), methods that can be implemented by any embodiment of the inventive PDN (or one or more of Lockbox circuitry, Ingress circuitry, and Egress circuitry), Lockbox circuitry (e.g., a chip) for use in a PDN, Ingress circuitry (e.g., a chip) for use in a PDN, Egress circuitry (e.g., a chip) for use in a PDN, cards (e.g., multimedia graphics cards) including Ingress, Lockbox, and Egress chips connected along a bus (e.g., a PCI bus) for use in a personal computer, and devices (e.g., set top boxes or video receivers or processors) configured for use in a PDN and including at least one of Lockbox circuitry, Ingress circuitry; and Egress circuitry.

In a class of embodiments, the invention is a device (e.g., set top box for receiving content from a remote source, or video receiver or processor) configured for use in a PDN. The device includes Ingress (or Egress) circuitry and Lockbox circuitry, which can be of any type configured for use in at least one embodiment of the inventive PDN. One type of such a device is configured to receive and decrypt content having any of N different formats (e.g., content encrypted in accordance with any of N different content protection protocols) and to employ Ingress circuitry to output a transcrypted version of the content having only a single format (e.g., protected in accordance with a single content protection protocol). Another type of such a device is configured to employ Egress circuitry to receive and decrypt controlled content (e.g., transcrypted content) having only one format, and can process the decrypted content to generate output content having any of M different formats (e.g., output content encrypted in accordance with any of M different content protection protocols). Because each of these two types of devices is configured in accordance with the invention (i.e., each Ingress unit thereof outputs, and each Egress unit thereof receives, controlled content that has been encrypted in accordance with a single content protection protocol), two such devices can be coupled together to generate a device pair capable of receiving content having any of N different formats, generating in response output content having any of M different formats, and protecting the content by never exposing a plaintext version of the content outside secure hardware (e.g., outside an Ingress chip within one device or an Egress chip within the other device). Each device of such a device pair can be implemented in a simple manner in the sense that it has no more than N-fold complexity (capability to generate an output having any of N formats in response to input having a single format, or to generate an output having a single format in response to input having any of N formats) or M-fold complexity (capability to generate an output having any of M formats in response to input having a single format, or to generate an output having a single format in response to input having any of M formats). In contrast, a conventional device capable of receiving content having any of N different formats and generating in response output content having any of M different formats, while protecting the protecting the content by never exposing a plaintext version of the content outside the device, would have greater complexity (i.e., (N*M)-fold complexity). Assuming that each of N and M is greater than one and at least one of N and M is greater than two, the conventional device would be more complex than two of the inventive devices (considered together) having the same overall capability as the conventional device. The conventional device would be much more complex than such pair of the inventive devices (considered together) when each of N and M is much greater than two.

In some embodiments, the inventive Lockbox is configured to render inaccessible (e.g., delete) at an appropriate time each secret (e.g., set of key data) received from a content provider or other external source with the restriction that use of the secret is authorized only for a specified time, so that the secret has a predetermined expiration time. Preferably, the Lockbox is configured to perform this function in a cost-effective way (e.g., using simple, inexpensive circuitry that prevents unauthorized use of a secret beyond the predetermined expiration time rounded up to the nearest integral number of N-second intervals, where N is a small number greater than 1, and where much more expensive circuitry would need to be included in the Lockbox to prevent unauthorized use of the secret beyond the exact predetermined expiration time). For example, it may be preferred that the Lockbox include simple, inexpensive circuitry that prevents unauthorized use of a secret for only a few seconds beyond expiration of an authorized use period of on the order of days, where much more expensive circuitry would be required to prevent unauthorized use of the secret for no more than a fraction of a second beyond expiration of the authorized use period. In some embodiments, the Lockbox includes a monotonically increasing counter (whose count does not return to zero upon power down of the Lockbox) or a tamper resistant clock (which does not reset upon power down of the Lockbox) for use in determining when to delete (or otherwise render inaccessible) a key having an expiration time. Alternatively, the Lockbox is configured to access an external tamper resistant clock periodically (or upon power up) to obtain current time data for use in determining when to delete (or otherwise render inaccessible) a key having an expiration time.

In typical embodiments, the inventive Lockbox is configured to communicate with other devices (Nodes) within a PDN and/or to communicate via the Internet (or otherwise) with an entity external to the PDN. For example, an integrated circuit implementation of the Lockbox can be configured to perform chip-to-chip communication via software over a PCI bus along which the Lockbox chip and other chips are connected. For another example, the Lockbox can include SSL termination circuitry for communicating (via the Internet and PDN software) with a remote device. For example, using SSL termination circuitry within a Lockbox, the Lockbox might cause software of a PDN to log on to the Internet (e.g., using TCP/IP functions of a PC of the PDN) and relay encrypted messages (received from or to be transmitted over the Internet) to or from the SSL termination circuitry. A remote device might also cause software running on a PC of a PDN to perform the TCP layer functions necessary for the device to send encrypted messages over the Internet to SSL termination circuitry within the Lockbox. The SSL termination circuitry could perform the SSL layer functions needed to decrypt the message and encrypt the Lockbox's responses (to be sent over the Internet via the PDN software). Alternatively, a Lockbox can be configured to communicate with devices (other than Nodes) within a PDN and/or to communicate with devices external to the PDN (e.g., over the Internet) using an extension of the protocol used for communication between Nodes within the PDN. This protocol will typically be some form of simple challenge-response protocol that uses public key cryptography (for signing and some encryption) and certificates.

In preferred embodiments of the inventive PDN, neither plaintext content, nor any secret (e.g., key data) used for re-encryption (in an Ingress unit), decryption of re-encrypted content (in an Egress unit), or other functions, is present at any node, link or interface of the PDN that is accessible (or at least readily accessible) to a user or entity seeking to obtain unauthorized access thereto. In typical ones of these embodiments, no software or firmware running on a device internal (or external) to the PDN has access to the plaintext content or any such secret. For example, although software may instruct an Egress Node to retrieve specific content (that has previously been transcrypted by an Ingress unit) from storage in the PDN, to decrypt the retrieved content using a specific key and re-encrypt the decrypted content in a specific format for output, the software will never see the key (except possibly in encrypted form) and will never see the plaintext version of the content. Rather, the Egress Node will respond to the instruction by using secrets (including the key) stored within the Egress Node's Lockbox or by seeking from another Node all permissions and secrets (including the key) necessary to perform the specified operations. A second Node will only provide these items to the Egress Node only if the second Node determines that the Egress Node is authorized to perform the operations and the second Node will provide the items to the Egress Node only in encrypted form (such that only the Egress Node is capable of decrypting these items). In some embodiments, firmware running on an embedded processor (e.g., a microcontroller) within a Node of a PDN may have access to plaintext content and/or secrets used for re-encryption of content (in an Ingress unit) or decryption of re-encrypted content (in an Egress unit), but neither the plaintext content nor any such secret is present at any node, link or interface of the PDN that is accessible (or at least readily accessible) to a user or entity seeking to obtain unauthorized access thereto. The Lockbox circuitry within each Node can be a passive entity, except in that it can assert a flag to software to indicate that there is a message (in an outbox of the Lockbox circuitry) for the software to deliver to a specified entity. Alternatively, the Lockbox circuitry with a Node can implement some other technique for passing messages to other entities (e.g., other Nodes), such as (but not limited to) techniques using DMA engines or dedicated microcontrollers). In response to a flag indicating that a message in an outbox of Lockbox circuitry should be delivered, software can deliver the message from the outbox to an inbox of the specified recipient (typically, the message will be encrypted so that the software cannot decrypt it). In other embodiments, the Lockbox circuitry within a Node can be an active entity (e.g., in the sense that it can actively transmit messages to other Nodes, and optionally also actively perform key management operations and other operations). Only those messages (sent between Lockboxes) that contain secret material need be encrypted, but all messages sent between Lockboxes (in preferred embodiments of the invention) are at least digitally signed (to identify their origin and ensure that they are neither altered nor replayed).

Another aspect of the invention is a content protection method and apparatus for performing encryption and decryption of content securely in hardware subsystems of a system (where the system includes both hardware and software), but uses software of the system as a harmless entity (a "man in the middle") that delivers messages (which are, typically, encrypted or signed messages) between the hardware subsystems but cannot understand the messages (or cannot understand those of the messages that are encrypted). For example, when the messages are encrypted messages indicative of encrypted secrets (e.g., content keys for use by one or more of the hardware subsystems), the software cannot understand the messages if it does not have the keys needed to decrypt them and is otherwise incapable of decrypting them. The software can be used to implement secure channels between secure hardware subsystems of the overall system, and these secure channels are immune to "man in the middle" attacks on the content to be protected. However, the system uses software as a man in the middle to deliver messages.

In some systems that include both hardware and software and embody the invention, software that delivers messages between hardware subsystems of the system can (and preferably does) understand some types of the messages. For example, the software may understand each message that is to be broadcast to many (or all) elements of the system to request that specific keys or other specific items be sent to the sender of the message. Such a broadcast message (or another type of message) can be protected using a digital signature and made accessible in unencrypted form to software, when it is unnecessary or undesirable to encrypt the message and it is necessary for the software to understand the message (e.g., in order to broadcast it or to route it more effectively).

In a class of embodiments of the invention, the content to be protected is or includes video data (e.g., high-definition digital video data) that has been encrypted using a first content protection protocol. When the content enters an Ingress unit, it is decrypted (placed in plaintext form) in hardware in the Ingress unit, and the plaintext content is re-encrypted using a different content protection protocol before it leaves the Ingress unit. The re-encrypted content (sometimes referred to herein as "controlled" content or "transcrypted" content) can be transferred between and/or stored within elements of a PDN until it enters an Egress unit. In the Egress unit, the re-encrypted content is again decrypted (placed in plaintext form), the plaintext content is optionally also further processed, and plaintext content (or a processed version thereof) is then re-encrypted and otherwise formatted for output from the Egress unit. For example, the Egress unit can re-encrypt the plaintext content in accordance with the HDCP protocol and format the HDCP-encrypted content in accordance with the HDMI standard (or the DVI standard) for output from the Egress unit via an HDMI link (or a DVI link) to an external audiovisual system. Alternatively, the Egress unit outputs content in format for transmission over a TMDS-like link other than an HDMI or DVI link, over a serial link other than a TMDS-like link, or over some other digital or analog link.

The content protected in accordance with the invention can but need not be video or audio data. Such content can be or include data indicative of any information that can be stored digitally (such as but not limited to pictures, text, and personal information).

Preferably, the inventive Lockbox is implemented to include only the minimum set of hardware features for implementing the desired content protection functions, so as to be cost effective to implement. For example, in applications in which the Lockbox will not receive and store any secret that is valid only for a limited time, the Lockbox can be implemented without hardware (e.g., hardware including a monotonically increasing counter or tamper resistant clock) for deleting a secret stored in the Lockbox at the end of a predetermined time interval.

In a class of embodiments, a personal computer is modified in accordance with the invention to include three separate integrated circuits (one implementing an Ingress Node, another implementing an Egress Node, and third implementing another Node) connected along a system bus (e.g., a PCI bus). The three chips can be implemented on a card (e.g., a multimedia graphics card) configured for easy installation in the personal computer. Alternatively, three chips can be implemented on separate cards, each configured for easy installation in the personal computer (e.g., if the chips are configured to perform explicit authentication exchanges with each other to establish secure channels over which they can communicate with each other in secure fashion). Other aspects of the invention are Ingress Node, Lockbox, and Egress Node chips for use in a personal computer.

In another class of embodiments, a personal computer is modified in accordance with the invention to include one Node only; not three separate Nodes as in the example in the previous paragraph. This Node could be an Ingress Node, or an Egress Node, or a Node that is neither an Ingress Node nor an Egress Node. In other embodiments of the invention, a personal computer itself functions as a Node of a PDN.

In typical embodiments of the inventive PDN, re-encrypted content generated by an Ingress unit can be stored on a removable disc or otherwise stored in the PDN in such a manner as to be easily removable from the PDN. In such embodiments, secrets used by Nodes (e.g., by Ingress and Egress circuitry within Nodes) can also be stored (in encrypted form) on a removable disc or otherwise stored in the PDN a such a manner as to be easily removable from the PDN. For example, a Lockbox can encrypt such secrets for storage, using a key stored permanently and securely within the Lockbox (e.g., baked into silicon of the Lockbox). Even if removed from the PDN, the re-encrypted content (or secrets) cannot be used in an unauthorized way since only authorized hardware of the PDN (i.e., a Lockbox of an Egress Node) will have or be able to obtain the secret(s) needed to decrypt the re-encrypted content so as to generate a plaintext version thereof, and only authorized hardware of the PDN (i.e., a Lockbox) will have the key(s) needed to decrypt the encrypted secrets. The re-encryption of content (and/or the encryption of secrets to be stored) is accomplished in manner unique to the PDN, so that the re-encrypted content does not need be securely stored and the encrypted secrets do not need be securely stored. Rather, the re-encrypted content (and/or encrypted secrets) can be stored in the PDN in an insecure way (e.g., on a disc) and/or transferred in an insecure way through the PDN from an Ingress unit to an Egress unit. In contrast, others have proposed to protect content within a PDN by locking the content securely within each device of the PDN and securing all links between devices of the PDN.

If pre-encrypted content that enters a PDN is removed from the PDN before it is decrypted (and re-encrypted) in an Ingress Node, the content could not be used unless an authorizing transaction (e.g., with a digital rights management system or in some other way with the content owner) were first performed. Such transaction would often include the payment of an additional fee.

In accordance with typical embodiments of the invention, a content provider (e.g., an entity that transmits content via satellite to a set top box of a PDN) or other entity external to a PDN can load a secret into a Lockbox of the PDN (after establishing that the Lockbox is authorized to receive it), and the Lockbox can later provide the secret to Egress or Ingress circuitry (within the Node containing the Lockbox) or to another Node when appropriate. Alternatively, the Lockbox may not have a secret stored within it at the time the secret is needed. In the latter case, the Lockbox may (e.g., in response to a request from an Egress or Ingress Node) seek the requested secret from another Lockbox (a "peer" Lockbox) within the PDN and/or (e.g., if it does not obtain the secret from a peer Lockbox) seek the secret from an entity (e.g., a content provider, service provider, or digital rights management service) external to the PDN. In all cases, a Use Restriction Set that applies to the relevant content determines how and when the secret can be exchanged. For example, assume that an Ingress Node is ready to receive content from an external source, and the Lockbox of the Ingress Node asks the Lockbox of a second Node (via a secure channel that has been established between the Nodes, e.g., as a result of an authentication exchange performed between them at power up) whether the Ingress Node can perform a specific decryption and re-encryption (transcryption) operation on this content. If the Lockbox of the second Node determines (e.g., as a result of an exchange between the two Nodes in which a certificate, prestored in the Ingress Node, is provided by the Lockbox of the Ingress Node to the second Node) that the answer is yes, the Lockbox of the second Node provides the Lockbox of the Ingress Node the secret needed to perform the specified transcryption operation. The Lockbox of the second Node sends the secret to the Ingress Node only after the Lockbox of the Ingress Node proves to the Lockbox of the second Node that the Ingress Node is a licensed device, and after the Lockbox of the second Node proves to the Lockbox of the Ingress Node that the second Node is a licensed device, via an authentication exchange over a secure link within the PDN. Such an exchange also occurs between an Egress Node and the Lockbox of a second Node when the Lockbox of the Egress Node requests permission to receive re-encrypted content from within the PDN and perform a specific operation thereon (e.g., decryption followed by a different kind of encryption and formatting of the content for output from the PDN). When an Ingress unit has received from the Lockbox a secret needed to perform a specified transcryption operation, the content provider can send content to the Ingress unit and the Ingress unit can use the secret to receive and transcrypt the content and store the re-encrypted content (e.g., on a disk) in the PDN. Later, an Egress unit can use a secret (obtained from the Lockbox) to access the stored re-encrypted content and perform an authorized operation thereon.

Content entering the inventive PDN has a Use Restriction Set, which (as defined above) is the set of all use restrictions to which the content is subject. In typical embodiments, a Lockbox of the PDN has primitives (e.g., data referred to herein as "rights data") prestored therein which are indicative of the Use Restriction Set (e.g., by indicating operations on the content that are not proscribed by the Use Restriction Set). Although primitives indicative of a Use Restriction Set can be prestored in a Lockbox, a Use Restriction Set can change over time (e.g., it can become more restrictive, such as in response to the occurrence of predetermined events, or can become less restrictive, such as if the user pays a fee for enhanced access to the content). In response to each change in a Use Restriction Set, the corresponding primitives stored in the Lockbox will also be changed (e.g., updated primitives will be stored and obsolete primitives deleted). A Lockbox of a PDN also has prestored therein at least one secret (e.g., key data) needed to perform at least one operation (e.g., decryption) on content that is not proscribed by the Use Restriction Set. Typically, the primitives (indicative of the Use Restriction Set) and the secret (needed to perform at least one operation on the content) are stored in memory (e.g., nonvolatile memory) in the Lockbox. Alternatively, the primitives and the secret are stored in memory (e.g., nonvolatile memory) external to the Lockbox such that the stored primitives and secret are accessible in plaintext form only by the Lockbox. In typical embodiments, when an Ingress (or Egress) Node of the PDN is ready to receive content, the Ingress (or Egress) Node asserts a request to the Lockbox of a second Node for permission to perform one or more specified operations (e.g., transcryption or decryption followed by reformatting for display) on the content. If the Lockbox decides to grant the request (e.g., after comparing data indicative of the requested operation(s) with rights data prestored in the Lockbox), the Lockbox asserts at least one secret to the Ingress (or Egress) Node to enable the Ingress (or Egress) Node to perform each requested operation. The Ingress (or Egress) Node does not store any such secret persistently, and thus each such secret is similar to a session key. In one embodiment, the Nodes use actual session keys to protect the communications between them, and to ensure the security of the content key, which is stored in the Lockbox Node and must be securely transmitted to the Egress Node in order for the content to be used (in accordance with the content's Use Restriction Set). Typically the Ingress (or Egress) circuitry that uses such a secret within the Ingress (or Egress) Node has no memory in which to store the secret persistently, although it may have a small amount of buffer memory in which to double buffer the secret (for example to allow the secret to be easily replaced by an updated version of the secret). Typically, the secrets(s) transmitted between Nodes of a PDN, and sometimes also requests or other non-secret data transmitted between Nodes, are transmitted in encrypted form over a secure channel that has been established between the Nodes as a result of a preliminary authentication exchange between them, and each Node must have proved its identity to the other Node during the authentication exchange. Nodes can be configured to encrypt all messages that they send to each other (e.g., if this simplifies the communication protocol), but they can alternatively be configured to encrypt only those messages that contain secret information (e.g., an Ingress Node might not encrypt requests for session keys that it sends to another Node, where such requests include no information that could help an attacker obtain unauthorized access to content, and where encryption of the requests might itself reveal information to an attacker about the keys used to encrypt the requests).

Even after Ingress (or Egress) circuitry has received a content key from a Lockbox, there typically are restrictions on what the Ingress (or Egress) circuitry can do using the content key, and the Ingress (or Egress) circuitry should be configured so as to be incapable of operating other than in compliance with the restrictions. For example, to accommodate the case that the content key authorizes an Egress unit to decrypt content, re-encrypt the content using the HDCP protocol and transmit it over an HDMI link while monitoring HDCP security, provided that the Egress unit must cease HDCP-encryption and HDMI transmission upon determining that HDCP security has been breached (i.e., when the Egress unit determines that the HDMI receiver is not authorized), the Egress unit should be configured to operate in exactly the authorized manner (e.g., it should be incapable of continuing HDCP-encryption and HDMI transmission operations unless it periodically receives or generates some confirmation of HDCP security).

In preferred embodiments, the inventive PDN and each Lockbox thereof are implemented to allow devices including Ingress and/or Egress circuitry to be associated into the PDN with or without resort to an external authority. In some embodiments, the Lockboxes of a PDN are configured and operated to require a content owner's approval to add a particular device or capability to the PDN. Preferably, the Lockbox of each device that a user might wish to include in the PDN is configured so that a secret can be persistently and securely but revocably stored therein to indicate that the Lockbox (and thus the device in which it is contained) is an authorized element (Node) of the PDN. Typically, the secret is or includes a certificate, and thus the secret will sometimes be referred to herein as a "marriage certificate." It should be recognized however that a marriage certificate may not be or include a true certificate (for example, a marriage certificate could be a public key, rather than a true certificate). A Lockbox can be configured with capability to have a marriage certificate stored (at least temporarily) therein at the time it is associated with the PDN. Each Lockbox can be configured to include a programmable (e.g., one-time-programmable) memory for storing a marriage certificate and other data (e.g., certificates) needed to determine whether other Nodes are authorized members of the PDN (i.e., to determine whether other Nodes possess valid marriage certificates and are thus "married" to the PDN). Each such programmable memory could be implemented as a flash memory or EEPROM (or the like) within the Lockbox, but is preferably implemented as an element less expensive than a flash memory or EEPROM within the Lockbox. In some embodiments, the programmable memory is a nonvolatile memory external to the Node (or external to the Node's Lockbox but internal to the Node) but accessible in a secure manner by the Node's Lockbox (e.g., the Lockbox could send the necessary data in encrypted form to external nonvolatile memory for storage, and the memory could send the data back to the Lockbox in encrypted form in response to a request from the Lockbox to read the stored data. In other embodiments, each programmable memory is a one-time programmable set of fuses which can be discarded (no longer used) when no longer needed but which cannot be modified once it is permanently programmed into a particular state. For example, there can be sixteen (or some other number) sets of fuses in a Lockbox, each set of the fuses can be programmed once to store a marriage certificate, and the Lockbox can be configured to use only the most recently programmed set of fuses (i.e., to ignore each other fuse) when it needs to access its marriage certificate. A marriage certificate stored in the Lockbox of a first Node, and related data stored in the Lockbox of a second Node (e.g., data allowing the latter Lockbox to determine whether another Node possesses a valid marriage certificate) can be used in a simple authentication exchange between the Nodes to establish a secure channel between them preliminary to operation of the first Node as an element of a PDN.

In a class of embodiments, the invention is a method for content protection in a PDN, including the steps of: transcrypting content that enters the PDN in ingress hardware of the PDN, thereby generating controlled content; and decrypting the controlled content in egress hardware of the PDN to generate decrypted content, such that neither the content in plaintext form, nor any secret used by at least one of the ingress hardware and the egress hardware to perform an authorized operation on either of the content and the controlled content, is accessible by software or firmware running on any element of the PDN, and such that the content is never present in plaintext form within the PDN except within secure hardware, whereby the controlled content can be transferred freely among elements of the PDN and stored within the PDN. In some such embodiments, the ingress hardware is an integrated circuit, the egress hardware is another integrated circuit, and the content is maintained within the PDN such that the content is never present in plaintext form within the PDN except within an integrated circuit.

In another class of embodiments, the invention is a content protection method, including the steps of: transcrypting content that enters a personal digital network in an ingress node of the personal digital network, thereby generating controlled content; and decrypting the controlled content in an egress node of the personal digital network to generate decrypted content, such that neither the content, nor any secret used by at least one of the ingress node and the egress node to perform an authorized operation on any version of the content, is present in plaintext form within the personal digital network except within a secure subsystem of the personal digital network. For example, such a secret (or the content in plaintext form) could be accessible to firmware running on an embedded processor within a secure subsystem of the ingress node or egress node (e.g., to firmware running on a microcontroller within a secure subsystem of the ingress or egress node), but neither the plaintext content nor any such secret is present at any node, link or interface of the personal digital network that is accessible (or at least readily accessible) to a user or entity seeking to obtain unauthorized access thereto.

In another class of embodiments, the invention is a content protection method including the steps of: transcrypting content that enters a PDN in ingress hardware of the PDN, thereby generating controlled content; decrypting the controlled content in egress hardware of the PDN to generate decrypted content; and optionally also asserting at least one of the decrypted content and a processed version of the decrypted content from the egress hardware to an entity (e.g., a device or system) external to the PDN. Neither the decrypted content, nor any secret used by either of the ingress hardware and the egress hardware to perform an authorized operation on either of the content and the controlled content, is accessible by software or firmware running on any element of the PDN. Typically, the ingress hardware is an integrated circuit and the egress hardware is another integrated circuit.

In another class of embodiments, the invention is a content protection method including the step of decrypting content in egress hardware of an egress node of a PDN using at least one secret obtained (by the egress hardware) from a lockbox of the PDN, thereby generating decrypted content. This lockbox is internal to the egress node, but the lockbox may have obtained the secret from another lockbox included within another node of the PDN (or from a source external to the PDN). Optionally, the method also includes the step of asserting at least one of the decrypted content and a processed version of the decrypted content from the egress node to an entity (e.g., a device or system) external to the PDN.

In some embodiments, the content entering the inventive PDN is or includes encrypted video (e.g., high definition video that has been read from an HD-DVD and is protected by CSS or a content protection scheme similar to CSS), and an Egress unit of the PDN is configured generate decrypted, compressed video (e.g., MPEG or MPEG-2 compressed video), to perform decompression on the compressed video to generate decrypted, decompressed video ("raw" video), and to re-encrypt the raw video. In some embodiments, the Egress unit performs the re-encryption in accordance with the HDCP protocol and transmits the re-encrypted raw data over one or more HDMI links to an external audiovisual system. In other embodiments, the Egress unit re-encrypts raw (decrypted) data in accordance with a content protection protocol other than HDCP, and asserts re-encrypted data to an external device over a link other than an HDMI link. In other embodiments, the Egress unit asserts re-encrypted data to an external device over one or more DVI links. In other embodiments, the Egress unit asserts re-encrypted data over one or more TMDS-like links (none of which is an HDMI or DVI link) or over one or more serial links (none of which is a TMDS-like link).

In other embodiments, content entering a PDN is transcrypted and marked with the appropriate Use Restriction Set (or content already in PDN encryption format upon entering the PDN is marked with the appropriate Use Restriction Set, unless it has already been marked with the Use Restriction Set), and the controlled content (e.g., newly transcrypted content) is stored in an external Hard Disk Drive (HDD) array. In this case, the PDN may no longer be able to maintain control over the content (e.g., the HDD's could be removed from their enclosures and attached to a general-purpose PC, thus exposing the stored content to a variety of attacks). However, because the content is encrypted (in PDN encryption format) before being stored (in accordance with typical embodiments of the invention) the stored content (even large quantities of stored content) will remain safe from determined attack over a long time (e.g., many years). In accordance with typical embodiments of the invention, once controlled content is present in a PDN (e.g., once content entering the PDN has been transcrypted in Ingress circuitry), the only way that it can be used (i.e., rendered) is if its associated content key is available. Therefore, the security of the controlled content is completely a function of the security of the Lockbox and Egress Nodes (which can contain an unencrypted version of the content key needed to decrypt the controlled content to place it in plaintext form), so that the controlled content can be transmitted or stored in any fashion (including being freely distributed via the Internet), without concern that the content's Use Restriction Set may be violated.

DETAILED DESCRIPTION OF PREFERRED EMBODIMENTS

Initially, teaching of above-referenced U.S. patent application Ser. No. 10/679,055 will be summarized with reference to FIGS. 4-13.

In the below description, the expression "non-protected" data denotes data received by a device (e.g., an HD-DVD drive), which may or may not be subject to intellectual property protection, but which the device is configured to recognize as assertable in nonencrypted form to an open computing system.

The expression "SATA interface" herein denotes an interface configured for communication over at least one serial link in compliance with the SATA standard. The expression "SATA standard" herein denotes the standard known as Serial ATA, Revision 1.0, adopted on Aug. 29, 2001, by the Serial ATA Working Group, for communication between a host and one or more storage devices over one or more serial links.

In a typical embodiment of the open computing systems described in U.S. patent application Ser. No. 10/679,055, a closed subsystem of the open system includes a closed unit (sometimes referred to as a "DDR" unit) that receives encrypted content (e.g., from a source external to the open system), performs decryption and any required decompression on the received content to generate raw content, and re-encrypts the raw content. The received content can be or include encrypted video (e.g., high definition video that has been read from an HD-DVD and is protected by CSS or a content protection scheme similar to CSS). The DDR unit can be configured to perform decryption of the encrypted video to generate decrypted, compressed video (e.g., MPEG or MPEG-2 compressed video), to perform decompression on the compressed video to generate decrypted, decompressed video ("raw" video), and to re-encrypt the raw video for output from the open system (e.g., to an external audiovisual system).

Figure 1:
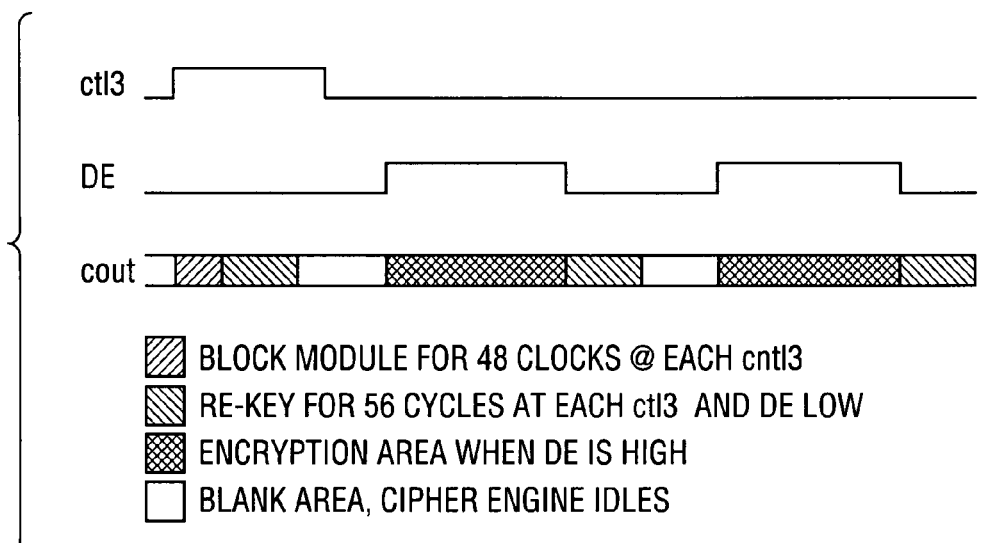
FIG. 1 is a timing diagram of signals generated conventionally to encrypt digital video data to be transmitted over a DVI link using the conventional High-bandwidth Digital Content Protection ("HDCP") protocol.
Figure 2:
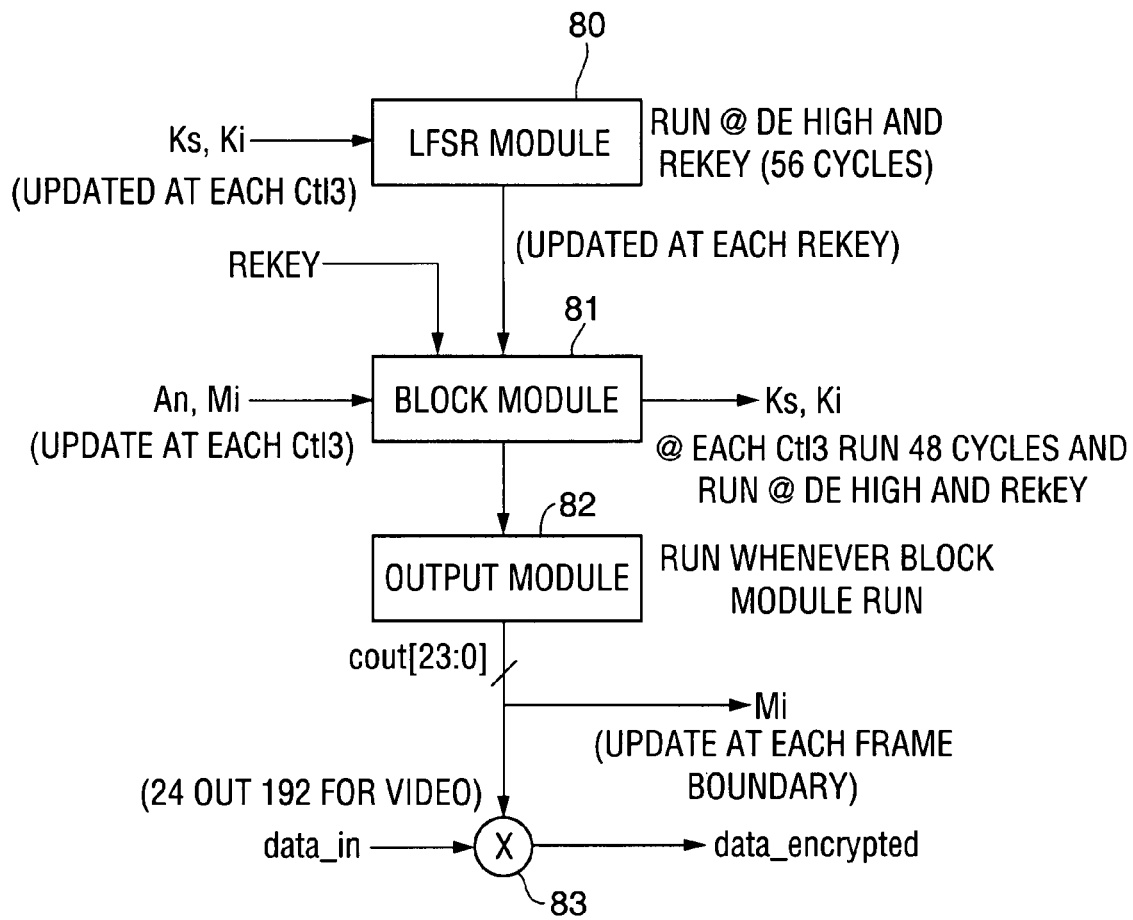
FIG. 2 is a block diagram of conventional circuitry for encrypting digital video data to be transmitted over a DVI link.
Figure 3:
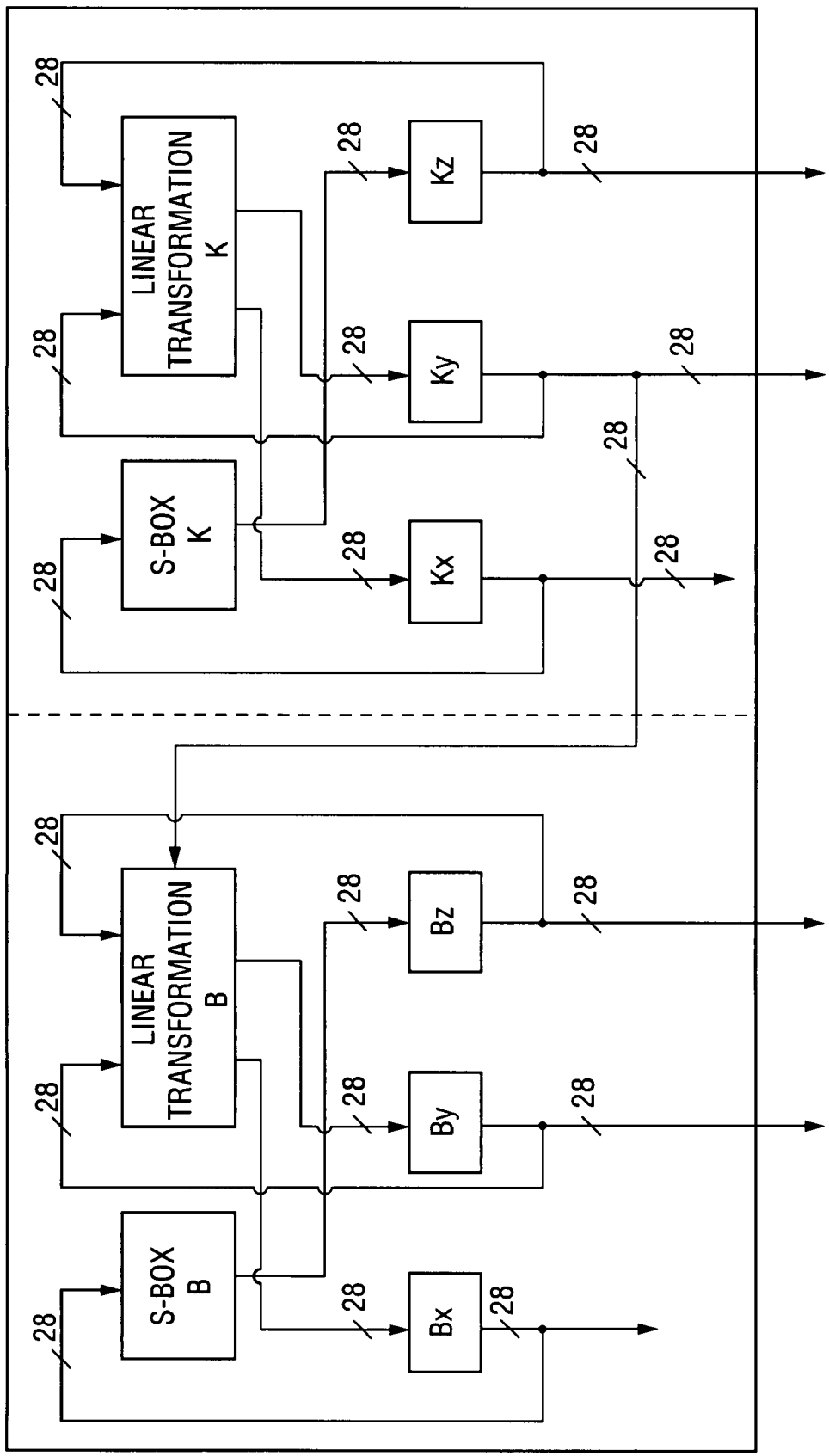
FIG. 3 is a simplified block diagram of module 81 of FIG. 3.
Figure 4:
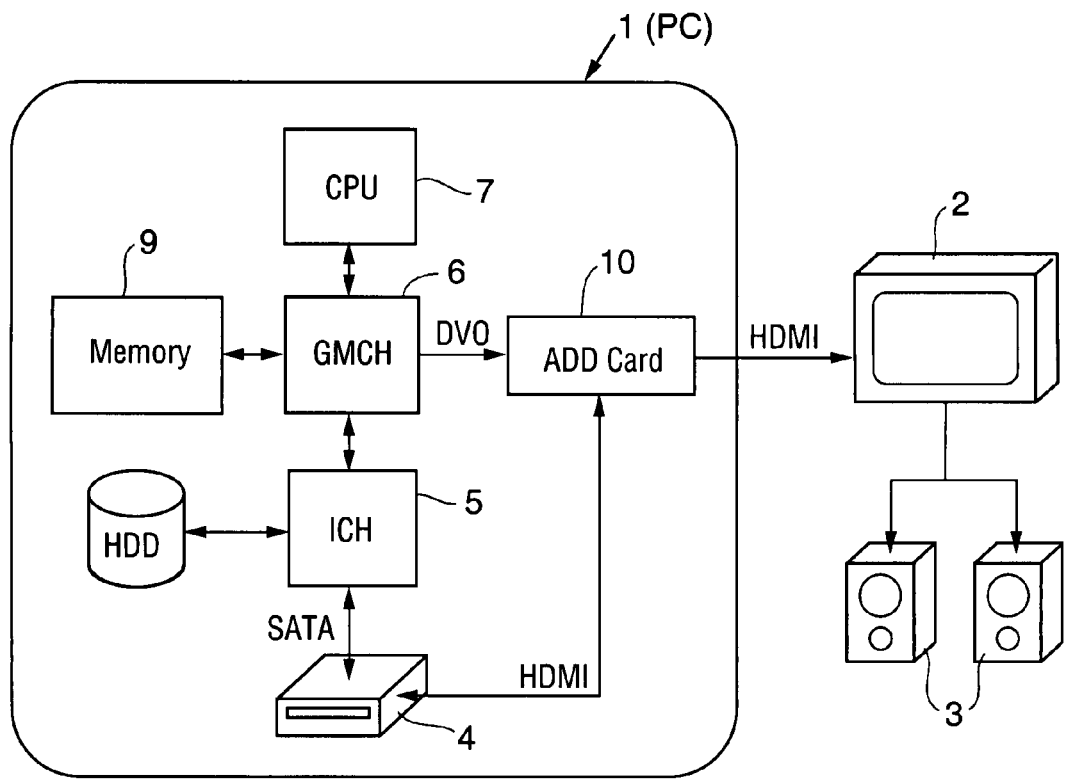
FIG. 4 is a block diagram of a personal digital network ("PDN") that can embody the invention. The PDN of FIG. 4 includes personal computer 1 (an open computing system), monitor 2, and loudspeakers 3.
Figure 5:
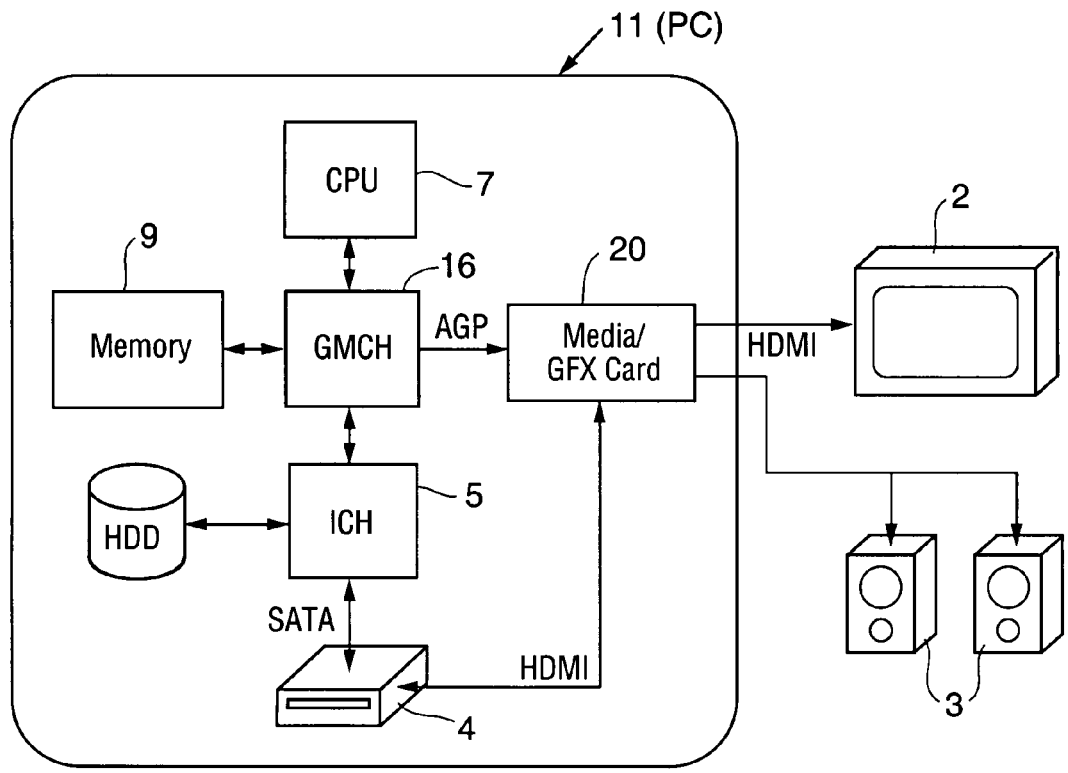
FIG. 5 is a block diagram of another system that can embody the invention.

An aspect of each system described below with reference to FIGS. 4 and 5 is circuitry for combining the output of a DDR unit with standard (unprotected) graphics and audio output of an open system. Typically, modern PCs have one of two types of graphics systems. Low end PCs have a graphics controller integrated into their chipset (e.g., into GMCH chip 6 of FIG. 4) and use an AGP Digital Display card (e.g., an ADD card similar or identical to card 10 of FIG. 4) to route the digital video connection to a bulkhead HDMI/DVI connector. Higher end PCs typically use a more sophisticated graphics controller directly on an AGP or PCI-Express graphics card (e.g., a media/graphics card similar to card 20 of FIG. 5). Older PCs use a graphics controller on either AGP, PCI, or ISA bus. In any case, there is typically a single board in the system that provides the video output for the system. We will call this board the "graphics card", regardless of the type of card it is.

In FIG. 4, personal computer (PC) 1 is an open system coupled to an external audiovisual system that includes HDTV monitor 2 (which includes an HDMI receiver) and loudspeakers 3 driven by HDTV monitor 2. PC 1 includes HD-DVD drive 4. In the FIG. 6 implementation of disk drive 4, drive controller 30 asserts data read from an HD-DVD disk (not shown) to multiplexer 31. Multiplexer 31 can include circuitry for detecting whether the data from controller 30 are non-protected data (e.g., non-protected menu information or the like). When multiplexer 31 detects that the data from controller 30 are non-protected data, multiplexer 31 asserts the data to SATA interface 34. Otherwise (e.g., when multiplexer 31 detects that the data from controller 30 are copyrighted content, e.g., copyrighted high definition video), multiplexer 31 asserts the data from controller 30 to DVD decoder 32.

Typically, HD-DVD drive 4 would include an HDMI interface (e.g., the HDMI interface of FIG. 6, comprising HDMI transmitter 33 and connector 33A for coupling transmitter 33 to an HDMI cable) in addition to a data interface (e.g., SATA interface 34 of FIG. 6 with connector 34A, or an ATA or SCSI interface with appropriate connector) used for reading and writing non-protected data. The HDMI interface would provide a connection separate from that provided by the data interface, analogous to the separate analog audio connection that a CD-ROM uses for providing CD audio to the sound card of a PC.

However, a separate HDMI connection between drive 4 and card 10 (separate from drive 4' data interface for reading and writing non-protected data) is not necessary. In some embodiments (for example, the embodiment to be described with reference to FIG. 12) HDCP-encrypted data are "tunneled" from a DDR (a closed subsystem of an open computing system) through an open computing system via the same data interface used for reading and writing non-protected data. In the latter embodiments, the HDMI interface would encrypt (e.g., re-encrypt) the protected content, thereby generating HDCP-encrypted data, and the HDCP-encrypted data would propagate through the open computing system to an HDMI receiver within a closed system (e.g., an HDMI receiver within an HDTV monitor or other display device). Even though the open computing system has access to the HDCP-encrypted content, it cannot decrypt such encrypted content and instead merely passes it through to the HDMI receiver in the closed system.

PC 1 also includes I/O controller hub (ICH) chip 5 that is coupled to receive data from SATA interface 34. ICH chip 5 controls I/O functions (e.g., USB functions) of PC 1. ICH chip 5 is coupled via graphics and memory controller hub (GMCH) chip 6 to CPU 7. GMCH chip 6 handles such functions as PCI (peripheral communications interconnect) bus functions, Level 2 cache activities, and AGP (accelerated graphics port) activities. Memory 9 and AGP Digital Display (ADD) card 10 are coupled to GMCH chip 6.

Data from the SATA interface 34 of disk drive 4 can flow via ICH chip 5 and GMCH chip 6 into memory 9, be processed by CPU 7, and potentially, result in graphics data or non-copy-protected video data being output to ADD card 10 and to monitor 2. Elements 5, 6, 7, and 9 thus comprise a computing subsystem of PC 1 that has an open system architecture and is configured to generate data for assertion to monitor 2 via ADD card 10.

Card 10 includes an HDCP transmitter (e.g., transmitter 40 of FIG. 7) that performs HDCP encryption on digital video and audio data from chip 6. Card 10 is configured to assert the resulting HDCP-encrypted digital video and audio over an HDMI link to monitor 2. The data asserted from GMCH chip 6 to ADD card 10 can be in DVO (digital video output) format.

Figure 6:
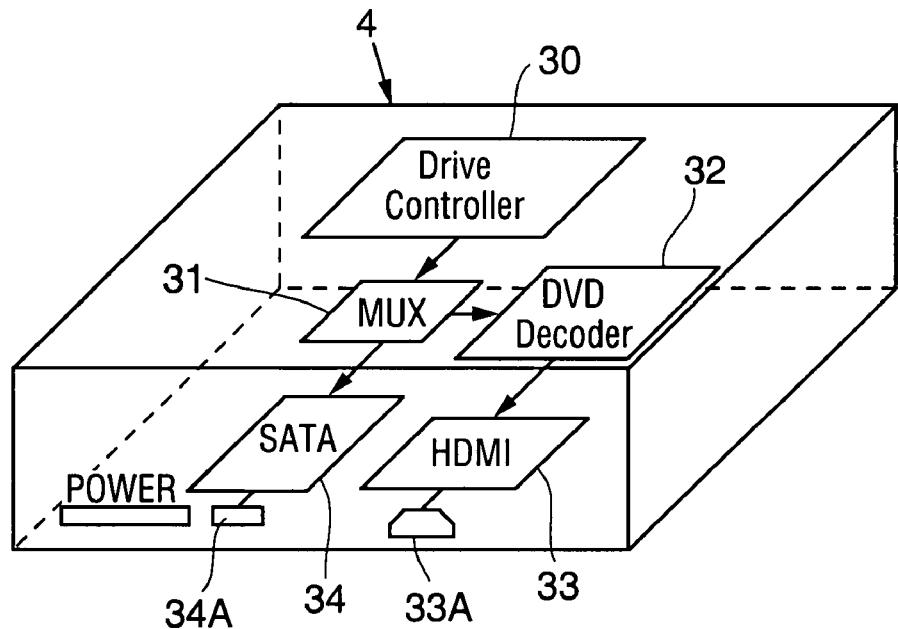
FIG. 6 is a block diagram of elements of an embodiment of disk drive 4 of FIG. 4 or FIG. 5.
Figure 7:
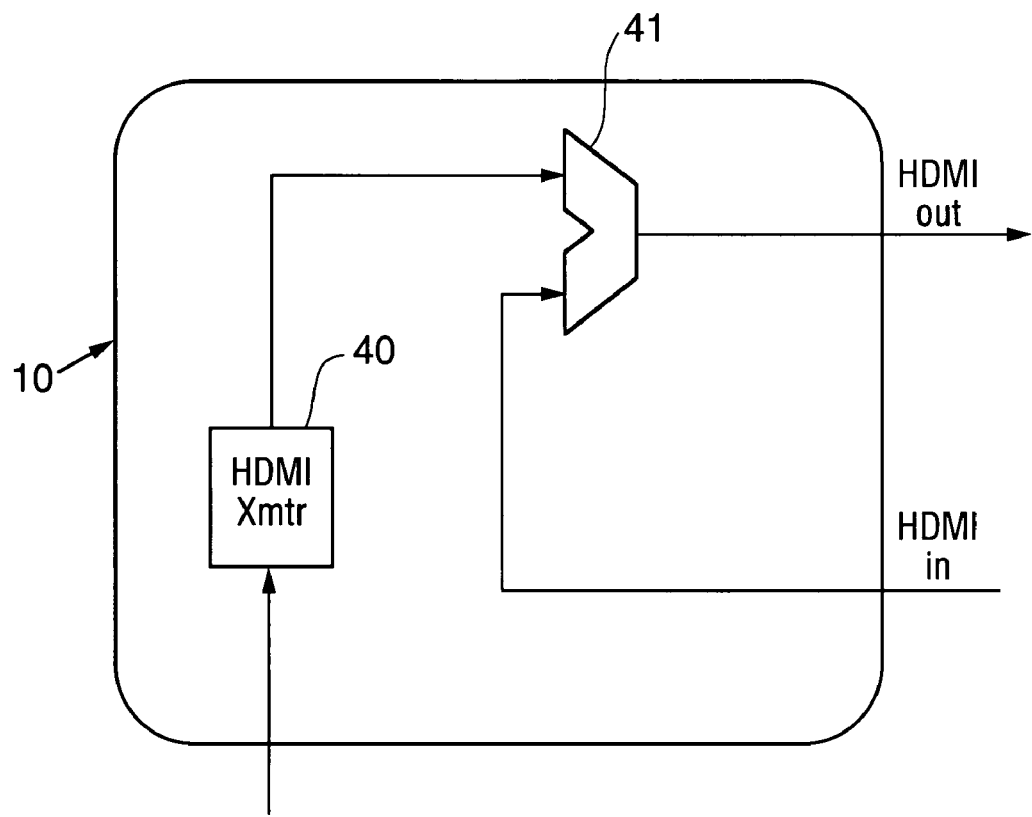
FIG. 7 is a block diagram of an embodiment of card 10 of FIG. 4.

When disk drive 4 is implemented as shown in FIG. 6, DVD decoder 32 performs decryption and decompression of high definition video data (from an HD DVD disk), and HDMI transmitter 33 re-encrypts the resulting raw video data (according to the HDCP protocol) and transmits the re-encrypted video data over an HDMI link (including HDMI connector 33A) directly to ADD card 10. Card 10 typically functions as an HDMI repeater to retransmit the re-encrypted video data over another HDMI link to monitor 2. Disk drive 4 also sends directly to card 10 over the HDMI link (for forwarding to monitor 2) any key data needed by monitor 2 to decrypt the re-encrypted video data (e.g., key data employed during an HDCP authentication exchange). The elements of PC 1 other than the closed subsystem embedded within PC 1 (disk drive 4, each element of ADD card 10 that belongs to the closed subsystem, and the HDMI link between drive 4 and card 10) have no access to the re-encrypted video data or the key data.

FIG. 5 is a block diagram of a variation on the system of FIG. 4. The elements of FIG. 5 that are identical to those of FIG. 4 are identically numbered in both Figures. In FIG. 5, ADD card 10 is replaced by media/graphics card 20, and GMCH chip 6 (which includes integrated graphics circuitry) is replaced by GMCH chip 16. Chip 16 is configured to assert AGP format data to card 20. Card 20 is configured to assert HDCP-encrypted digital video over an HDMI link to monitor 2, and to assert analog audio data (generated in a DAC within card 20) directly to loudspeakers 3. Media/graphics card 20 also functions as an HDMI transceiver which retransmits HDCP-encrypted video data (received over a first HDMI link from drive 4) over a second HDMI link to monitor 2, and extracts HDCP-encrypted audio from the data received over the first HDMI link, decrypts the audio and performs digital-to-analog conversion thereon, and asserts the resulting analog audio directly to loudspeakers 3.

Figure 12:
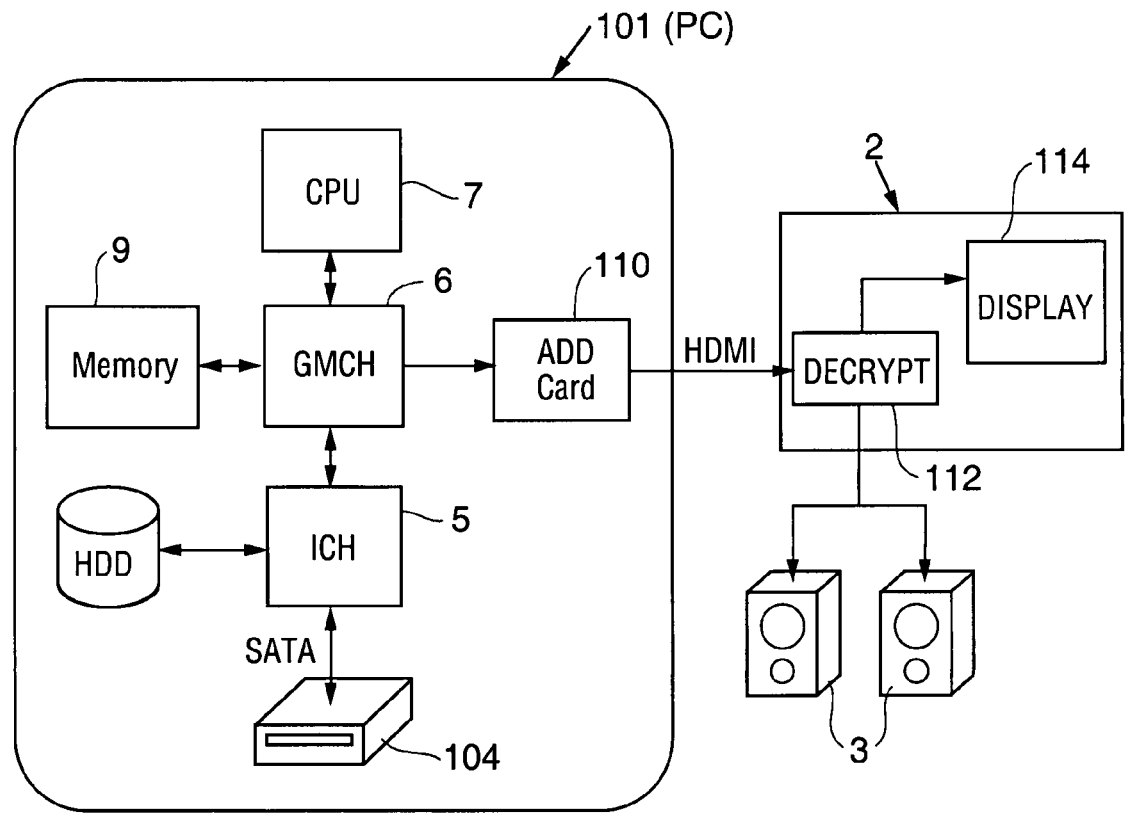
FIG. 12 is a block diagram of another system that can embody the invention.

FIG. 12 is a block diagram of another variation on the system of FIG. 4. The elements of FIG. 12 that are identical to those of FIG. 4 are identically numbered in both Figures. PC 101 of FIG. 12 differs from PC 1 of FIG. 4 in that ADD card 110 replaces ADD card 10 (of FIG. 4) and HD-DVD drive 104 replaces HD-DVD drive 4 (of FIG. 4).

Figure 13:
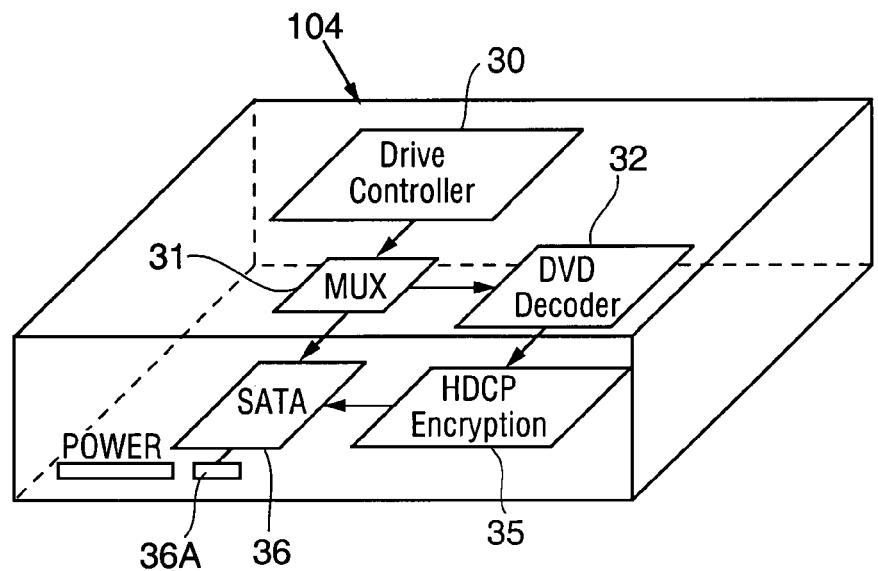
FIG. 13 is a block diagram of elements of an embodiment of disk drive 104 of FIG. 12.

Disk drive 104 can be implemented as shown in FIG. 13. The elements of FIG. 13 that are identical to those of FIG. 6 are identically numbered in both Figures, and the FIG. 13 implementation of disk drive 104 differs from the FIG. 6 implementation of disk drive 4 in the following respects. In the FIG. 13 implementation of disk drive 104, HDMI connector 33A is omitted, SATA interface 34 is replaced by SATA interface 36 (having connector 36A), and HDMI transmitter 33 is replaced by HDCP encryption unit 35 (whose output is coupled to a second input of SATA interface 36). SATA interface 36 is configured to assert (to connector 36A) data, having SATA format, indicative of data received by interface 36 from drive controller 30 (via multiplexer 31) or indicative of HDCP-encrypted data received by interface 36 from encryption unit 35. When multiplexer 31 of disk drive 104 detects that the data from controller 30 are copyrighted high-definition video data (and/or copyrighted audio data), multiplexer 31 asserts the data to DVD decoder 32. In response, decoder 32 decodes (decrypts) and performs any necessary decompression on the data, and asserts the resulting raw (decoded, or decoded and decompressed) high-definition video (and/or audio) data to the input of HDCP encryption unit 35. In response, encryption unit 35 asserts an HDCP-encrypted version of the raw high-definition video (and/or audio) data to an input of SATA interface 36. The HDCP-encrypted data are "tunneled" through SATA interface 36 (within a data stream having SATA format) to ICH chip 5, and from ICH chip 5 via GMCH chip 6 and ADD card 110 to monitor 2. When multiplexer 31 (of disk drive 104) detects that the data from controller 30 are non-protected data, multiplexer 31 asserts the data to the other input of SATA interface 36. A data stream having SATA format, and indicative of the non-protected data, is asserted by interface 36 to ICH chip 5, and from ICH chip 5 via GMCH chip 6 and ADD card 110 to monitor 2.

ADD card 110 of FIG. 12 includes an HDCP transmitter that performs HDCP encryption on digital video and/or audio data from chip 6 and asserts the encrypted video and audio over an HDMI link to monitor 2. The encryption circuitry of the HDCP transmitter within card 110 is disabled or bypassed in the mode in which chip 6 forwards HDCP-encrypted data from disk drive 104 to card 110. Card 110 of FIG. 12 differs from ADD card 10 of FIG. 4 in that card 110 is not coupled directly to disk drive 104 (whereas card 10 is coupled directly to disk drive 4). Card 110 need not include a switch whose output is coupled to the HDMI link between card 110 and monitor 2. In contrast, card 10 of FIG. 4 includes a switch (e.g., switch 41 of FIG. 7) for selectively asserting to monitor 2 either data from its internal HDCP transmitter (e.g., transmitter 40 of FIG. 7) or HDMI-format, HDCP-encrypted data received directly from disk drive 4.

HDTV monitor 2 is typically implemented as a closed system. As shown in FIG. 12, monitor 2 typically includes an HDMI receiver 112, and a display device 114 (e.g., a CRT or LED display) coupled to receiver 112. Device 114 is configured to display decrypted video data produced in receiver 112. Receiver 112 includes HDCP decryption circuitry configured to decrypt encrypted audio and video data received from card 110, and is configured to assert the decrypted audio (typically after performing additional processing thereon, such as reformatting) to loudspeakers 3 and to assert the decrypted video (typically after performing additional processing thereon, such as reformatting) to display device 114.

In the FIG. 12 embodiment, HDCP encryption circuitry within disk drive 104 encrypts (re-encrypts) a decoded version of protected content received by disk drive 104 (e.g., read from a disk by disk drive 104), thereby generating HDCP-encrypted data. The HDCP-encrypted data propagate through PC 101 (an open computing system) to HDMI receiver 112 within an external device (HDTV monitor 2). Even though PC 101 has access to the HDCP-encrypted content, it cannot decrypt the HDCP-encrypted content since it lacks the keys to do so, and instead it merely passes the HDCP-encrypted content through to HDMI receiver 112 in monitor 2.

In alternative embodiments, a DDR unit in an open system is separate and independent of a disk drive. For example, the DDR unit could be configured to receive, decrypt and decompress, and re-encrypt protected content from the Internet or another source external to the inventive open system.

When a DDR unit is embedded in an open system, circuitry would typically be provided for combining the output of the DDR unit with standard (unprotected) graphics and audio output of the open system. For example, the graphics card of a PC (e.g., card 10 of FIG. 4 or card 20 of FIG. 5) can be augmented with another closed subsystem for dealing with protected content (including by combining the output of a DDR unit with standard graphics and/or audio output of the PC). This closed subsystem preferably includes an HDMI connector to receive re-encrypted data provided from the DDR unit (typically integrated in an HD-DVD drive) and a mechanism to combine (e.g., time-division-multiplex, or combine into picture-in-picture format) the re-encrypted data with the standard graphics and/or audio output of the open system. Preferably, the output of the augmented graphics card is, itself, an HDMI connection with HDCP copy protection capability, and the augmented graphics card is configured to forward HDCP encrypted data from the DDR unit to an external device only if the output of the graphics card is connected to an external device (e.g. HD monitor) that also supports HDCP. This prevents protected content from flowing through the augmented graphics card unless the external device (end device) supports the HDCP protection mechanism.

The simplest combination mechanism ("combiner circuitry") possible in the augmented graphics card is a switch (e.g., switch 41 of FIG. 7) that is configured to select either DVD video or system graphics output. The switch can be user-actuated so that the user can either choose to view protected content (e.g., the signal labeled "HDMI in" in FIG. 7, which is from disk drive 4) on the screen, or to view the output of the PC graphics (labeled "(S)DVO" in FIG. 7). In the FIG. 7 embodiment, ADD card 10 includes HDMI transmitter 40 and switch 41, connected as shown. Transmitter 40 receives the output of GMCH chip 6 of FIG. 4, performs HDCP encryption thereon, and asserts the HDCP-encrypted data over an HDMI link to switch 41. Switch 41 functions as an HDMI repeater that forwards to monitor 2 (over another HDMI link) either the output of transmitter 40 or the output of the DDR unit (e.g., the output of HDMI transmitter 33 of disk drive 4 of FIG. 6). An example of the inventive closed subsystem is a DDR unit within drive 4 (e.g., elements 31, 32, and 33 of drive 4 of FIG. 6) and switch 41 (within ADD card 10 of FIG. 7).

In some embodiments, the augmented graphics card would act as an "HDCP repeater" according to the HDCP specification. Such a repeater would simply pass HDCP authorization messages between the original source (the DDR unit) and the destination (e.g. the monitor) without being involved in the negotiation.

More elaborate combiner circuitry (e.g., within card 10) is also possible. For example, the combiner circuitry can be configured to embed the video display in part of the screen (e.g. where a graphics window is located), or even to rescale the protected content to another resolution and embed it in a display determined by non-protected content (to produce a combined display having appearance similar or identical to a picture-in-picture display in a conventional TV set).

The closed subsystem in an augmented graphics card can be configured to ensure that protected content (i.e., HDCP-encrypted content) is only presented on the output when the output is attached to an HDCP capable device. In some embodiments of this type, the augmented graphics card includes an HDCP authentication mechanism that would allow the augmented graphics card to decrypt the stream from a DDR unit, modify the decrypted data in allowed ways (e.g. rescale it), and then re-encrypt the modified data before sending it to the output. Such embodiments would typically require the addition of components to perform the decryption, one or more memory buffers for holding the data, optional scaling modules, retiming and positioning mechanisms, and a re-encryption mechanism. All of these components would be considered part of the closed subsystem of the augmented graphics card (and of the closed subsystem of the inventive open system), and they would be designed to prevent decrypted data from being observed or routed out of the closed subsystem without HDCP encryption being applied to the data.

Figure 8:
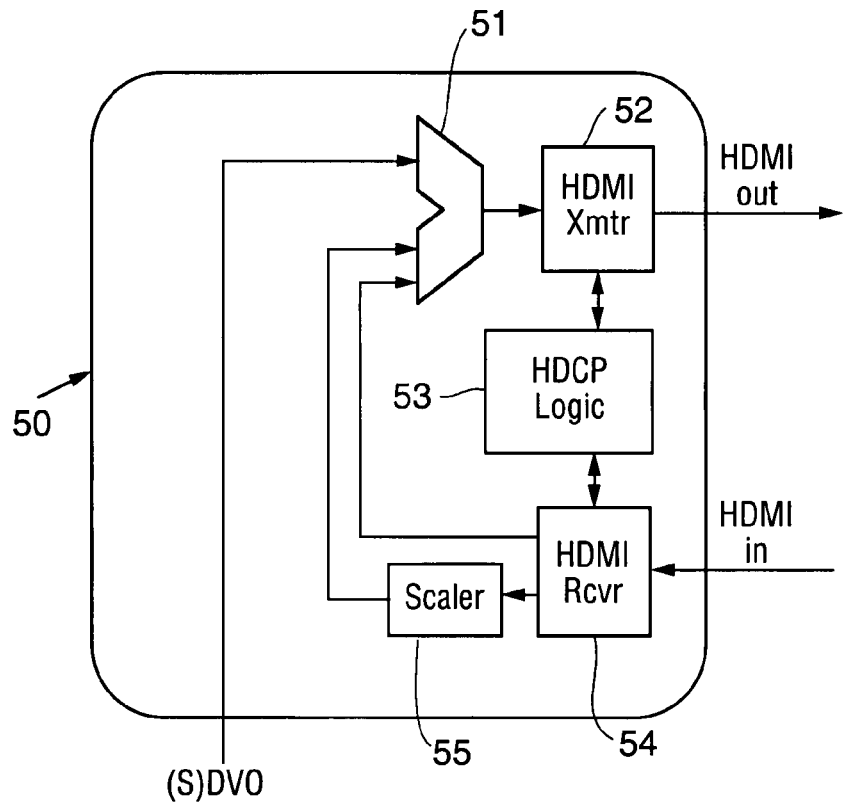
FIG. 8 is a block diagram of a substitute for card 10 of FIG. 4.

For example, ADD card 50 of FIG. 8 (which can replace card 10 of FIG. 7 in the FIG. 4 system) includes HDCP logic 53, HDMI receiver 54, scaler 55, switch 51, and HDMI transmitter 52, connected as shown. One input of switch 51 receives the output of GMCH chip 6 of FIG. 4. When switch 51 passes this data, HDMI transmitter 52 can perform HDCP encryption thereon, and assert the HDCP-encrypted data over an HDMI link to monitor 2. HDMI receiver 54 receives the output of a DDR unit (e.g., the output of HDMI transmitter 33 of disk drive 4 of FIG. 6), and decrypts this data. HDCP logic 53 operates with receiver 54 and transmitter 52 to allow receiver 54 to execute HDCP authentication exchanges with the DDR unit, and to allow transmitter 52 to execute HDCP authentication exchanges with an HDMI receiver in monitor 2. The decrypted content output from receiver 54 can either be asserted directly to a second input of switch 51, or can be scaled in scaler 55 and the output of scaler 55 then asserted to a third input of switch 51. Switch 51 can be controlled to pass the data at any one of its inputs to HDMI transmitter 52. HDMI transmitter 52 performs HDCP encryption on the data passed by switch 51, and asserts the HDCP-encrypted data over an HDMI link to monitor 2.

Transmitter 52 need only perform HDCP encryption on data passed by switch 51 in the case that the data have reached switch 51 as a result of forwarding of HDCP-encrypted data from a DDR unit to HDMI receiver 54 and assertion of a decrypted version of such HDCP-encrypted data by receiver 54 to switch 51 (or by receiver 54 to scaler 55, and from scaler 55 to switch 51). Transmitter 52 need not perform HDCP encryption of data that have been asserted to switch 51 from GMCH chip 6 of FIG. 4 and passed by switch 51 to transmitter 52 (instead, transmitter 52 can send an unencrypted version of this data over the HDMI link to monitor 2).

Figure 9:
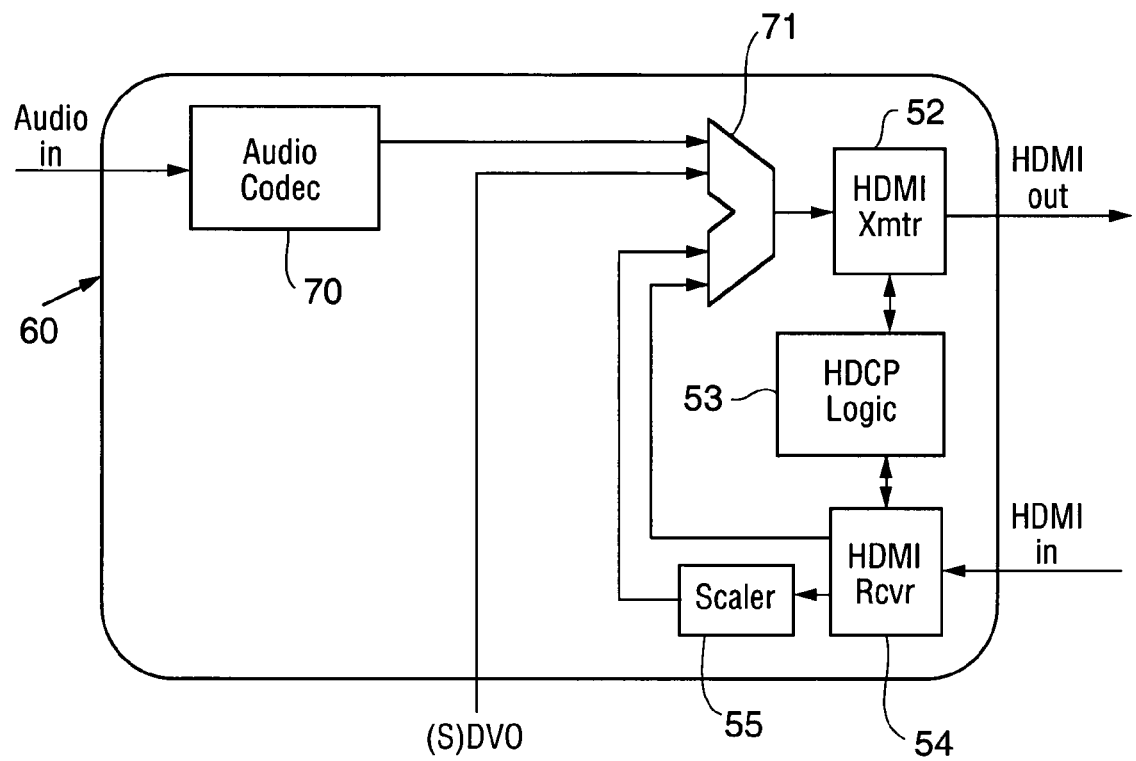
FIG. 9 is a block diagram of a substitute for card 10 of FIG. 4.

For another example, ADD card 60 of FIG. 9 (which can replace card 10 of FIG. 7 in the FIG. 4 system) includes HDCP logic 53, HDMI receiver 54, scaler 55, audio codec 70, switch 71, and HDMI transmitter 52, connected as shown. One input of switch 71 receives audio data output from codec 70 (which can be generated by codec 70 in response to data from GMCH chip 6 of FIG. 4). A second input of switch 71 receives video data output from GMCH chip 6 of FIG. 4. The data passed by switch 71 to HDMI transmitter 52 undergo HDCP encryption in transmitter 52, and the HDCP-encrypted data are asserted over an HDMI link to monitor 2. HDMI receiver 54 receives the output of the DDR unit (e.g., the output of HDMI transmitter 33 of disk drive 4 of FIG. 6), and decrypts this data. HDCP logic 53 operates with receiver 54 and transmitter 52 to allow receiver 54 to execute HDCP authentication exchanges with the DDR unit, and to allow transmitter 52 to execute HDCP authentication exchanges with an HDMI receiver in monitor 2. The decrypted content output from receiver 54 can either be asserted directly to a third input of switch 71, or can be scaled in scaler 55 and the output of scaler 55 then asserted to a fourth input of switch 71. Switch 71 can pass the data at any one of its inputs to HDMI transmitter 52.

Figure 10:
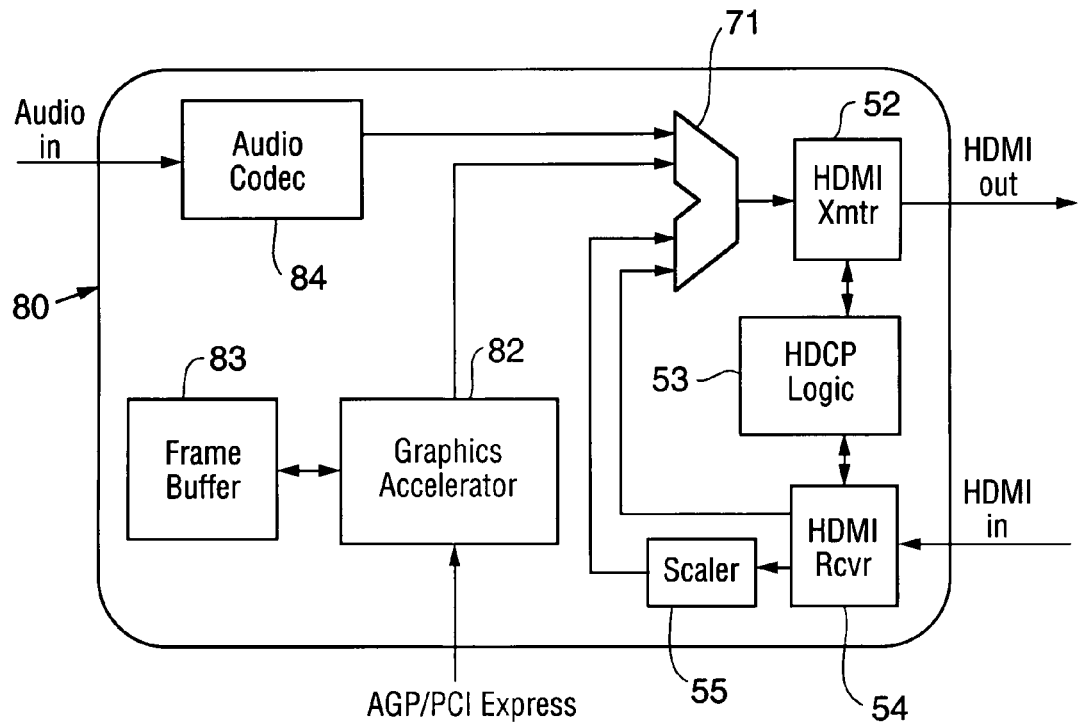
FIG. 10 is a block diagram of a substitute for card 20 in a variation on the FIG. 5 system.
Figure 11:
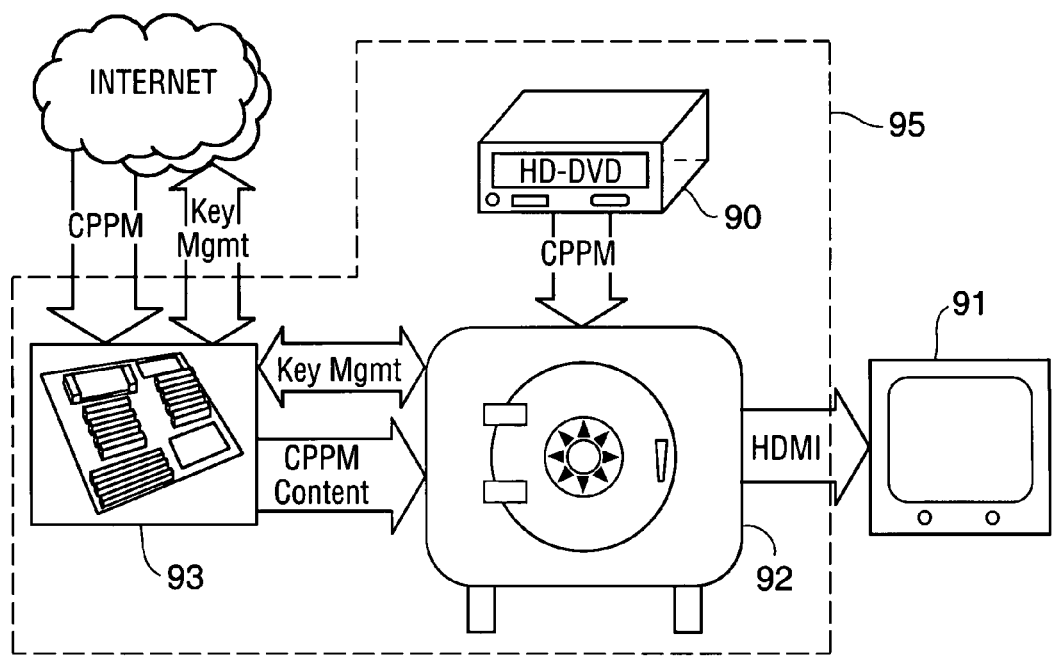
FIG. 11 is a block diagram of another system that can embody the invention.

For another example, media/graphics card 80 of FIG. 10 (which can replace card 20 in variation on the FIG. 5 system in which digital audio data are transmitted with digital video to the monitor, but no analog audio is output from the media/graphics card) includes HDCP logic 53, HDMI receiver 54, scaler 55, audio codec 84, graphics accelerator 82, frame buffer 83, switch 71, and HDMI transmitter 52, connected as shown. One input of switch 71 receives audio data output from codec 84 (which can be generated by codec 84 in response to data from GMCH chip 16 of FIG. 5). A second input of switch 71 receives video data output from graphics accelerator 82. Such video data are typically generated in accelerator 82 in response to data from GMCH chip 16 of FIG. 5, written to frame buffer 83, and then asserted from frame buffer to 83 to switch 71. The data passed by switch 71 to HDMI transmitter 52 undergo HDCP encryption in transmitter 52, and the HDCP-encrypted data are asserted over an HDMI link to monitor 2. HDMI receiver 54 receives the output of the DDR unit (e.g., the output of HDMI transmitter 33 of disk drive 4 of FIG. 6), and decrypts this data. HDCP logic 53 operates with receiver 54 and transmitter 52 to allow receiver 54 to execute HDCP authentication exchanges with the DDR unit, and to allow transmitter 52 to execute HDCP authentication exchanges with an HDMI receiver in monitor 2. The decrypted content output from receiver 54 can either be asserted directly to a third input of switch 71, or can be scaled in scaler 55 and the output of scaler 55 then asserted to a fourth input of switch 71. Switch 71 can pass the data at any one of its inputs to HDMI transmitter 52.

In another class of embodiments, multiplexer 31, decoder 32, HDMI transmitter 33, and SATA interface 34 of FIG. 6 are implemented as a closed subsystem of a PC, separate and independent of a DVD drive (the PC may not even include a DVD drive). For example, multiplexer 31 can be coupled to receive data that have been asserted to PC 1 from the Internet. When multiplexer 31 detects that such data are non-protected content, multiplexer 31 asserts the data to SATA interface 34. Otherwise (e.g., when multiplexer 31 detects that the data from controller 30 are copyrighted content), multiplexer 31 asserts the data from controller 30 to decoder 32. Decoder 32 is configured to perform decryption and decompression of the data (which can be high definition video data, or other video data, for example). HDMI transmitter 33 re-encrypts the resulting raw data (e.g., raw video data) according to the HDCP protocol, and transmits the re-encrypted data over an HDMI link, e.g., directly to ADD card 10 (or a variation thereon) or to media/graphics card 20 (or a variation thereon). The DDR unit would preferably implement secure key exchange, expiration, and revocation mechanisms (e.g., such mechanisms could be implemented within HDMI transmitter 33).

In a variation on the example given in the previous paragraph, SATA interface 34 is replaced by a data interface of some other type (e.g., a PCI, ATA or SCSI interface). More generally, it is contemplated that a wide variety of data transmission interfaces can be employed in any of many types of open systems that embody the teaching of U.S. patent application Ser. No. 10/679,055, and in any of many contemplated closed systems configured in accordance with the teaching of U.S. patent application Ser. No. 10/679,055 to be embedded in open systems. In some cases (e.g., variations on the embodiments described with reference to FIGS. 4 and 6 and the embodiments described below with reference to FIGS. 5, 12, and 13), the open system employs a data interface other than a SATA interface to transfer non-protected data (or both protected and non-protected data) between elements thereof (e.g., from an HD-DVD drive or other disk drive to an I/O controller hub chip of a PC, where the open system is a PC). For example, in some embodiments, the open system employs a PCI, ATA or SCSI interface (with appropriate connector) rather than a SATA interface (e.g., SATA interface 34 with connector 34A as shown in FIG. 6 or SATA interface 36 with connector 36A as shown in FIG. 13) to transfer non-protected data between elements thereof.

In the embodiments described in the second paragraph above, decoder 32 is preferably implemented as a secure decoder (within the DDR unit of the closed subsystem of the inventive open system), so that the DDR unit can be used to deliver Internet based content with the same degree of protection as local HD-DVD disks. In variations on such embodiments, encrypted and compressed data are provided (e.g., from the Internet) to a DDR unit (which is implemented in a closed subsystem of a PC or other open system, but not within a DVD drive) via a SATA port of the DDR unit, and the DDR unit outputs only HDMI re-encrypted data (e.g., over an HDMI link).

For example, if a customer wanted to watch the latest popular movie (where "movie" is sometimes referred to herein as a "title"), the customer's decoder unit (within the DDR unit of the customer's open system) could be given a key, good for a limited time, that is used only once. Then a copy of the movie is sent over the Internet, encrypted on the fly with that key. Only that user would be able to view the title, and only for the limited time. Even if the movie data were intercepted by someone else, or saved to a disk, it would be useless in any other decoder (that does not possess the key) or at any time after the expiration of the key.

An alternative would to be for a distributor to have a key that is valid for a limited duration (e.g., a daily key) per title, and to encode one copy of each title with a new key each day (or other appropriate time period). Any users authorized to view the movie that day would be given the title and the appropriate key, along with an expiration time for the key. Once the time passed, any copies of that instance of the movie would be unplayable. The next day, a new version would be encrypted for that day's customers.

The DDR unit of a closed subsystem of an open system could be used as a digital rights management hub (e.g., within a PDN installed in a user's home). For example, in FIG. 11, DDR unit 92 is included in a closed subsystem of open computing system 95. Open system 95 also includes HD-DVD drive 90. The closed subsystem also includes interface circuitry 93. Within DDR unit 92, encrypted, compressed high-definition video from drive 90 can be decrypted, decompressed, and re-encrypted (in accordance with the HDCP protocol). The re-encrypted data can then transmitted from open system 95 to monitor 91 over an HDMI link. Similarly, encrypted content ("CPPM" data) can be asserted from the Internet, via interface 93, to DDR unit 92. DDR unit 92 (via interface 93) implements any key exchange and verification operations needed to accomplish decryption of the CPPM data, and DDR unit 92 then decrypts (and decompresses if necessary) the data, and then re-encrypts the resulting data (preferably in accordance with the HDCP protocol). The re-encrypted data can then be transmitted from the open system to monitor 91 over the HDMI link. In essence, DDR unit 92 functions as a vault that can securely hold and use keys for a wide variety of uses. But, more than a vault, it contains the resources to convert between protected formats (e.g. HD-DVD and HDCP) inside the hub. The result of this is that neither the keys nor any unencrypted content are ever available for unauthorized use.

In general, software decode (decryption and/or decompression) of media data has advantages over hardware decode when there are a wide variety of formats or when there are a rapidly changing set of formats. This situation is typical of the current world of streaming media available over the Internet for home PC's. There are many competing audio and video formats, and a user typically downloads a new copy of the decoder program when needed.

The general drawback of software decode is that it can consume a significant portion of the processing capability of a system. Because of variations in the processing speed and the application load between systems, a uniformly good presentation is not always possible.

However, when a format is standardized and becomes universal (for example CD and DVD formats) the advantages of software decode are minimal. Usually a special purpose decoder is less expensive than a modern PC processor, and the presentation quality can be guaranteed to be uniformly good. This is because, unlike on a PC, there can be no unexpected applications running on the special purpose decoder.

Another area where hardware decode is advantageous is in maintaining intellectual property protection on the content. If software decode is used, both the keys and the decoded content will be present in plain-text in the PC's memory system. Since other applications can be running at the same time, malicious programs can compromise the protection system. In addition, home users usually have administrator rights on their systems, and can load "Trojan horse" device drivers or use other back-door attacks to gain access to the keys or content. Once the keys are compromised for a mass produced format, the content protection battle is essentially lost. In contrast, since a special purpose hardware decoder would not allow other programs to load and would only permit signed firmware updates, it would be virtually impossible to for all but the most sophisticated crackers to gain access.

The use of special purpose hardware would not preclude software decode of non-copy-protected content. An open system that embodies the present invention, and/or the teaching of U.S. patent application Ser. No. 10/679,055, could treat the valuable intellectual property of content producers differently than non-protected content (e.g., some home movies). Also, secure hardware (e.g., Ingress and Egress circuitry) that embodies the present invention and/or a closed subsystem of an open system (as described in U.S. patent application Ser. No. 10/679,055) can be implemented to prevent software (e.g., consumer video editing software run by the open system) from modifying copy-protected content.

U.S. patent application Ser. No. 10/679,055 also describes a method for protecting content in a computing system having an open system architecture and providing the content to an external system, including the steps of: (a) in a closed subsystem of the computing system, generating raw content by decrypting and optionally performing additional processing on encrypted content; (b) in the closed subsystem, generating protected content by re-encrypting the raw content; and (c) asserting the protected content from the closed subsystem to the external system without providing the computing subsystem access to the protected content. The encrypted content can be received from a source external to the computing system (e.g., via the Internet). The encrypted content can be digital video data read from a disk. Step (a) can include the steps of decrypting the encrypted content to generate decrypted data, and performing decompression on the decrypted data to generate the raw content. In some embodiments, the digital video data are high-definition digital video data read from a disk, and step (a) includes the steps of decrypting the high-definition digital video data to generate decrypted data, and performing decompression on the decrypted data to generate raw content.

Aspects of the present invention are generalizations of teaching (set forth above) of U.S. patent application Ser. No. 10/679,055. These and some other aspects of the present invention are methods and apparatus for protecting content in a PDN (which can but need not be an open computing system of any of the types described with reference to FIGS. 4, 5, 11, and 12). In accordance with some aspects of the present invention, plaintext content and secrets used to accomplish decryption of the content are protected within hardware (e.g., an integrated circuit) in an open computing system or other PDN, and are encrypted whenever present outside such hardware in the PDN.

As will be apparent from the description below, the open computing system of any of FIGS. 4, 5, 11, and 12 can embody the present invention. For example, the open computing system of any of FIGS. 4, 5, 11, and 12 can embody the invention if content transcryption (decryption and re-encryption) is implemented in hardware in a single integrated circuit (an "Ingress Node" implemented as a chip) in disk drive 4 of FIG. 4 or 5, or disk drive 104 of FIG. 12, or DDR unit 92 of FIG. 11, and if no secret present in the Ingress Node (for use in performing the transcryption) is accessible in unencrypted form to software of the open computing system or to any other entity (hardware or software) external to the Ingress Node (e.g., each such secret remains within the Ingress Node or is encrypted whenever present outside the Ingress Node). For example, disk. drive 4 of FIG. 4 can be implemented in accordance with the present invention as a variation on the device shown in FIG. 6 in which elements 32 and 33 are implemented as hardware integrated within a single chip (so there is no need for a secure channel to communicate between decryption circuitry within element 32 and re-encryption circuitry within element 33). Such a chip could be configured as an Ingress Node including Lockbox circuitry configured to obtain (from an external source) any secret not already present within the chip that is needed to perform a desired decryption or re-encryption operation. Optionally, such a variation on the disk drive of FIG. 6 is configured such that encrypted content (from an external content provider) received at SATA interface 34 of the drive can be transferred to decryption circuitry within a transcryption chip (in which elements 32 and 33 are integrated, and which is configured as an Ingress Node) for decryption followed by re-encryption within the chip for output from the drive.

We next describe a class of PDNs that can embody the present invention. For example, PDN 100 of FIG. 14 can embody the invention. PDN 100 includes satellite receiver 120 (typically implemented as a set top box) configured to receive from antenna 102 content that has been transmitted to antenna 102 from a satellite, DVD player 122 (capable of reading content from disc 103), cable receiver 124 (typically implemented as a set top box) configured to receive content transmitted over cable 106, and tuner 126 (capable of receiving and performing any necessary demodulation on content that has been broadcast to antenna 108). Optionally, tuner 126 is configured to for bilateral communication over the Internet with remote server 111 (e.g., to send SSL-encrypted data to and receive SSL-encrypted data from remote server 111). Optionally, receiver 124 has digital video recording capability (e.g., it is configured to record content in storage unit 131 coupled to receiver 124).

PDN 100 also includes audio/video receiver 128, coupled and configured to receive and process audio and video content from any of elements 120, 122, and 124, and to assert the processed content to one or both of video processor 132 and monitor 116. PDN 100 also includes video processor 132, coupled and configured to receive audio and video content from one or both of tuner 126 and receiver 128, to process the video content (e.g., by performing scaling, format conversion, and/or deinterlacing thereon), and to assert the audio and processed video to monitor 118 (and loudspeakers coupled to monitor 118). Processor 132 optionally also has digital video recording capability (e.g., is configured to record the processed content in storage unit 133 coupled to processor 132).

Monitor 118 and loudspeakers are coupled to video processor 132 by an HDMI serial link, and monitor 116 and loudspeakers (not shown) are coupled to receiver 128 by another HDMI serial link.

PDN 100 also includes personal computer ("PC") 130, coupled and configured to receive audio and video content from receiver 124 and to assert the audio and video (or a processed version thereof) to monitor 113, loudspeakers coupled to monitor 113, and optionally also other display or playback devices. Monitor 113 (and loudspeakers) can be coupled to PC 130 by a DVI link, an HDMI link, or another link.

The elements of PDN 100 are coupled to each other in any manner appropriate to their specific implementations, such as by one or more of the well known WiFi, Ethernet, HPNA, MOCA, USB, HomePlug, and 1334 links.

When PDN 100 is implemented in accordance with typical embodiments of the invention, each of elements 120, 122, 124, 126, 128, 130, and 132 is a Node including hardware that implements Lockbox circuitry and one or both of Ingress circuitry and Egress circuitry to be described below. For example, personal computer 130 can include a Lockbox chip, each of elements 120, 122, 124, and 126 can include a chip including Lockbox and Ingress circuitry, each of elements 128 and 132 can include a chip including Lockbox and Egress circuitry, and the Lockbox circuitry of each of elements 120, 122, 124, 126, 128, 130, and 132 can be coupled and configured for communication via software (running on PC 130) with the Lockbox circuitry of each other one of elements 120, 122, 124, 126, 128, 130, and 132. Although FIG. 14 does not show links for bilateral communication between PC 130 and each of elements 120, 122, 124, 126, 128, and 132, such links are present when PDN 100 is implemented in accordance with typical embodiments of the invention (e.g., so that encrypted messages can be exchanged, via software in PC 130, between a Lockbox chip connected along a PCI bus in PC 130 and the chip including Lockbox and Ingress circuitry in any of elements 120, 122, 124, and 126, or between a Lockbox chip connected along a PCI bus in PC 130 and the chip including Lockbox and Egress circuitry in element 128 or 132).

Consider an example in which PDN 100 is implemented in accordance with an embodiment of the invention, and each of elements 128, 130, and 132 is a Node including Lockbox circuitry and Egress circuitry. In this example, the Egress circuitry in each of elements 128, 130, and 132 is operable (provided it has obtained the necessary key data) to decrypt controlled content (e.g., transcrypted content received from another element of PDN 100, or controlled content already in PDN encryption format upon entering PDN 100) to generate decrypted content. Preferably, the decryption is accomplished in such a manner that neither the content in plaintext form, nor any secret used by the Egress circuitry to perform an authorized operation on any version of the content, is accessible by software running on any element of PDN 100 and such that the content is never present in plaintext form within PDN 100 except within secure hardware. In the example, the Egress circuitry in each of elements 128, 130, and 132 is also operable to assert the decrypted content (or a processed version thereof) to an entity (element 116, 113, or 118, respectively) external to PDN 100. In variations on the example, Egress circuitry in each of elements 128, 130, and 132 is operable to assert decrypted content (or a processed version thereof) to an entity (e.g., a variation on element 116, 113, or 118) that is internal to PDN 100 for some purposes (e.g., it includes a subsystem internal to the PDN) but external to PDN 100 for other purposes (e.g., it includes a subsystem internal to the PDN). In general, the decrypted content generated in Egress circuitry of a PDN in accordance with the invention (or a processed version of such decrypted content) is in some cases displayed (or otherwise "consumed") within the PDN and in other cases is consumed external to the PDN.

Figure 14:
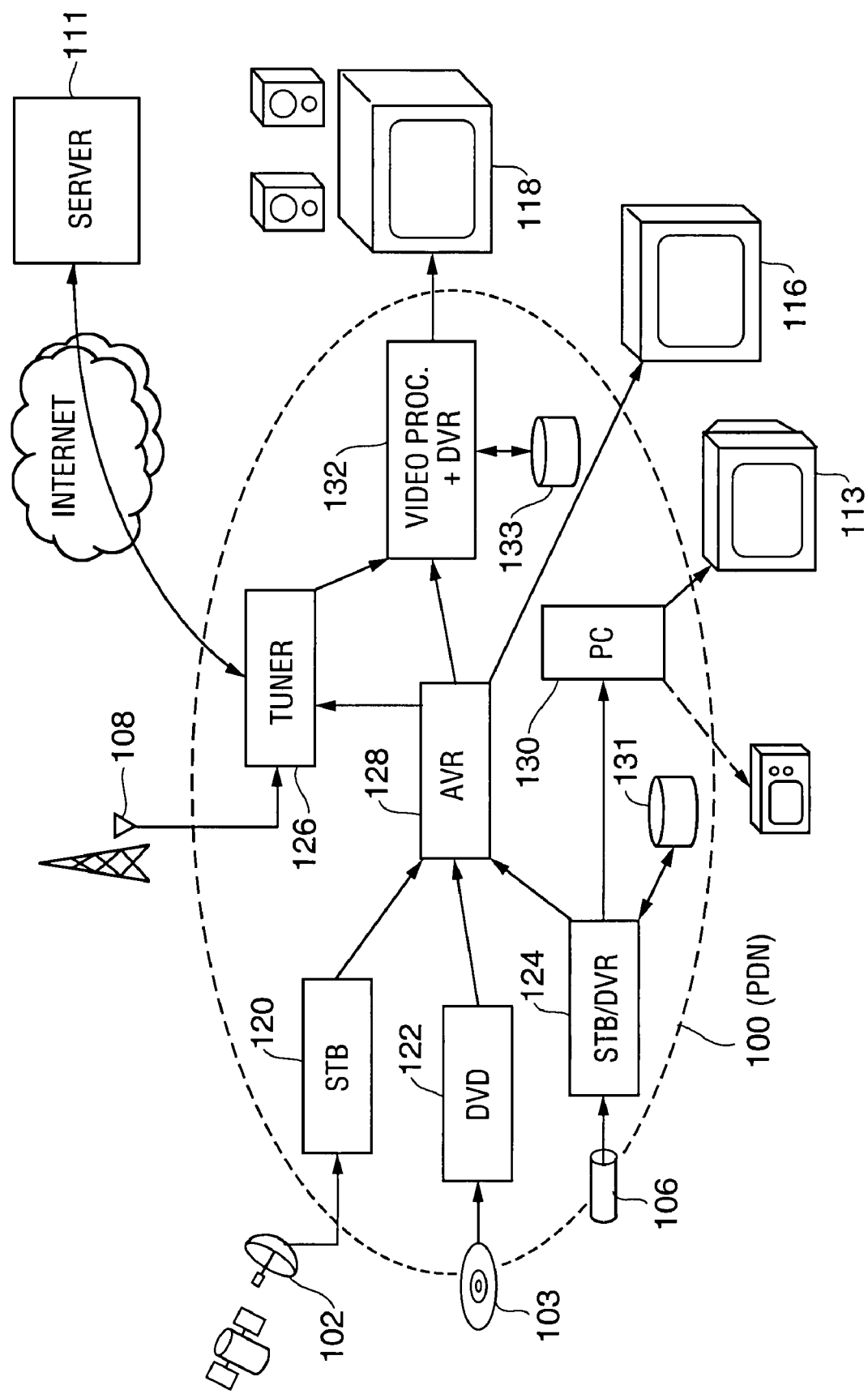
FIG. 14 is a block diagram of a personal digital network ("PDN") that can embody the invention, and various devices and systems coupled to the PDN.

Of course, many types of personal digital networks other than PDN 100 of FIG. 14 (e.g., PDNs that are simpler or more complex than PDN 100) can embody the invention. For example, in a class of embodiments, the invention is a computing system having open architecture and including a CPU (programmed with software) and at least one peripheral device configured to receive encrypted video and audio content (e.g., by reading the content from a high definition DVD or other disc), display a video portion of the content, and accomplish playback of an audio portion of the content. Also, as explained above, PC 1 of FIG. 4 or FIG. 5 can embody the invention.

In typical embodiments, the inventive PDN comprises devices or components (sometimes referred to herein as "Nodes" or "members" of the PDN), each device or component including Lockbox circuitry coupled and configured for bilateral communication with Lockbox circuitry of at least one other Node of the PDN. Each Node can optionally include Ingress and/or Egress hardware (to be described below) as well as Lockbox hardware. Each Node, by itself, is another aspect of the invention.

A Node that includes Ingress circuitry (Ingress circuitry is sometimes referred to herein as an Ingress unit) and Lockbox circuitry will be denoted as an "Ingress Node." A Node that includes Egress circuitry (Egress circuitry is sometimes referred to herein as an Egress unit) and Lockbox circuitry will be denoted as an "Egress Node." Each Ingress Node and Egress Node is capable of receiving content (e.g., one or both of digital video data and digital audio data) subject to a Use Restriction Set and is configured to use the content in at least one way (and optionally, in many or all ways) not forbidden by the Use Restriction Set.

In some embodiments of the inventive PDN, the Lockbox within each Node, the Ingress circuitry within each Ingress Node, and the Egress circuitry within each Egress Node is implemented in hardware. In a class of embodiments of the inventive PDN, each Lockbox, the Ingress circuitry within each Ingress Node, and the Egress circuitry within each Egress Node, is implemented as an integrated circuit or multi-chip set (which can include a microprocessor programmed with firmware) but does not include a CPU programmed with software. In other embodiments, each Node of a PDN that embodies the invention optionally also includes at least one element programmed with firmware or software, subject to the restriction that each Node is configured so that secrets (in unencrypted form) can be manipulated within the Node only in hardware and without revealing any unencrypted secret to software or firmware in the Node. In other embodiments, firmware running on a processor embedded securely within a Node of a PDN may have access to plaintext content and/or secrets used for re-encryption of content (in an Ingress unit) or decryption of re-encrypted content (in an Egress unit), but neither the plaintext content nor any such secret is present at any node, link or interface of the PDN that is accessible (or at least readily accessible) to a user or entity seeking to obtain unauthorized access thereto. Encrypted secrets (e.g., secrets that have been encrypted in hardware in a Node in accordance with the invention) can be revealed (in encrypted form) to software or firmware within the Node or to entities outside the Node. The Ingress circuitry within each Ingress Node, and the Egress circuitry within each Egress Node includes secure hardware and optionally also includes at least one element programmed with firmware or software, but the Ingress circuitry and/or Egress circuitry in each Node is configured to manipulate secrets (in unencrypted form) only in hardware and without revealing any such secret (in unencrypted form) to any entity external to the Node or to software or firmware in the Node.

The Lockbox within a Node typically includes (but need not include) secure hardware, and can but need not include at least one element programmed with firmware or software. In some embodiments, a Lockbox (e.g., a Lockbox within any of elements 120, 122, 124, 126, 128, 130, and 132) consists entirely of hardware (or hardware including a microprocessor programmed with firmware). In other embodiments, a Lockbox (e.g., a Lockbox within any of elements 120, 122, 124, 126, 128, 130, and 132) is or includes a processor or computing system programmed with firmware or software (e.g., the CPU of PC 130 of some implementations of FIG. 14 could be programmed with software that functions as a Lockbox for one of elements 120, 122, 124, 126, 128, 130, and 132, so that PC 130 and the relevant one of elements 120, 122, 124, 126, 128, 130, and 132 together function as a Node of a PDN). A Lockbox could be programmed with software for managing key libraries or moving messages to or from the Lockbox and another Lockbox. In some embodiments, a PC (e.g., PC 130 of some implementations of FIG. 14) itself functions as a Node of a PDN, e.g., in cases in which the PC includes a Lockbox consisting entirely of hardware and also in cases in which a CPU of the PC is programmed with software that functions as a Lockbox. More generally, however, each Node (and each Lockbox within a Node) is configured to manipulate secrets (for use for content protection in a PDN including the Node) only in such a manner that none of the secrets is revealed (in unencrypted form) to any entity external to the Node (or to software or firmware within the Node). If a Lockbox is implemented in software, the Lockbox software would necessarily be restricted in critical ways (at least so that when the software has access to encrypted secrets, it cannot decrypt the secrets, and so that the software cannot effectively alter any Use Restriction Set for content to be protected by a PDN that includes the Lockbox). In a class of embodiments, a Node (and/or a Lockbox within a Node) is configured to manipulate unencrypted versions of secrets (for use for content protection in a PDN including the Node) in secure hardware in a manner preventing any of the secrets from being revealed (in unencrypted form) to any entity external to the Node (or to software or firmware in the Node, if software or firmware is present within the Node).

Figure 15:
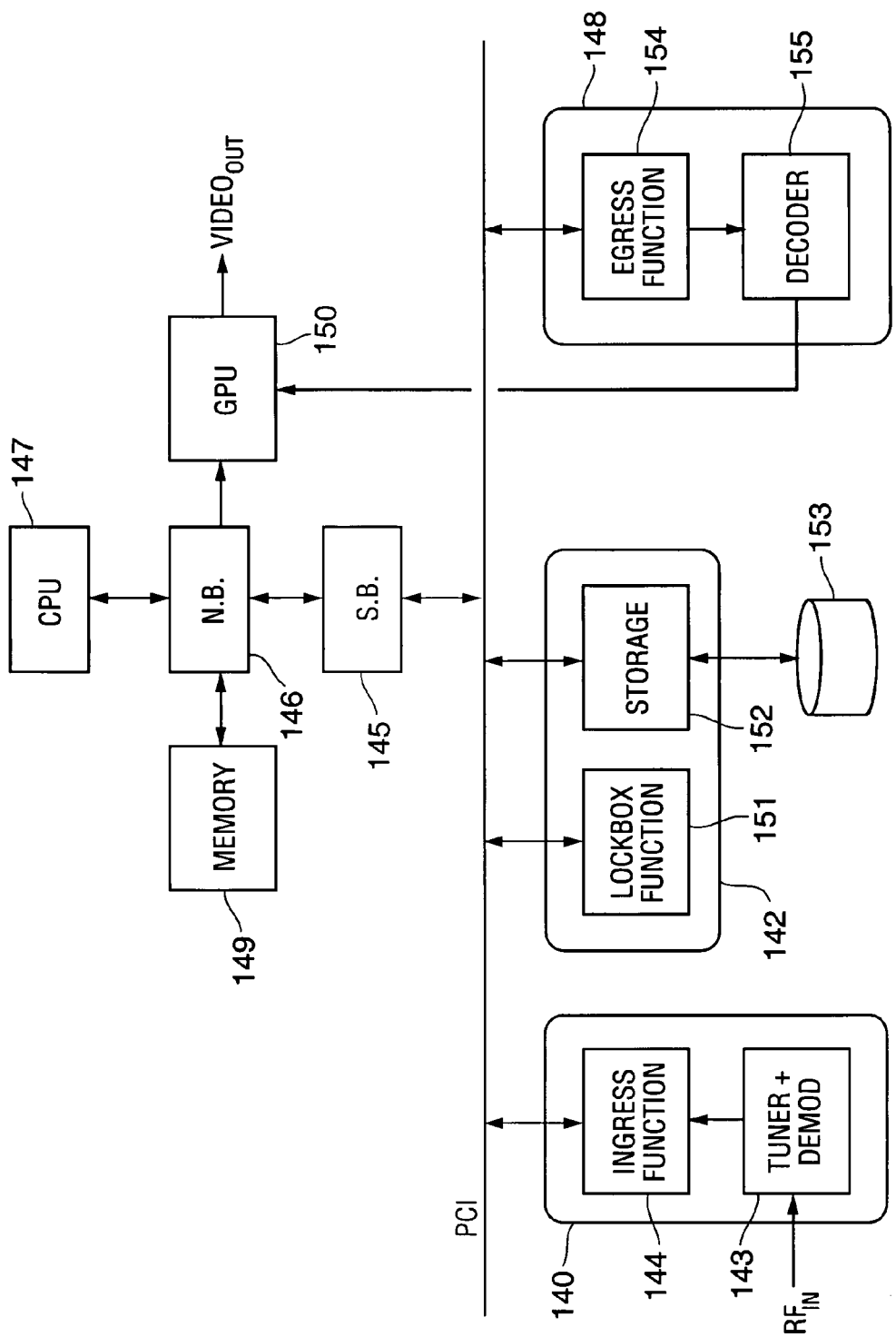
FIG. 15 is a block diagram of an open architecture computing system that embodies the invention and includes devices connected along a PCI bus.

A class of embodiments of the invention will be described with reference to FIG. 15. In these embodiments, the invention is a computing system having open architecture and including devices connected along a bus (e.g., a PCI bus). The system is configured to receive encrypted video and audio content (e.g., by reading the content from a high definition DVD or other disc, or receiving broadcast content or content transmitted over a cable) and can display a video portion and play an audio portion of the content. FIG. 15 is a block diagram of a portion of such a system, including PCI /// (peripheral communications interconnect) bus, CPU 147, I/O controller (e.g., a "Southbridge" chip or "I/O controller hub") 145 coupled to the PCI bus, and graphics and memory controller (e.g., a "Northbridge" chipset or "graphics and memory controller hub") 146 coupled between controller 145 and CPU 147. Memory 149 and graphics processing unit ("GPU") 150 are coupled to controller 146.

GPU 150 is coupled to an external audiovisual system, typically including a monitor (e.g., an HDTV monitor including an HDMI receiver) and loudspeakers driven by the monitor.

Three additional chips (or chip sets) are connected along the PCI bus: chip (or chip set) 140 including tuner and demodulation circuitry 143 and circuitry 144 (including Ingress and Lockbox circuitry), chip (or chip set) 142 including Lockbox circuitry 151 and storage circuitry 152; and chip (or chip set) 148 including circuitry 154 (including Egress and Lockbox circuitry) and decoder circuitry 155. For simplicity, circuits 140, 142, and 148 will be referred to as "chips" although they can be multi-chip sets or single chips. If any of circuits 140, 142, and 148 is implemented as a multi-chip set, the chip set should be implemented such that neither plaintext content therein nor any unencrypted secret (e.g., unencrypted key data and/or certificate) therein is ever exposed outside individual chips of the set or is otherwise protected against access (in unencrypted form) by any entity outside the set. Optionally, external storage unit 153 is coupled to storage circuitry 152. Typically, chips 140, 142, and 148 are implemented as a card (e.g., "multimedia graphics card") configured to be conveniently inserted in a personal computer.

For convenience, lockbox circuitry 151 will sometimes be referred to herein as "Lockbox" 151. Also, the Ingress circuitry within block 144 will sometimes be referred to as an Ingress unit, and the Egress circuitry within block 154 will sometimes be referred to as an Egress unit.

In a typical implementation, circuitry 143 is configured to receive and demodulate broadcast video and to assert digital video and audio (indicative of the received content) to the Ingress unit within circuitry 144. Typically, the digital content asserted to the Ingress unit is encrypted and the Ingress unit is configured to decrypt it (to place it in plaintext form) and to encrypt the plaintext content (i.e., to re-encrypt it, assuming it was encrypted when received by the Ingress unit) before the plaintext content is exposed outside the Ingress unit. The re-encrypted content is then asserted via the PCI bus to another element of the system. As will be explained in more detail below, the Ingress unit (within circuitry 144) re-encrypts the content using an encryption protocol that is immune to man-in-the-middle attacks. In a typical implementation, unit 144 re-encrypts the content using the well known Counter ("CTR") mode variant of the conventional 256 bit Advanced Encryption Standard ("AES") protocol. Because the content is decrypted into plaintext form in hardware (in circuitry 144) and then re-encrypted in accordance with the invention before it leaves the decryption hardware, the content is well protected within the FIG. 15 system.

In all embodiments of the invention, the cryptographic protocol employed for re-encryption (in an Ingress unit) should be immune to man-in-the-middle attacks. In typical embodiments, the cryptographic protocol should also allow the re-encrypted content to be decrypted by an Egress Node that does not communicate directly (in "real time") with the Ingress Node in which the re-encrypted content is generated. Any of many different cryptographic protocols that satisfy the first and preferably also the second of these criteria may suitable, depending on the particular application. For example, the Ingress Node can be implemented to perform re-encryption in accordance with any of the stronger variants of the AES protocol in at least some applications. The CTR mode variant of the 256 bit AES protocol is likely to be suitable in many applications since it is one of the stronger AES variants, is easy to implement in hardware (e.g., pipelined circuitry) in an integrated circuit, and has verifiable security characteristics. Among the other operational modes of the AES protocol are "Output Feedback" (OFB) modes, "Cipher Feedback" (CFB) modes, "Electronic Code Book" (ECB) modes, and "Cipher Block Chaining" (CBC) modes, any of which may also be suitable for implementing Ingress Nodes in some embodiments of the invention. A Node that embodies the invention could be implemented to employ any selected one of at least two different cryptographic protocols to re-encrypt content to be shared with other Nodes. Preferably, Nodes will be implemented to employ no more than a small number of different protocols to re-encrypt content to be shared among Nodes, to reduce the cost of implementing each Node and maximize interoperability.

Content that enters the FIG. 15 system (via chip 140) comes with a use restriction set (defined above). Primitives indicative of the use restriction set (and at least one secret associated with each such set) are prestored persistently in Lockbox 151 within chip 142 (or in storage unit 153 associated with Lockbox 151). Typically, before chip 140 begins to receive, decrypt, and re-encrypt the content, Lockbox 151 will have confirmed that chip 140 is authorized to perform these operations and provided chip 140 with any secrets (e.g., content keys) necessary for performing the operations. The primitives and secrets used by Lockbox 151 can be stored in nonvolatile memory (or volatile memory) within Lockbox 151 or in memory (e.g., storage unit 153) remote from Lockbox 151 but accessible (e.g., in a secure way via storage circuitry 152) in nonencrypted form only by Lockbox 151. For example, a satellite provider can load the primitives and secrets into Lockbox 151 (after establishing that Lockbox 151 is authorized to receive them), and Lockbox 151 can provide relevant ones of the secrets as content keys to Lockbox circuitry within circuitry 144 (and/or to Lockbox circuitry within circuitry 154) when Lockbox 151 determines that it is appropriate to do so (typically as a result of exchanges with the Lockbox circuitry within circuitry 144 or 154 over secure channels).

It may be preferred in some applications to omit elements 152 and 153 from the FIG. 15 system, and instead to include sufficient nonvolatile memory within Lockbox 151 to meet all of Lockbox 151's persistent storage needs. In other applications, it may be preferred to implement Lockbox 151 with less nonvolatile memory (or no nonvolatile memory) and also to provide storage circuitry 152 (connected along the PCI bus) and storage unit 153 (coupled to circuitry 152) to allow Lockbox 151 to read data from unit 153 (via circuitry 152) and cache the data (in memory within Lockbox 151) as needed in a secure manner. For example, all data stored in unit 153 (so as to be accessible by Lockbox 151 via circuitry 152) can be encrypted data. This encrypted data can be decrypted (within Lockbox 151) before being cached within or used by Lockbox 151. Such data would be transferred in encrypted form from unit 153 to Lockbox 151 via circuitry 152 when Lockbox 151 initiates a read operation to access the data from unit 153.

Storage unit 153 is typically a nonvolatile storage unit, but could (in some embodiments) be a volatile memory. In some embodiments, Lockbox 151 includes volatile memory but no nonvolatile memory.

Typically, on power up, Lockbox circuitry within circuitry 144 establishes a secure channel with Lockbox 151, and Lockbox circuitry within circuitry 154 establishes a secure channel with Lockbox 151, using standard cryptographic means so the process of establishing each secure channel (and the operation of using the secure channel once it has been established) is invulnerable to attacks (preferably all attacks, including but not limited to man in the middle attacks, brute force attacks, differential fault analysis attacks, and replay attacks). When the process is invulnerable to man in the middle attacks, a device ("man") having access to messages sent between circuitry 144 (or 154) and Lockbox 151 (e.g., during an authentication exchange preliminary to establishing the secure channel) could neither read the messages nor generate modified versions of the messages that are intelligible to the intended recipient. Replay attacks could easily be prevented by standard cryptographic means, e.g., by configuring the devices (circuitry 144 and Lockbox 151, or circuitry 154 and Lockbox 151) to use a random session key that is used only once (for one session) to establish a secure channel between the devices. A man in the middle could deny service (i.e., disrupt the establishment of the secure channel), but this is the only attack that it could successfully implement.

When circuitry 144 is ready to receive and process content, Lockbox circuitry within circuitry 144 may send a request to Lockbox 151 (via a secure channel established in a manner to be described below) to determine whether circuitry 144 is authorized to decrypt and re-encrypt the content. Lockbox 151 can make this determination because the request from circuitry 144 specifies uses to be made of the content, and because Lockbox 151 knows what uses of the content are proscribed by the Use Restriction Set and Lockbox 151 knows the identity and capabilities of circuitry 144 (because circuitry 144 has proved its identity to Lockbox 151 during the exchange that established a secure link between Lockbox 151 and circuitry 144), and because Lockbox 151 is configured to compare relevant data in the request with data indicative of the uses proscribed by the Use Restriction Set. If Lockbox 151 determines that circuitry 144 is authorized to perform the requested operations (e.g., to decrypt and re-encrypt the content), Lockbox 151 provides to circuitry 144 a secret (i.e., a content key) that Ingress circuitry within circuitry 144 needs in order to perform these operations. The Ingress circuitry within circuitry 144 does not store the key persistently (it has no memory in which to do so), can perform on the content only the operations that the secret enables it to perform, and can perform these operations only for a limited time (i.e., during a session) in which the key is valid.

When circuitry 144 (or circuitry 154, as will be explained below) has received a content key from Lockbox 151, there typically are restrictions associated with what circuitry 144 (or 154) can do using the key. Each of units 144 and 154 is built so that each must comply with such restrictions. For example, the key may authorize circuitry 154 to decrypt content, re-encrypt the decrypted (plaintext) content using the HDCP protocol, and cause the HDCP-encrypted content to be transmitted over an HDMI link, provided that the HDCP-encryption and HDMI transmission operations must stop if circuitry 154 determines that HDCP security has been breached (i.e., if circuitry 154 determines that the HDMI receiver is not authorized). Each of units 144 and 154 is built to be operable only in exactly the authorized manner.

In order for content to leave the FIG. 15 system, the content (in re-encrypted form) must be asserted over the PCI bus to chip 148 for decryption within chip 148 by Egress circuitry within circuitry 154. Chip 148 typically also re-encrypts the plaintext content (e.g., using the HDCP protocol) for output without exposing the plaintext content outside the chip 148 (e.g., the content is re-encrypted for output from the FIG. 15 system before it leaves chip 148). Circuitry within chip 148 (e.g., decoder 155) also performs any needed decompression on the decrypted (plaintext) content, and optionally also performs additional processing (e.g., formatting and/or re-encryption for output) on the decrypted and decompressed plaintext content. For example, in some implementations, chip 148 places the plaintext content into HDMI (or DVI) format for output to graphics processing unit 150 and output from unit 150 over an HDMI (or DVI) link to an external device or system, including by re-encrypting the content using the HDCP protocol employed conventionally to encrypt data to be transmitted over an HDMI (or DVI) link. As will be explained in greater detail below, chip 148 is capable of outputting content (to GPU 150) only in an authorized manner and in authorized format. For example, if the FIG. 15 system is authorized to output the content over an HDMI link in HDCP-encrypted format, chip 148 re-encrypts the content using the HDCP protocol and asserts it to GPU 150 in HDCP-encrypted HDMI format for transmission from GPU 150 over an HDMI link, so that only a licensed HDMI receiver (e.g., in a high definition monitor) can decrypt and display the HDCP-encrypted content. For another example, if the FIG. 15 system is authorized to output an analog version of the plaintext content and chip 148 includes a DAC (digital-to-analog conversion circuit), chip 148 could employ the DAC to generate an analog signal indicative of the plaintext content and output the analog signal to GPU 150 or to a connector (not shown) accessible by a device or system (e.g., an analog display device) external to the FIG. 15 system. In order to bypass the protection afforded by the FIG. 15 system, it would be necessary to execute the very difficult (and typically impractical) operation of breaking into one or more of chips 140 and 148 and modifying (or essentially modifying) circuitry within each opened hardware unit.

When Egress circuitry within circuitry 154 is ready to receive and process re-encrypted content (from a device connected along the PCI bus), circuitry 154 may send a request to Lockbox 151 (via a secure channel established in a manner to be described below) to determine whether circuitry 154 is authorized to decrypt and further process the content. Lockbox 151 can make this determination because the request from circuitry 154 specifies uses to be made of the content, and because Lockbox 151 knows what uses of the content are proscribed by the Use Restriction Set and Lockbox 151 knows the identity and capabilities of circuitry 154 (because circuitry 154 has proved its identity to Lockbox 151 during the exchange that established a secure link between Lockbox 151 and a Lockbox within circuitry 154), and because Lockbox 151 is configured to compare relevant data in the request with data indicative of the uses proscribed by the Use Restriction Set. If Lockbox 151 determines that circuitry 154 is authorized to perform the requested operations (e.g., to decrypt and further process the re-encrypted content), Lockbox 151 provides to circuitry 154 a secret (i.e., a content key) that circuitry 154 needs in order to perform these operations. Egress circuitry within circuitry 154 does not store the key persistently (it has no memory in which to do so), can perform on the content only the operations that the secret enables it to perform, and can perform these operations only for a limited time (i.e., during a session) in which the key is valid.

Secure channels for bilateral communication between Lockbox 151 and Lockbox circuitry within circuitry 144 (or circuitry 154) can be established in any of a variety of different ways, including in the manner described below with reference to FIGS. 18 and 19 in which secure channels are established between Lockboxes of FIG. 18.

In variations on the FIG. 15 embodiment, chip (or chip set) 142 is omitted. In such alternative embodiments, each of chips 140 and 148 (each of which could be a chip set) would employ its own Lockbox circuitry (e.g., Lockbox circuitry within block 144) as necessary, e.g. to obtain needed keys from other Lockbox circuitry.

In general, either of two different kinds of authentication protocols can be employed for communication between devices (e.g., Lockboxes) of the inventive PDN: explicit (e.g., two stage) authentication; and implicit (e.g., one stage) authentication. Explicit authentication should be used wherever the devices may be strangers to each other, and typically employs public key cryptography and a full authentication exchange (including certificates). Implicit authentication can be used wherever the devices necessarily know each other (e.g., because of a fundamental relationship that is permanently established during the process of manufacturing the devices). Explicit authentication protocols will be fundamentally between black boxes, so that they need to be well standardized (in the sense that all Nodes of a PDN (except for Nodes implemented within a single chip and possibly also Nodes implemented within a single closed system), and all devices that can potentially become Nodes of the PDN, are configured to employ the same (standard) explicit authentication protocol when they communicate with each other. Implicit authentication protocols are typically used within a chip (or possibly, between devices within a single closed subsystem of a PDN), and can be non-standardized and application dependent. For example, if a lockbox and ingress circuitry are within the same chip, communication between them may not require any special protocol at all. Or, if two devices are implemented in different chips made by the same manufacturer and specifically designed to work together, then a proprietary protocol may be used for communication between them as long as it hides secrets sufficiently well.

In a class of embodiments, the inventive PDN is configured to prevent content within the PDN from being removed from the PDN in a form such that the content can be used outside the PDN in an unauthorized way, and to prevent content from being used within the PDN in an unauthorized way. Content entering such a PDN is immediately transcrypted (decrypted and re-encrypted) by Ingress hardware (typically implemented as an integrated circuit), unless the content is already encrypted in accordance with the same protocol used for the re-encryption phase of such transcryption operation, and neither the plaintext content nor any unencrypted secret used by the PDN to perform the decryption and re-encryption is accessible outside an integrated circuit of the PDN. The re-encrypted content output from the Ingress circuitry can be transferred freely (even in an insecure manner) among devices within the PDN, can be accessible by software within the PDN or even to hardware or software external to the PDN, and can be stored in an insecure manner in devices of the PDN (e.g., on a disk in a disk drive of the PDN). Only Egress circuitry within the PDN will have the secret(s) needed to decrypt the re-encrypted content to generate a plaintext version of the content. The Egress circuitry can obtain these secret(s) only from a Lockbox within the PDN, and only after the Egress circuitry has proved its identity to the Lockbox and proved to the Lockbox that the Egress circuitry is authorized to perform specified operations on the content, and after a secure channel has been established between the Lockbox and Egress circuitry for transmitting the secret(s) from the Lockbox to the Egress circuitry. Thus, even if the re-encrypted content is removed from the PDN (e.g., if a disk containing the re-encrypted data is removed from the PDN), the re-encrypted content cannot (as a practical matter) be decrypted or used in an unauthorized way. The re-encrypted content has been encrypted into a form unique to the PDN, so that the PDN need not bother to secure the re-encrypted content. In contrast, it has been proposed in the art to protect content within a PDN by attempting to lock content securely within each element of the PDN and attempting to secure all the links between elements of the PDN.

A class of embodiments of the inventive personal digital network (PDN) will be described with reference to FIGS. 16 and 17. PDN 168 of FIG. 16 embodies the invention and includes Ingress Node 160 (implemented as an integrated circuit, and including Lockbox and Ingress circuitry), Node 161 (implemented as another integrated circuit, and including Lockbox circuitry), Egress Node 162 (implemented as a third integrated circuit, and including Lockbox and Egress circuitry), video processor 175, storage controller 176, and video processor 177, connected as shown. Storage unit 178 is coupled to and controlled by controller 176, and is external to PDN 168. Content provider 163 and Lockbox circuitry within node 161 are configured to establish a secure communication channel 164 between each other, and to communicate with each other over the secure channel. Content provider 163 is not shown in FIG. 17, since FIG. 17 assumes that content provider 163 has provided rights data 190 and key data 191 to Node 161, that data 190 and 191 have been stored in nonvolatile memory in Lockbox circuitry within Node 161, and that communication between content provider 163 and Node 161 has terminated.

The re-encryption protocol employed in accordance with the invention by Ingress circuitry (e.g., within circuitry 144 of FIG. 15 or Node 160 of FIG. 16) to re-encrypt decrypted (plaintext) content, and by Egress circuitry (e.g., within circuitry 154 of FIG. 15 or Node 162 of FIG. 16) to decrypt the re-encrypted content, should be immune to man-in-the-middle attacks. Typically, the re-encryption protocol is not a link protection protocol (e.g., the HDCP protocol) that requires that both the transmitter of encrypted data and the receiver (the device that is to receive and decrypt the data) communicate directly with each other in a session that includes an authentication exchange between the transmitter and receiver, determination of key data to be used during the session (e.g., generation of key data in the transmitter and receiver, or provision of key data from a key giver to each device that needs the key data), and transmission of the encrypted data to the receiver. Rather, the re-encryption protocol is typically a protocol (e.g., the 256 bit AES protocol in CTR mode) of a type requiring only that the transcryption circuitry have obtained the key data it needs to perform re-encryption by the time the content transcryption commences, without requiring that the key giver, transcryption circuitry, and content provider communicate directly with each other (e.g., in "real time" during a single session). In preferred embodiments of the inventive PDN, certificates needed to establish a secure link between Lockboxes of different Nodes are prestored in the Lockboxes. Alternatively, when a self-certifying type of asymmetric encryption is used to establish a secure link between Lockboxes, the certificates used to establish the secure link are implicit in the mathematical computations performed by the Lockboxes during the link-establishing exchange, so that no certificates need to be pre-stored in the Lockboxes for use in such an exchange. Once the secure link has been established, one Lockbox sends a content key to another over the secure link. The content key can function both as an instruction to Ingress circuitry to begin to receive, decrypt, and re-encrypt content (or an instruction to Egress circuitry to begin to receive and decrypt re-encrypted content), and as the key needed by the Ingress (or Egress) circuitry to perform authorized cryptographic operations. Each Ingress Node (which contains Ingress circuitry by definition) is configured so that it cannot operate to receive and transcrypt content without first receiving an instruction to do so (e.g., in the form of a key) from a Lockbox. Each Egress Node (which contains Egress circuitry by definition) is configured so that it cannot operate to receive and decrypt re-encrypted content without first receiving an instruction to do so (e.g., in the form of a key) from a Lockbox. The invention relies on a chain of trust between Lockboxes, and between Lockboxes and content provider, but does not (in typical implementations) require that all of the Lockboxes and content provider communicate directly with each other (e.g., in "real time" during a single session). Rather, in preferred embodiments of the inventive PDN, the Lockboxes and content provider can, in effect, communicate indirectly with each other (not in real time or during a single session).

Figure 16:
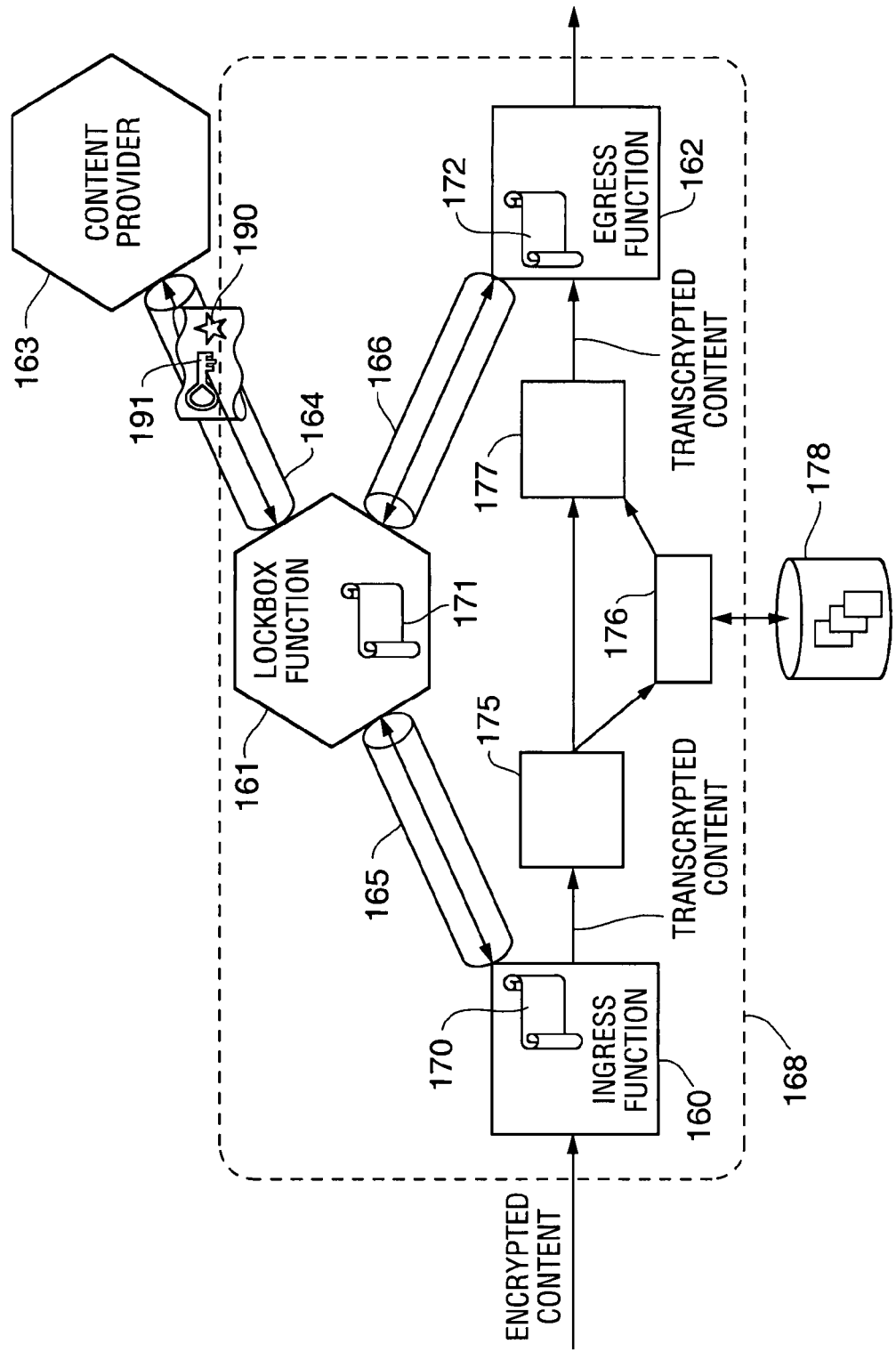
FIG. 16 is a block diagram of some elements (e.g., Ingress Node 160, Node 161, and Egress Node 162) of a personal digital network (PDN 168) that embodies the invention, a storage unit (178) coupled to the PDN, and a content provider (163) that can communicate with the PDN.
Figure 17:
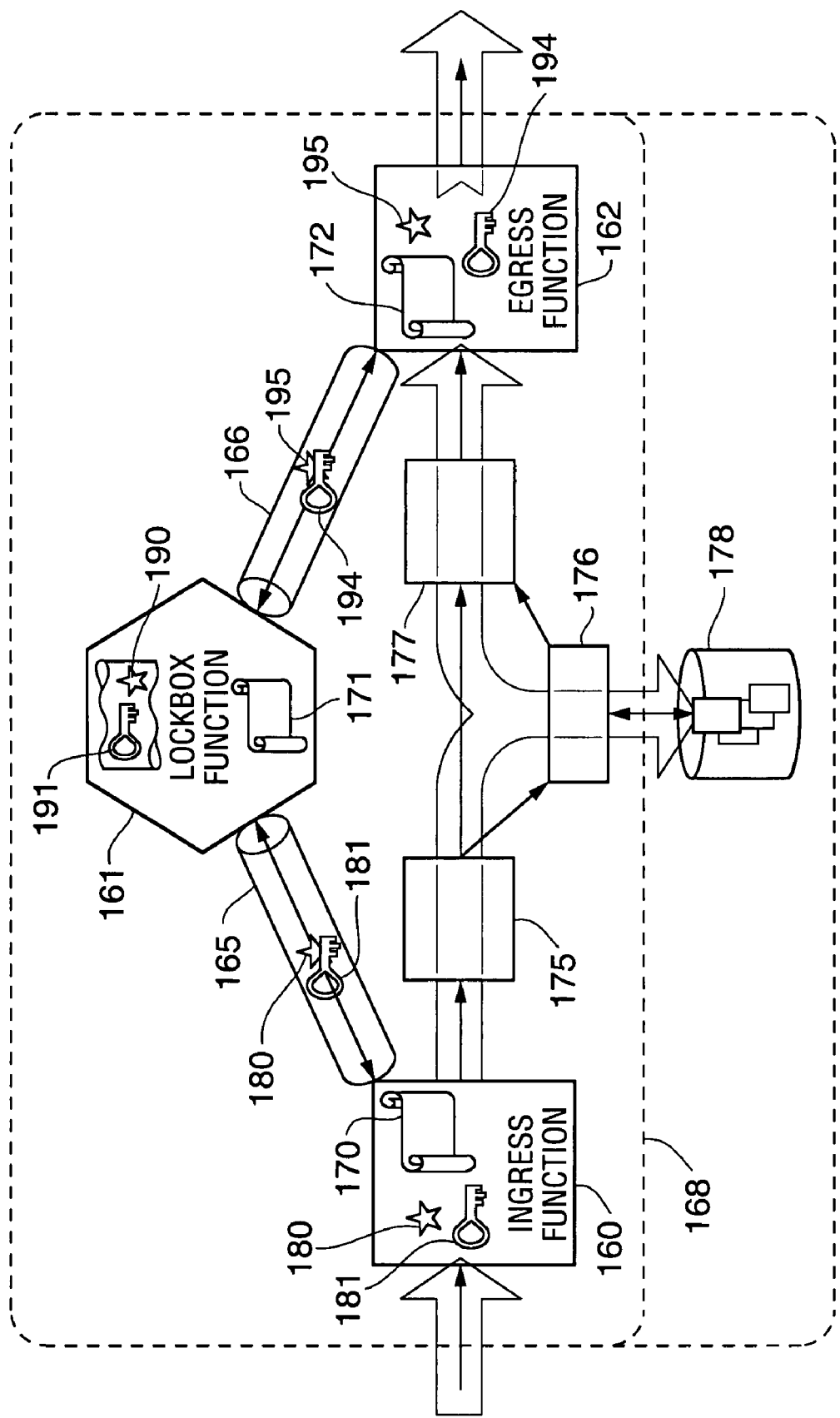
FIG. 17 is a block diagram of PDN 168 and storage unit 178 of FIG. 16, with PDN 168 in a different state than shown in FIG. 16.

In the example of FIG. 16, certificate data 170 are stored in Ingress Node 160, certificate data 171 are stored in Lockbox circuitry within node 161, and certificate data 172 are stored in Lockbox circuitry within node 162. Certificate data 171 can be stored in node 161 at the time of manufacture. Certificate data 170 and 172 can include data stored respectively in Nodes 160 and 162 at the time of manufacture of Nodes 160 and 162, and can also include data (e.g., data that determine a "marriage certificate" of a type described below) stored respectively in Nodes 160 and 162 (after manufacture) by node 161 during "marriage" operations (of a type to be described below) in which Nodes 160 and 162 (or a device including each of them) become recognized as elements of PDN 168. Before Lockbox circuitry within node 161 will respond to a request from Ingress Node 160 for a key (needed for Ingress circuitry within Node 160 to perform a transcryption operation on content to be received), Ingress Node 160 and Node 161 must have performed an authentication exchange using prestored certificate data 170 and 171 to establish secure channel 165 (between them) over which the key can be transmitted from Node 161 to Ingress Node 160. Then, when Ingress Node 160 wishes to receive, decrypt, and re-encrypt content, Lockbox circuitry within Ingress Node 160 asserts a key request to Lockbox circuitry within Node 161 over the secure channel. The key request is indicative of the operations to be performed on the content (e.g., the key request includes rights data 180 indicative of the operations to be performed on the content). The Lockbox then decides whether to grant the key request, for example by comparing rights data 180 from Node 160 (identified as a star marked with a question mark within Node 161 in FIG. 17) with rights data 190 (prestored in Node 161) indicative of the operations that Ingress Node 160 is authorized to perform. If Node 161 decides to grant the key request, Node 161 sends the key (e.g., key data 181 of FIG. 17) to Ingress Node 160 over secure channel 165. Ingress circuitry within Node 160 has no nonvolatile memory in which to store the key, and thus the key cannot be used by the Ingress circuitry after Node 160 powers up (after powering down).

In operation of some embodiments of the inventive PDN an external device (e.g., a device operated by a content provider) transmits to a lockbox (of the PDN) rights data (needed by the PDN to establish which elements of the PDN are authorized to perform transcryption of content) and key data needed by elements of the PDN to perform transcryption on content. The lockbox stores the rights data and key data persistently (e.g., in nonvolatile memory within the lockbox) for later use. For example, as indicated in FIG. 16, content provider 163 can transmit rights data 190 and key data 191 to Lockbox circuitry within Node 161, and the Lockbox circuitry can then store data 190 and 191 persistently as indicated in FIG. 17. More specifically, in the example of FIGS. 16 and 17, content provider 163 and Lockbox circuitry within Node 161 establish a secure channel 164 (after performing an authentication exchange to establish a trust relationship and establishing that Node 161 is authorized to receive key data and rights data). Content provider 163 then sends rights data 190 and key data 191 to Node 161 over channel 164. Lockbox circuitry within Node 161 stores the data 190 and 191 in nonvolatile memory within Node 161. Then, when Ingress circuitry within Ingress Node 160 is ready to receive content from an outside source (e.g., from content provider 163 or a source authorized by content provider 163), Ingress Node 160 obtains (from the content provider) rights data 180 that indicate the operation(s) that the content provider assumes Ingress Node 160 will perform on content to be provided to Ingress Node 160. Lockbox circuitry within Ingress Node 160 then asserts a request to Lockbox circuitry within Node 161 over secure channel 165 (which has been established between Nodes 160 and 161 at power up of Node 160). The request includes rights data 180. In response to the request, the Lockbox compares rights data 180 with rights data 190 (prestored in Node 161). Rights data 190 are indicative of the operations that Ingress Node 160 is (or is not) authorized to perform. If the Lockbox circuitry in Node 161 decides to grant the key request as a result of comparing data 180 with data 190, Node 161 sends key data 181 (indicative of a content key) to Ingress Node 160 over secure channel 165. After Ingress Node 160 has obtained key data 181, the Ingress circuitry thereof commences to receive encrypted content from the content provider and transcrypts the encrypted content using key data 181, and asserts the transcrypted content (which typically includes video and audio content) to video processor 175. Processor 175 can assert the transcrypted content via video processor 177 to Egress Node 162, or can assert the transcrypted content to storage controller 176, which can cause the transcrypted content to be stored in storage unit 178 (e.g., for subsequent readout and assertion via processor 177 to Egress Node 162). The ingress circuitry within Node 160 has no nonvolatile memory in which to store key data 181, and thus key data 181 cannot be used by the Ingress circuitry after Ingress Node 160 powers up (after powering down).

When (or before) Egress circuitry within Node 162 is ready to assert content to a device external to domain 168, Egress Node 162 obtains rights data 195 that indicate the operation(s) to be performed on the content by Egress Node 162, and Lockbox circuitry within Node 162 asserts a request to Lockbox circuitry within Node 161 over secure channel 166 (which has been established between Nodes 162 and 161 at power up of Node 162). The request includes rights data 195. In response to the request, the Lockbox compares rights data 195 with rights data 190 (prestored in Node 161). Rights data 190 are indicative of the operations that Egress Node 162 is (or is not) authorized to perform. If Lockbox circuitry within Node 161 decides to grant the key request as a result of comparing data 195 with data 190, Node 161 sends key data 194 (indicative of a key) to Egress Node 162 over secure channel 166. Whenever possible (i.e., whenever allowed by the usage rights), the rights data, request, and key data can be exchanged between the Lockboxes before the Egress circuitry within Node 162 is ready to assert content to the external device, to facilitate the user experience (e.g., in the case that Node 162 is, or is implemented within, a mobile MP3 or video player or other device that is only occasionally connected to the PDN). After Egress Node 162 has obtained key data 194, it commences to receive controlled content from an element of PDN 178 (e.g., from processor 177), decrypts this content using key data 194 (and optionally also performs additional processing thereon), and formats (and/or re-encrypts) the decrypted content for output to the intended destination. For example, Egress circuitry within node 162 might format decrypted video and audio content for transmission over an HDMI link to an HDMI receiver associated with a monitor external to PDN 168. Egress circuitry within node 162 has no nonvolatile memory in which to store key data 194, and thus key data 194 cannot be used by the Egress circuitry after Egress Node 162 powers up (after powering down).

It should be appreciated from the foregoing example that key data 181 are given to Ingress Node 160 only after Ingress Node 160 has "proved" to Node 161 that Ingress circuitry 160 is authorized to perform specified operations on content (e.g., only after Ingress Node 160 has proved to Node 161 that Ingress Node 160 is a licensed device), and only after Node 161 has proved to Ingress Node 160 (e.g., during an authentication exchange for establishing secure channel 165) that Node 161 is a licensed device. Similarly, key data 194 are given to Egress Node 162 only after Egress Node 162 has "proved" to Node 161 that Egress Node 162 is authorized to perform specified operations on content (e.g., only after Egress Node 162 has proved to Node 161 that Egress circuitry 162 is a licensed device), and only after Node 161 has proved to Egress Node 162 (e.g., during an authentication exchange for establishing secure channel 166) that Node 161 is a licensed device.

Figure 18:
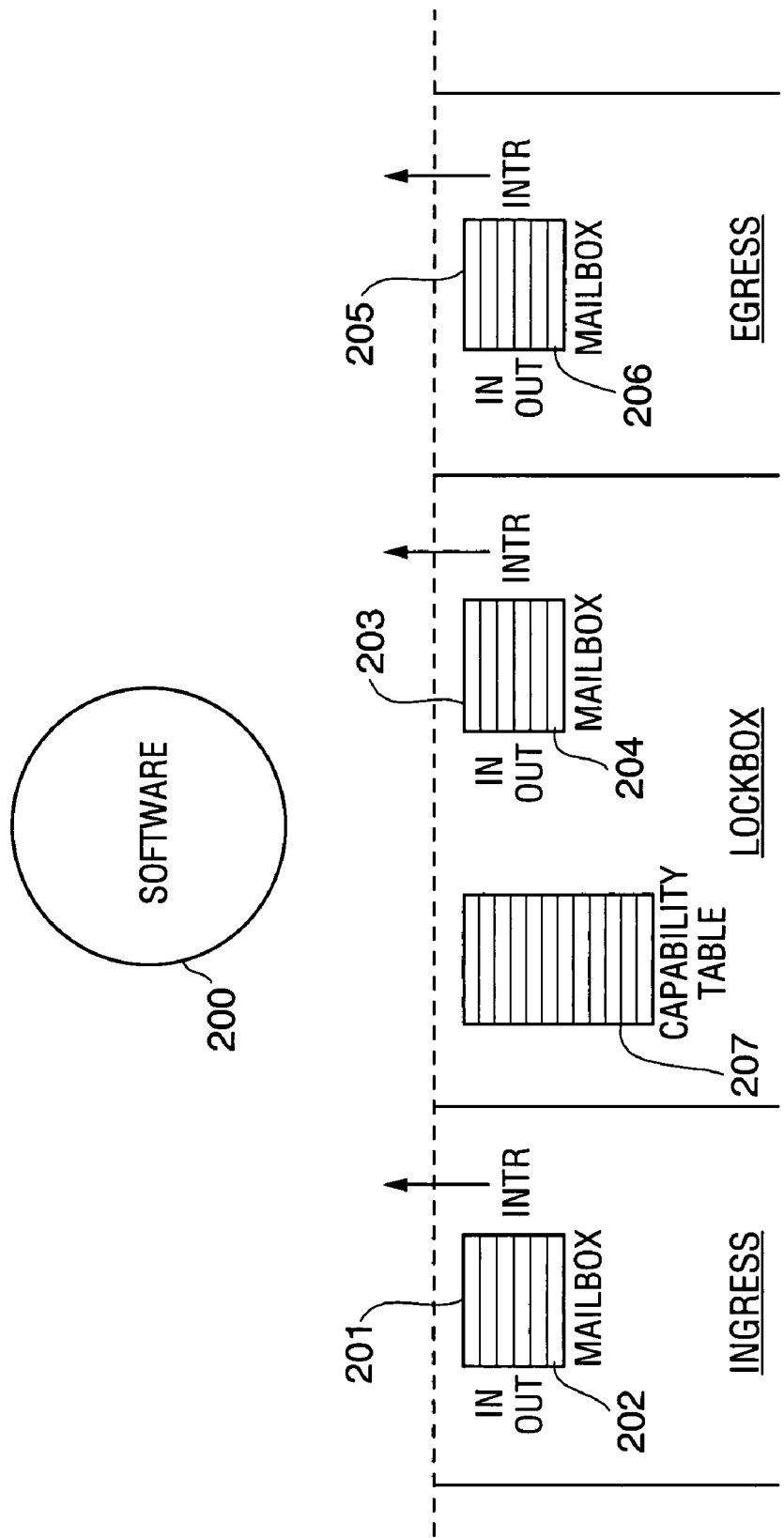
FIG. 18 is a diagram of elements (of an embodiment of the inventive PDN) employed to establish secure communication channels between a Lockbox and Ingress circuitry and between the Lockbox and Egress circuitry.
Figure 19:
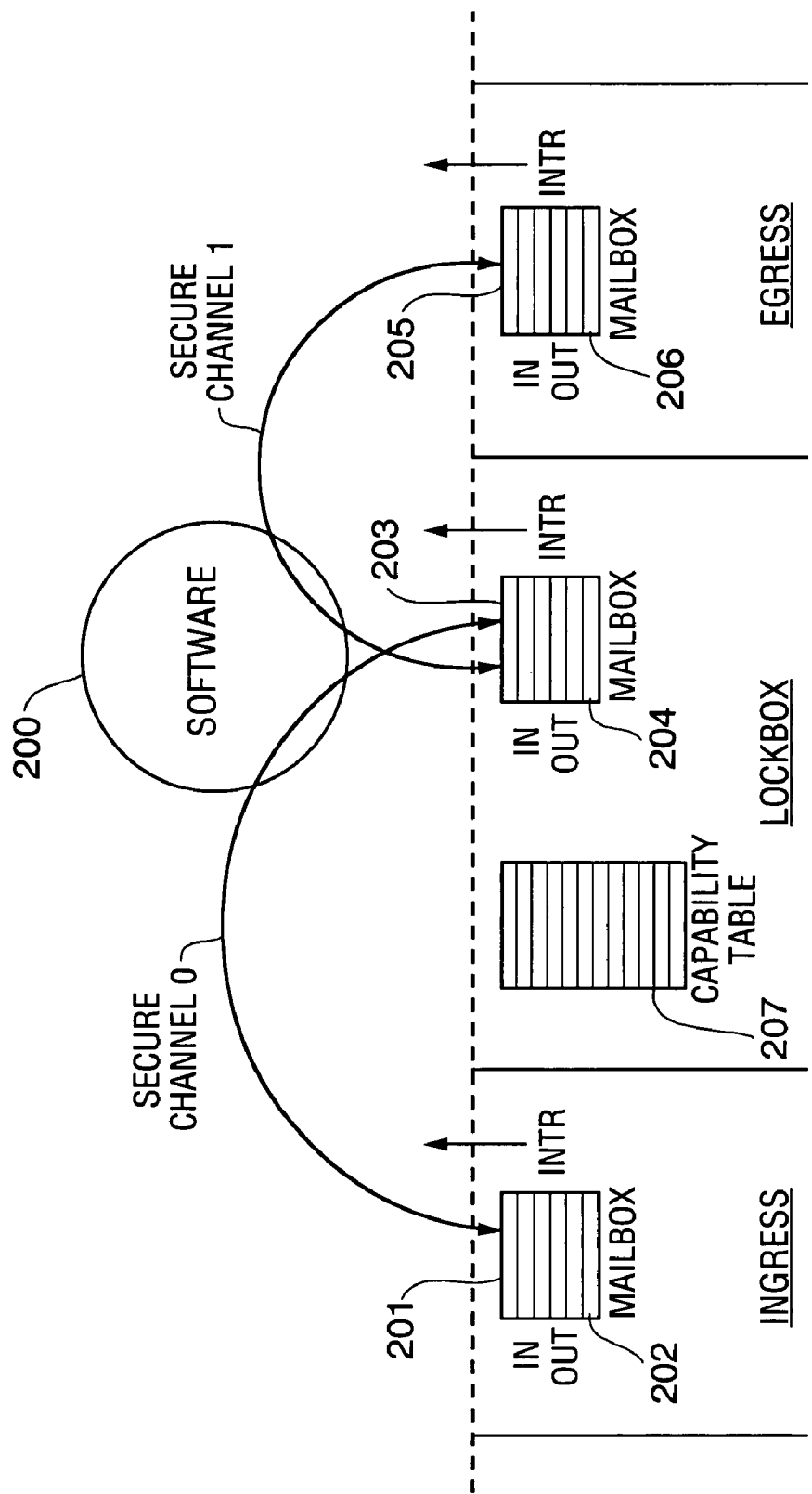
FIG. 19 is a diagram of the PDN elements of FIG. 18, with secure communication channels between the Lockbox and the Ingress circuitry and between the Lockbox and the Egress circuitry.

Next, with reference to FIGS. 18 and 19 we describe an example of steps performed in accordance with some embodiments of the invention to establish secure channels (e.g., channels 165 and 166 of FIGS. 16 and 17) between Lockboxes. This example is illustrative only and not intended to represent the only way in which secure channels can be established between Lockboxes and/or other elements of embodiments of the inventive PDN. Each of FIGS. 18 and 19 is a logical software view in which element 200 represents the software of an embodiment of the inventive PDN (e.g., software that programs CPU 147 of FIG. 15) and the hardware interface between software 200 and three nodes of the PDN (an Ingress Node, an Egress Node, and a third Node) is represented by a dashed line. Each of the nodes comprises hardware (typically including a microprocessor which executes firmware, such as microprocessor 240, 260, or 280 of FIGS. 20, 21, and 22), but does not include a programmable, general purpose CPU or software. Each of the nodes includes Lockbox circuitry, but only the Ingress Node includes Ingress circuitry (not shown) and only the Egress Node includes Egress circuitry (not shown). The third Node will be referred to as a "Lockbox" Node since it includes Lockbox circuitry but not Ingress or Egress circuitry More generally, in a class of preferred embodiments of the inventive PDN, Lockbox circuitry of at least one Node can include decision-making logic embedded in hardware of the Node (preferably within an integrated circuit) in secure fashion or decision-making firmware running on a processor embedded securely in the Node. In such a Node, the Lockbox circuitry could include a processor embedded securely within the Node, and firmware running on the processor could have access to key data or other secrets used within the Node in support of or for performing an authorized operation on content, but no such secret should be present in the Node so as to be accessible (or at least readily accessible) to a user or entity seeking to obtain unauthorized access thereto.

With reference to FIGS. 18 and 19, software 200 can interact with registers of Lockbox circuitry within each of the three Nodes. Such registers include a mailbox (having "in" section 201 and "out" section 202) in the Ingress Node, a mailbox (having "in" section 205 and "out" section 206) in the Egress Node, a mailbox (having "in" section 203 and "out" section 204) in the Lockbox Node, and registers that comprise capability table 207 of the Lockbox circuitry of the Lockbox Node. Interrupt lines are associated with the registers.

The Ingress Node can be programmed (by firmware) such that each time it powers up, it automatically attempts to set up a secure channel for communication with the Lockbox Node. Alternatively, the Ingress Node attempts to set up such a secure channel with the Lockbox Node only when the Ingress Node needs a secret not already present in the Ingress Node's lockbox. As an initial step in such an operation, the Ingress Node places an encrypted message in "out" section 202 of its mailbox and causes an interrupt to be asserted. In response, software 200 delivers the message to "in" section 203 of the Lockbox Node's mailbox. In response, the Lockbox Node places an encrypted message in "out" section 204 of its mailbox and causes assertion of an interrupt. In response, software 200 delivers this message to "in" section 201 of the Ingress Node's mailbox. Continuing in this fashion, the Ingress Node and the Lockbox Node perform an authentication exchange (using certificate data 170 and 171 prestored therein, as shown in FIG. 16) via software 200. Upon successful completion of the authentication exchange, the Ingress Node and Lockbox Node enter states in which they operate as if a secure channel (identified in FIG. 19 as "secure channel 0") exists between them. In such states, the Ingress and Lockbox Nodes communicate with each other with knowledge of each other's identity and knowledge that each of them is a licensed device, without performing further authentication operations to determine this information. However, all messages (or all messages considered secret or "important") transmitted between the Ingress Node and the Lockbox Node via software 200 (both during the exchange that establishes a secure channel between the Ingress and Lockbox Nodes, and after such secure channel has been established) are encrypted. Thus, although software 200 can do anything with such encrypted messages (e.g., save them and try to replay them later, modify them, or send them to a device other than the intended destination), the only operation that software 200 can perform on them that will have a useful result is to deliver each of them (without modification) to its intended destination. For example, if software 200 delivers messages intended for the Lockbox Node to another device or modifies them before delivering them to the Lockbox Node, the recipient will be unable to decrypt them so that such misdelivery (or delivery of corrupted messages) will have no effect other than to prevent successful communication between the sending Node and the Lockbox Node.

Similarly, the Egress Node can be programmed such that each time it powers up, it automatically attempts to set up a secure channel for communication with the Lockbox Node. Alternatively, the Egress Node attempts to set up such a secure channel with the Lockbox Node only when the Egress Node needs a secret not already present in the Egress Node's lockbox. As an initial step in such an operation, Lockbox circuitry within the Egress Node places an encrypted message in "out" section 206 of its mailbox and causes an interrupt to be asserted. In response, software 200 delivers the message to "in" section 203 of the Lockbox Node's mailbox. In response, the Lockbox Node places an encrypted message in "out" section 204 of its mailbox and causes assertion of an interrupt. In response, software 200 delivers this message to "in" section 205 of the Egress Node's mailbox. Continuing in this fashion, the Egress and Lockbox Nodes perform an authentication exchange (using certificate data 172 and 171 prestored therein, as shown in FIG. 16) via software 200. Upon successful completion of the authentication exchange, the Egress and Lockbox Nodes enter states in which they operate as if a secure channel (identified in FIG. 19 as "secure channel 1") exists between them. In such states, the Egress Node and the Lockbox Node communicate with each other with knowledge of each other's identity and knowledge that each of them is a licensed device without performing further authentication operations to determine this information. However, all messages (or all messages considered secret or "important") transmitted between the Egress Node and the Lockbox Node via software 200 (both during the exchange that establishes a secure channel between the Egress and Lockbox Nodes, and after such secure channel has been established) are encrypted. Thus, although software 200 might try to do anything with such encrypted messages (e.g., save them and try to replay them later, modify them, or send them to a device other than the intended destination), the only operation that software 200 can perform on them that will have a useful result is to deliver each of them (without modification) to its intended destination. For example, if software 200 delivers messages from the Egress Node (that are intended for the Lockbox Node) to a device other than the Lockbox Node or modifies them before delivering them to the Lockbox Node, the recipient will be unable to decrypt them so that such misdelivery (or delivery of corrupted messages) will have no effect other than to prevent successful communication between the Egress Node and the Lockbox Node.

In typical embodiments of the inventive PDN, a secure channel can be established between Lockbox circuitry of any pair of Nodes of the PDN. For example, software could place in a mailbox a message for an Egress Node, and when delivered to the Egress Node (e.g., by software) the message could cause the Egress Node to prepare to receive and process re-encrypted content to be asserted by an Ingress Node to the Egress Node via specified hardware of the PDN (e.g., from Ingress Node 160 to Egress Node 162 via processor 177 of FIG. 16). In the example, the Egress Node could respond to the message by establishing a secure channel and performing a secure exchange with some other Node to obtain (from the other Node) a key needed to perform the operation(s) specified by the message.

In typical embodiments, the inventive Lockbox circuitry (or "Lockbox") stores data indicative of (and/or correlated with) a set of rights that pertain to content. For example, a Lockbox can include a capability table including registers (or other memory) that store such data (e.g., capability table 207 of FIGS. 18 and 19). Individual storage locations in the capability table could store key data for enabling Ingress or Egress circuitry to perform specific operations (or sets of operations) on specific types of content. For example, the "Nth" storage location in table 207 could store key data needed by Egress circuitry to decrypt re-encrypted video from a specific content provider and to re-encrypt and (reformat) the decrypted video for transmission over an HDMI link. For example, an Ingress Node of a PDN could send a message (via software 200) to the Lockbox Node of FIG. 18 asking the Lockbox Node to send the contents of the Nth storage location in table 207 to a specific Egress Node. Software 200 could relay this message to the Lockbox Node but would not have access to the contents of this storage location of table 207. In response to the message, the Lockbox Node could encrypt the relevant key data (the contents of the Nth storage location in table 207) and cause software 200 to deliver the encrypted key data to the appropriate Egress Node. Software (e.g., software 200 of FIG. 18) could deliver the encrypted key data but would not have access to the raw (unencrypted) key data since it would be incapable of decrypting the encrypted data to be delivered. If software 200 were to deliver the encrypted key data to a device other than the intended Egress Node, or to modify the encrypted key data before delivery to the intended Egress Node, the recipient would be unable to decrypt the misdelivered (or modified) encrypted key data, and thus such misdelivery (or delivery of modified messages) by software 200 would have no effect other than to prevent successful communication between the Lockbox and the intended recipient Node.

For another example, a system user could not originate a message that instructs an Ingress Node or Egress Node to perform an unauthorized operation, employ software (e.g., software 200 of FIG. 18) to deliver the message to the Ingress or Egress Node, and cause the recipient to perform the unauthorized operation. Rather, the recipient Node would decrypt such a message (on the assumption that the message was generated and encrypted by a Node with which the recipient had established a secure channel) before taking any other action in response thereto. This decryption operation would effectively destroy the content of the message, because the system user would not have access to the key data (stored securely in hardware in a Node of the system) needed to encrypt the message such that a decrypted version of the message (generated by Lockbox circuitry of a Node that receives the message) would be an instruction recognizable by the recipient Node.

Figure 20:
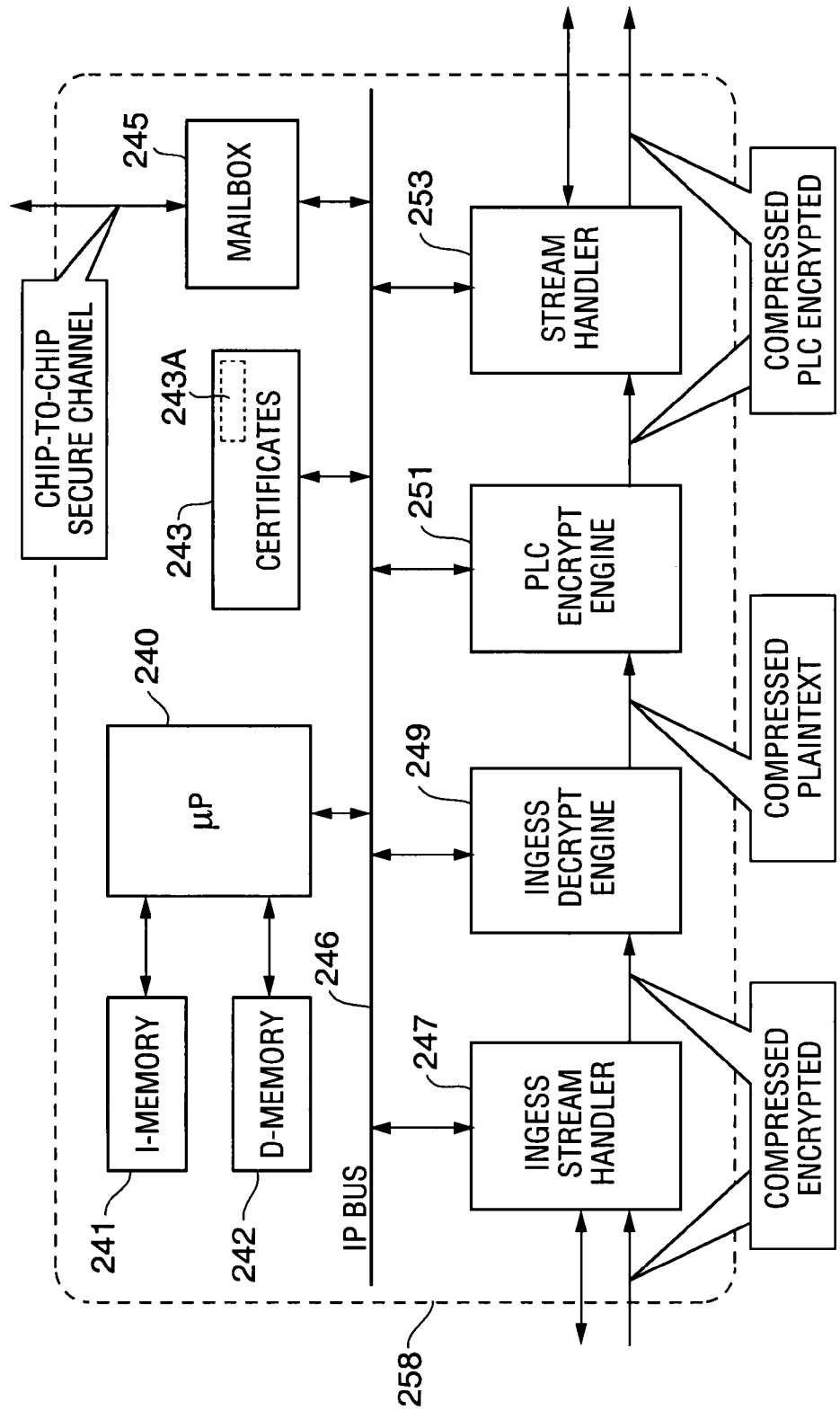
FIG. 20 is a block diagram of an embodiment of the inventive Ingress Node.

Next, with reference to FIG. 20, we describe an embodiment of the inventive Ingress Node that can be and typically is implemented as a single integrated circuit. Ingress Node 258 of FIG. 20 includes microprocessor 240 connected along bus 246, and instruction memory 241 and data memory 242 coupled to microprocessor 240. Memory 241 stores firmware executable by microprocessor 240 and data memory 242 stores data on which microprocessor 240 operates. Microprocessor 240 is not a general purpose CPU, and is not programmable with software. Instead, microprocessor 240 is typically a simple microprocessor (e.g., a controller) that implements a simple state machine. Variations on the embodiment of FIG. 20 include microprocessor circuitry of another type and/or having a different architecture (e.g., a microprocessor coupled with a common memory for storing both data and firmware), or a processor programmed with software. Microprocessor 240 (or another element of Lockbox circuitry within Node 258) can be configured to encrypt messages that are to be transferred out of the Node 258 and to decrypt encrypted messages (e.g., messages including encrypted content key data or other encrypted secret data) received from an entity (e.g., another lockbox) external to Node 258.

Ingress Node 258 also includes nonvolatile memory 243 (for storing certificate data and/or other data), mailbox 245, input interface 247, decryption engine 249, re-encryption engine 251, and output interface 253, all connected along bus 246 as shown.

Elements 240, 241, 242, 243, and 245 (and optionally other elements not shown) comprise Lockbox circuitry of Ingress Node 258, and elements 247, 249, 251, and 253 (and optionally other elements not shown) comprise Ingress circuitry of Ingress Node 258.

Mailbox 245 is an example of the mailbox of FIG. 18 having "in" section 201 and "out" section 202. Mailbox 245 is used for communication of the type described above between Ingress Node 258 and Lockbox circuitry of another Node of a PDN (via software of the PDN).

Memory 243 stores all certificates needed for operation of Ingress Node 258. Certificate data can be stored in memory 243 at the time of manufacture of the FIG. 20 circuitry, e.g., for use in an authentication exchange with Lockbox circuitry of a Node of a PDN with which Node 258 seeks to become associated (i.e., a PDN of which Node 258 seeks to become an authorized member, or in other words to which Node 258 seeks to become "married"). In such an exchange, Ingress Node 258 would prove its identity to the other Node (using certificate data stored in memory 243) and obtain "marriage certificate" data from the other Node if the other Node's Lockbox circuitry determines that Ingress Node 258 is a licensed device authorized to become a member of the PDN. The marriage certificate data (which indicate that Ingress Node 258 is an authorized member of the PDN) would typically also be stored in memory 243 for use in subsequent authentication exchanges with Lockbox circuitry of another Node of a PDN (each performed, for example, at power up of Node 258 when Node 258 is associated with the PDN) in which Ingress Node 258 again proves its identity to the other Node in order to establish a secure link with the other Node and to receive a content key (over the secure link) if necessary from the other Node as described above.

More generally, in accordance with preferred embodiments of the invention, a PDN and a Node thereof are implemented to allow devices including Lockbox circuitry and Ingress (or Egress) circuitry to be associated into the PDN with or without resort to an external authority. For example, any of devices 120, 122, 124, 126, 128, and 132 of FIG. 14 could be associated into such a PDN, if each such device includes suitably configured Lockbox circuitry. In some embodiments, Nodes of a PDN are configured and operated to require a content owner's approval to add a particular device (and thus at least one specific capability) to the PDN. Preferably, the Lockbox circuitry of each device including Ingress or Egress circuitry that a user might wish to include in the PDN should be configured so that a secret can be persistently (and securely) but revocably stored therein to indicate that the device is an authorized member (Node) of the PDN. Typically, such a secret is a certificate, and thus data indicative of such a secret are referred to herein as marriage certificate data. Lockbox circuitry that can or does transfer marriage certificate data to another Node (e.g., an Ingress Node or Egress Node) typically includes its own programmable (e.g., one-time-programmable) memory for storing data (e.g., certificate data) needed to determine whether each Node with which it communicates is an authorized member of the PDN (i.e., whether the Node possesses valid marriage certificate data and is thus "married" to the PDN).

Memory 243 of Ingress Node 258 (of FIG. 20) can include a programmable (e.g., one-time-programmable) memory (i.e., portion 243A of memory 243) in which marriage certificate data are stored at the time Ingress Node 258 becomes associated with a PDN. If so, memory 243 would also include a read-only, nonvolatile memory portion in which certificate data identifying Node 258 would be stored at the time node 258 is manufactured. Programmable portion 243A of memory 243 could be a programmable flash memory or EEPROM (or the like). However, programmable portion 243A of memory 243 is preferably implemented in a manner that is less expensive than would be required to implement a flash memory or EEPROM. For example, portion 243A of memory 243 could be a one-time programmable set of fuses that is no longer used when no longer needed but which cannot be modified once it is permanently programmed into a particular state. For example, programmable memory portion 243A can include sixteen (or some other number) sets of such fuses, each of which sets of fuses can be programmed once to store a set of marriage certificate data. Ingress Node 258 (i.e., microprocessor 240 thereof) would preferably be configured to use only the most recently programmed set of fuses of memory portion 243A (i.e., to ignore each other fuse), for example, when placing data indicative of the currently effective marriage certificate for Node 258 in mailbox 245. If Node 258 is removed from a PDN (i.e., if it becomes "divorced" from the PDN) and becomes associated with a new PDN (i.e., becomes "remarried" to the new PDN), a Lockbox of the new PDN would cause another set of fuses in memory portion 243A to be programmed with a new set of marriage certificate data indicating Node 258's association with the new PDN.

More generally, all devices that have become associated with a typical embodiment of the inventive PDN contain data (a certificate or certificate-like data) unique to the domain. Such data is sometimes referred to herein as "marriage certificate data." Each licensed device that could be included in such a PDN, whether or not it has actually become associated with the PDN, has certificate data permanently stored in (during manufacture) at least one integrated circuit thereof (e.g., a Lockbox chip) to indicate that it is a licensed device. This latter type of certificate data is distinct from the above-mentioned "marriage certificate data." When a device associated with a first PDN is removed from the first PDN (i.e., becomes "divorced" from the first PDN), its marriage certificate data should be effectively deleted before it becomes associated with ("remarried" to) another PDN (a second PDN), so that it loses access to all secrets to which it had gained access by virtue of being married to the first PDN. Preferred embodiments of the inventive devices (that can become Nodes of a PDN) can be implemented so that any marriage certificate data stored therein (as a result of previous association with a first PDN) will effectively be deleted upon association of the device with a second PDN (and new marriage certificate data for the second PDN will be stored therein). Preferred embodiments of the inventive devices may also be implemented so that each such device can become associated with no more than a predetermined maximum number of PDNs. Optionally, other limits may be built into the inventive devices (e.g., into their Lockbox circuitry) to restrict their eligibility to become associated with specific PDNs.

Preferred embodiments of the inventive Lockbox circuitry may also be configured such that the Lockbox circuitry can efficiently determine (e.g., in a cost effective manner) when association of another Node with a PDN should be revoked, and to allow such revocation to be implemented efficiently.

It is contemplated that a full authentication exchange (e.g., a public key certificate signing or "PKCS" exchange) would be performed between a Lockbox (of a PDN) and Ingress Node 258 when Node 258 seeks to become associated into the PDN (i.e., to become an authorized member of the PDN). Thus, certificate data stored persistently in memory 243 of Node 258 should be of a type suitable for performing such a full authentication exchange. After Node 258 has become associated into a PDN, a much simpler authentication exchange could be performed between Node 258 and the Lockbox circuitry of any other Node of the PDN each time Node 258 seeks to establish a secure channel over which it can obtain a content key from the other Node. Memory 243 (e.g., programmable portion 243A of memory 243) could also include a small amount of certificate data suitable for performing such a simpler authentication exchange. For example, such a "simpler" authentication exchange for establishing a secure channel (over which a content key can be transferred) could be performed using certificates having lighter weight than the industry standard PKCS certificates typically used to perform conventional public key certificate signing ("PKCS") exchanges. If so, programmable portion 243A of memory 243 could be implemented more simply and inexpensively than if it needed to be capable of storing more complex PKCS certificate data. Alternatively, an authentication exchange could be performed to establish a secure channel between two Nodes of a PDN without exchanging any certificates at all between the Nodes.

Still with reference to FIG. 20, content (e.g., video and/or audio data) enters Ingress Node 258 at interface 247, and flows within Ingress Node 258 from input interface 247 to decryption engine 249, from decryption engine 249 to re-encryption engine 251, and from re-encryption engine 251 to output interface 253. Content cannot flow between any of elements 247, 249, 251, and 253 and any of microprocessor 240, memory 243, and mailbox 265. Microprocessor 240 controls operation of elements 247, 249, 251, and 253. Interface 247 is a stream handler configured to perform all necessary handshaking with the content source to bring the content into Node 258 in the required form. Interface 247 (under control of microprocessor 240 to the extent necessary) performs all required content flow control, and asserts to the content source any required acknowledgements or the like. In some embodiments, interface 247 is configured to receive content in one format only (e.g., content received over a USB link, a 1394 link, a wireless link, or any other link). In other embodiments, interface 247 is configured to receive content in any of two or more different formats. Typically, the content received by interface 247 (and asserted by interface 247 to decryption engine 249) is compressed, encrypted data, and is encrypted in accordance with whatever transport and encryption scheme is being used by the content provider.

Figure 22:
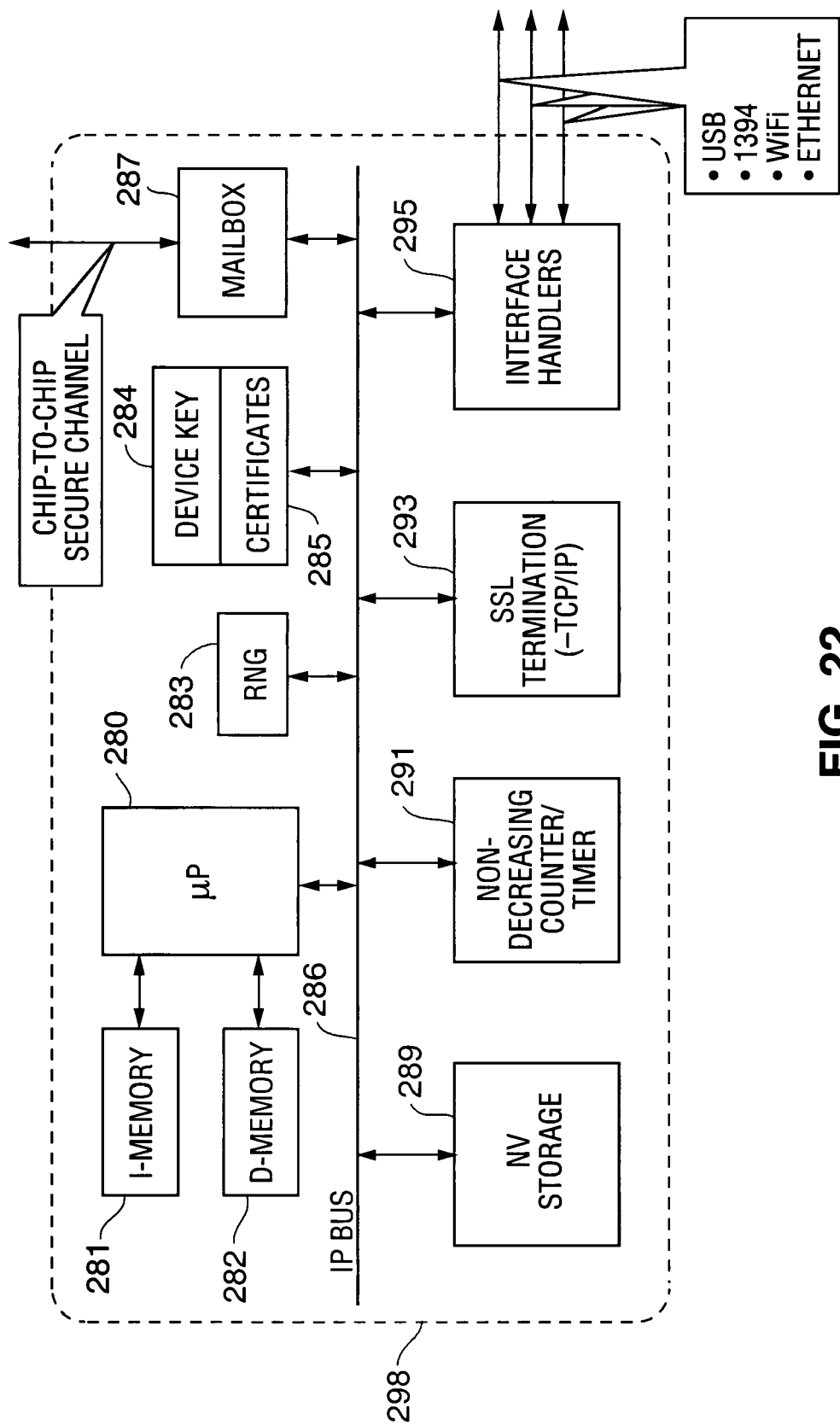
FIG. 22 is a block diagram of an embodiment of the inventive Node (which is neither an Ingress Node nor an Egress node).

Decryption engine 249 decrypts the content asserted thereto, typically using a content key previously obtained by Ingress Node 258 from a Lockbox (e.g., Lockbox Node 298 of FIG. 22). The Lockbox and Ingress Node 258 are typically implemented as separate chips, and the content key is typically sent in encrypted form from the Lockbox (via software) to mailbox 245 of Node 258, and then decrypted by appropriate circuitry within Node 258 to put it in a form in which it can be used by engine 249. Decryption engine 249 typically outputs a compressed, plaintext version of the content, but does not perform decompression on the compressed content. Re-encryption engine 251 then encrypts the plaintext content, typically using a content key previously obtained by Ingress Node 258 from a Lockbox (e.g., Lockbox Node 298 of FIG. 22). The re-encrypted (transcrypted) content generated by engine 251 is asserted to output interface 253, and from interface 253 to any element of a PDN. Interface 253 is a stream handler configured to perform all necessary handshaking with the device that receives the transcrypted content.

Figure 21:
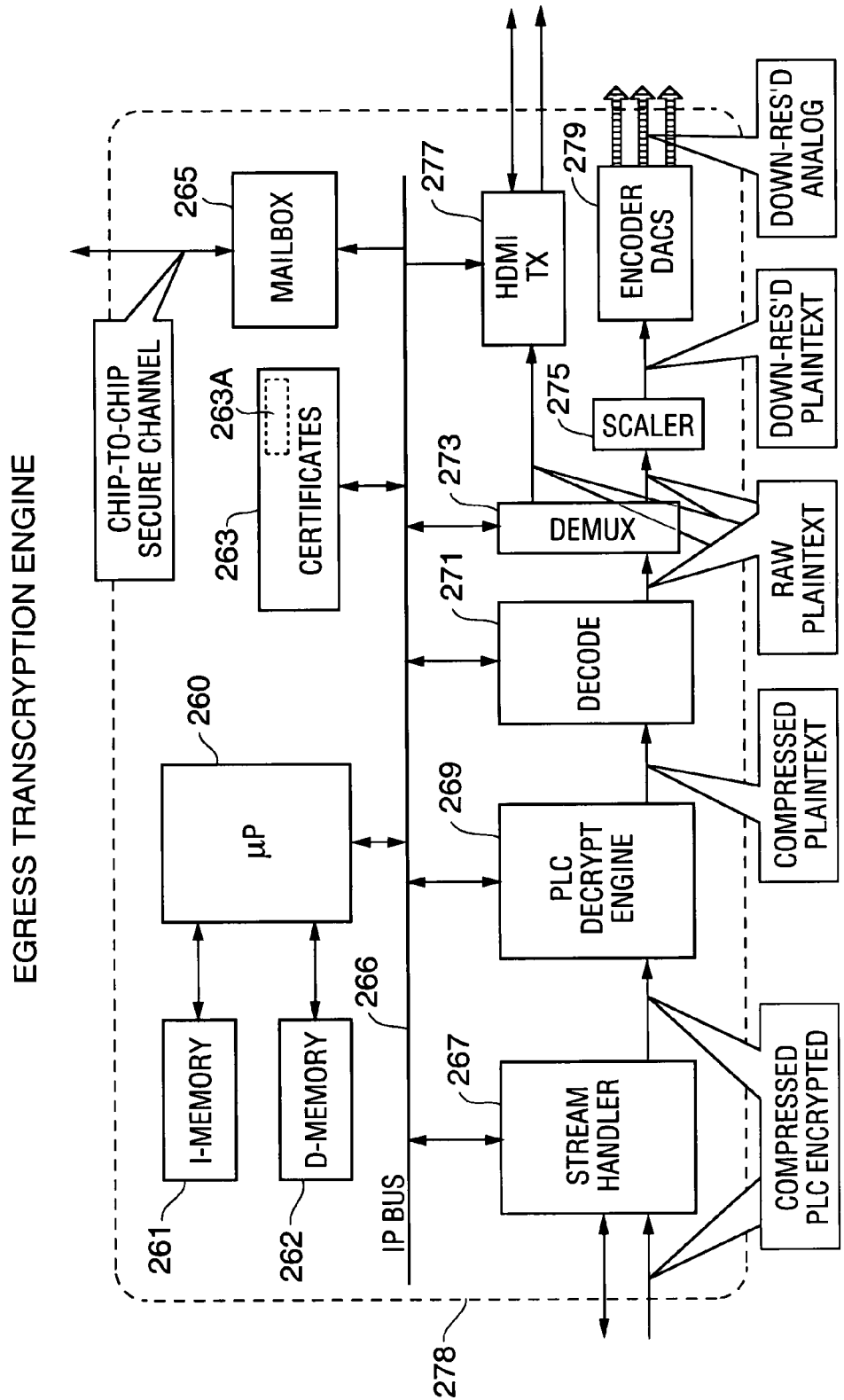
FIG. 21 is a block diagram of an embodiment of the inventive Egress Node.

Next, with reference to FIG. 21, we describe an embodiment of the inventive Egress Node that can be and typically is implemented as a single integrated circuit. Egress Node 278 of FIG. 21 includes microprocessor 260 connected along bus 266, and instruction memory 261 and data memory 262 coupled to microprocessor 260. Memory 261 stores firmware executable by microprocessor 260 and data memory 262 stores data on which microprocessor 260 operates. Microprocessor 260 is not a general purpose CPU, and is not programmable with software. Instead, microprocessor 260 is typically a simple microprocessor (e.g., a controller) that implements a simple state machine. Variations on the embodiment of FIG. 21 include microprocessor circuitry of another type and/or having a different architecture (e.g., a microprocessor coupled with a common memory for storing both data and firmware), or a processor programmed with software. Microprocessor 260 (or another element of Lockbox circuitry within Node 278) can be configured to encrypt messages that are to be transferred out of the Node 278 and to decrypt encrypted messages (e.g., messages including encrypted content key data or other encrypted secret data) received from an entity (e.g., another lockbox) external to Node 278.

Egress Node 278 also includes nonvolatile memory 263 (for storing certificate data and/or other data), mailbox 265, input interface 267, decryption engine 269, decoding circuitry 271, demultiplexer 273, HDMI transmitter 277, all connected along bus 266 as shown. One output of demultiplexer 273 is coupled to the input of HDMI transmitter 277. The other output of demultiplexer 273 is coupled to the input of scaler 275, and the output of scaler 275 is coupled to the input of encoding and DAC circuitry 279.

Elements 260, 261, 262, 263, and 265 (and optionally other elements not shown) comprise Lockbox circuitry of Egress Node 278, and elements 267, 269, 271, 273, 275, 277, and 279 (and optionally other elements not shown) comprise Egress circuitry of Egress Node 278.

Mailbox 265 is an example of the mailbox of FIG. 18 having "in" section 205 and "out" section 206. Mailbox 265 is used for communication of the type described above between Egress Node 278 and a Lockbox (included with Node 278 in a PDN) via software of the PDN.

Memory 263 stores all certificates needed for operation of Egress Node 278. Certificate data can be stored in memory 263 at the time of manufacture of the FIG. 21 circuitry, e.g., for use in an authentication exchange with Lockbox circuitry of a Node of a PDN with which Node 278 seeks to become associated (in other words, to which Node 278 seeks to become "married"). In such an exchange, Egress Node 278 would prove its identity to the other Node (using certificate data stored in memory 263) and obtain "marriage certificate" data from the other Node if the other Node's Lockbox circuitry determines that Egress Node 278 is a licensed device authorized to become a member of the PDN. The marriage certificate data (which indicate that Egress Node 278 is an authorized member of the PDN) would typically also be stored in memory 273 for use in subsequent authentication exchanges between Node 278 and other Nodes of a PDN (each performed, for example, at power up of Node 278 when Node 278 is associated with the PDN) in which Egress Node 278 again proves its identity to another Node in order to establish a secure link with the other Node and to receive a content key (over the secure link) as necessary from the other Node as described above.

Memory 263 can include a programmable (e.g., one-time-programmable) memory (i.e., portion 263A of memory 263) in which marriage certificate data are stored at the time Egress Node 278 becomes associated with a PDN. If so, memory 263 would also include a read-only, nonvolatile memory portion in which certificate data identifying Node 278 would be stored at the time Node 278 is manufactured. Programmable portion 263A of memory 263 could be a programmable flash memory or EEPROM (or the like). However, programmable portion 263A of memory 263 is preferably implemented in a manner that is less expensive than would be required to implement a flash memory or EEPROM. For example, portion 263A of memory 263 could be a one-time programmable set of fuses that is no longer used when no longer needed but which cannot be modified once it is permanently programmed into a particular state. For example, programmable memory portion 263A can include sixteen (or some other number) sets of such fuses, each of which sets of fuses can be programmed once to store a set of marriage certificate data. Egress Node 278 (i.e., microprocessor 260 thereof) would preferably be configured to use only the most recently programmed set of fuses of memory portion 263A (i.e., to ignore each other fuse), for example, when placing data indicative of the currently effective marriage certificate for Node 278 in mailbox 265. If Node 278 is removed from a PDN (i.e., if it becomes "divorced" from the PDN) and becomes associated with a new PDN (i.e., becomes "remarried" to the new PDN), Lockbox circuitry of another Node of the new PDN would cause another set of fuses in memory portion 263A to be programmed with a new set of marriage certificate data indicating Node 278's association with the new PDN.

It is contemplated that a full authentication exchange (e.g., a public key certificate signing exchange) would be performed between Egress Node 278 and Lockbox circuitry of a Node of a PDN, when Node 278 seeks to become an authorized member of the PDN. Thus, certificate data stored persistently in memory 263 of Node 278 should be of a type suitable for performing such a full authentication exchange. After Node 278 has become associated into the PDN, a much simpler authentication exchange could be performed between Node 278 and another Node of the PDN each time Node 278 seeks to establish a secure channel with the other Node (e.g., a secure channel over which Node 278 can obtain a content key). Memory 263 (e.g., programmable portion 263A of memory 263) could also include a small amount of certificate data suitable for performing such a simpler authentication exchange. For example, such a "simpler" authentication exchange for establishing a secure channel (over which a content key can be transferred) could be performed using certificates having lighter weight than the industry standard PKCS certificates typically used to perform conventional public key certificate signing ("PKCS") exchanges. If so, programmable portion 263A of memory 263 could be implemented more simply and inexpensively than if it needed to be capable of storing more complex PKCS certificate data.

Still with reference to FIG. 21, Egress Node 278 is configured so that content (e.g., video and/or audio data) enters Egress Node 278 at interface 267, and flows from input interface 267 to decryption engine 269, from decryption engine 269 to decoding circuitry 271, and from circuitry 271 to demultiplexer 273. Content cannot flow between any of elements 267, 269, 271, and 273 and any of microprocessor 260, memory 263, and mailbox 265. Microprocessor 260 controls operation of elements 267, 269, 271, and 273. Interface 267 is a stream handler configured to perform all necessary handshaking with the source of the content to bring the content into Node 278 in the required form. Interface 267 (under control of microprocessor 260 to the extent necessary) performs all required content flow control, and asserts to the content source any required acknowledgements or the like. In some embodiments, interface 267 is configured to receive content (in one format only) from an element of a PDN. In other embodiments, interface 267 is configured to receive content in any of two or more different formats from one or more elements of a PDN. Typically, the content received and asserted by interface 267 to decryption engine 269 is compressed, transcrypted data that has been transcrypted in an Ingress Node of the PDN to which Egress Node 278 belongs.

Decryption engine 269 decrypts the content asserted thereto, typically using a content key previously obtained by Egress Node 278 from the Lockbox of another Node (e.g., Lockbox 298 of FIG. 22). When Egress Node 278 and the Lockbox of the other Node are implemented as separate chips, the content key is typically sent in encrypted form from the Lockbox of the other Node (via software) to mailbox 265 of Node 278 and then decrypted by appropriate circuitry within Node 278 to put it in a form in which it can be used by engine 269. Decryption engine 269 is typically configured to output a compressed, plaintext version of the content. Decoding circuitry 271 performs any required decompression on the compressed content and asserts the raw (decompressed), plaintext content to demultiplexer 273.

When microprocessor 260 has placed demultiplexer 273 in a first state, the raw, plaintext content is asserted from demultiplexer 273 to HDMI transmitter 277. Transmitter 277 re-encrypts the raw, plaintext content (according to the HDCP protocol) and transmits the re-encrypted content over an HDMI link to an HDMI receiver (e.g., in an audiovisual system including a display device). When microprocessor 260 has placed demultiplexer 273 in a second state, demultiplexer 273 asserts the raw, plaintext content to scaler 275. Scaler 275 performs any necessary scaling on the content (e.g., rescales video content to another resolution). The content (which typically has undergone scaling within scaler 275) is then asserted to encoding and DAC circuitry 279, in which it is encoded and formatted as necessary (for output) and converted to analog form for output from Egress Node 278.

Note that microprocessor 260 (and thus Egress Node 278) is configured to operate only in an authorized manner, in the sense that it can perform only the operations that its internal firmware, and any content key (and/or permission data or the like) it has received from a Lockbox, allow it to perform. Egress Node 278 will have received such content key (and/or permission data) over a secure channel from Lockbox circuitry of another Node only after proving to the other Node (e.g., using certificate data stored in memory 263) that it is authorized to perform the operations that the content key (and/or permission data) allow it to perform. For example, if permission data received over a secure channel from Lockbox circuitry of another Node causes microprocessor 260 to place demultiplexer 273 in a state that routes raw, plaintext content to HDMI transmitter 277 (to allow transmission of an HDCP-encoded version of the content from transmitter 277 to an external receiver over an HDMI link), no external entity can cause microprocessor 260 instead to place demultiplexer 273 in a state that routes raw, plaintext content to scaler 275. Thus, no external entity can cause Egress Node 278 to perform unauthorized output of a plaintext, analog version of content using encoding and DAC circuitry 279.

Many variations on the structure of the Egress Node of FIG. 21 are contemplated. For example, in some such variations, the Egress Node can cause compressed plaintext content output from decryption engine 269 to be saved (e.g., as MPEG video data, in memory external to the Egress unit) rather than being asserted to a decoder of the Egress Node.

Next, with reference to FIG. 22, we describe an embodiment of the inventive Lockbox circuitry that can be (and typically is) implemented as a single integrated circuit, and can be a Node (sometimes referred to herein as a "Lockbox Node") of a PDN. Lockbox circuitry ("Lockbox") 298 of FIG. 22 includes microprocessor 280 connected along bus 286, and instruction memory 281 and data memory 282 coupled to microprocessor 280. Memory 281 stores firmware executable by microprocessor 280 and data memory 282 stores data on which microprocessor 280 operates. Microprocessor 280 is not a general purpose CPU, and is not programmable with software. Instead, microprocessor 280 is typically a simple microprocessor (e.g., a controller) that implements a simple state machine. Variations on the embodiment of FIG. 22 include microprocessor circuitry of another type and/or having a different architecture (e.g., a microprocessor coupled with a common memory for storing both data and firmware), or a processor programmed with software. Microprocessor 280 (or another element of Lockbox 298) can be configured to encrypt messages that are to be transferred out of the Lockbox 298 and to decrypt encrypted messages (e.g., messages including encrypted secret data) received from an entity (e.g., another lockbox) external to Lockbox 298.

Lockbox 298 also includes random number generator 283, nonvolatile memory 285 (for storing certificate data), nonvolatile memory 284 (for storing key data), additional nonvolatile memory 289, mailbox 287, nondecreasing counter (or timer) 291, SSL termination circuitry 293, and interface circuitry 295, all connected along bus 286 as shown.

Mailbox 287 is an example of the mailbox of FIG. 18 having "in" section 203 and "out" section 204. Mailbox 287 is used for communication of the type described above between Lockbox 298 and an Ingress or Egress Node of a PDN (via software of the PDN).

Memory 289 stores data indicative of (and/or correlated with) a set of rights that pertain to content, and optionally also stored additional data for use by Lockbox 298. For example, individual storage locations in memory 289 can store key data that can be sent (in encrypted form) to other Nodes to enable Ingress or Egress circuitry of such other Nodes to perform specific operations (or sets of operations) on specific types of content. For example, the "Nth" storage location in memory 289 could store key data needed by Egress circuitry to decrypt re-encrypted video from a specific content provider and to re-encrypt and (reformat) the decrypted video for transmission over an HDMI link.

Memory 285 stores certificates needed for operation of Lockbox 298. Certificate data can be stored in memory 285 at the time of manufacture of the FIG. 21 circuitry, e.g., for use in an authentication exchange with an Ingress or Egress Node that seeks to become associated with ("married" to) a PDN that includes Lockbox 298. In such an exchange, Lockbox 298 would prove its identity to the Ingress or Egress Node, determine (using certificate data stored in memory 285 and/or memory 289) whether the Ingress or Egress Node is a licensed device authorized to become a member of the PDN, and provide marriage certificate data (which could be pre-stored in memory 285 and/or memory 289) to the Ingress or Egress Node upon determining that the Ingress or Egress Node is a licensed device authorized to become a member of the PDN. Memory 285 (and/or memory 289) can also store certificate data for use in authentication exchanges with an Ingress or Egress Node (associated with the PDN) in which the Ingress (Egress) Node seeks to establish a secure link with Lockbox 298 over which Lockbox 298 can send a content key to the Ingress (Egress) Node.

Memory 284 stores a device key that is a secret unique to Lockbox 298. Lockbox 298 is configured to use the device key to encrypt secrets for storage external to Lockbox 298 in such a manner that only Lockbox 298 can retrieve and decrypt the secrets. Using the device key, Lockbox 298 can extend its internal nonvolatile storage capacity. Secrets stored in encrypted form (having been encrypted using the device key stored in memory 284) external to Lockbox 298 would remain secure. Thus, the external storage would be functionally equivalent to nonvolatile storage within the Lockbox. An example of external storage accessible by Lockbox 298 is storage unit 153 of FIG. 15, to which Lockbox 298 (in the role of Lockbox circuitry 151 of FIG. 15) could write encrypted secrets (via storage circuitry 152) and from which Lockbox 298 could read the encrypted secrets (also via storage circuitry 152). In variations on the FIG. 22 embodiment, the inventive Lockbox does not include memory 284 and relies on internal memory for storing all secrets.

In some embodiments, the inventive Lockbox (e.g., an implementation of the Lockbox of FIG. 22) is initialized at the time of manufacture to include (e.g., to store persistently): a private key that is never shared or exposed, a matching public key that is freely shared and exposed, one or more public keys for trusted certificate authorities, information that defines a device type (e.g., the type of a device, which can be used as a Node of a PDN, and in which the Lockbox is included) and fundamental properties of such device, a certificate issued by an authorized certificate authority (e.g., an authorized certificate authority for a PDN in which the Lockbox will be included), all cryptographic information needed to identify and communicate securely with other elements of a device (in which the Lockbox is included, and which can be used as a Node of a PDN), and all cryptographic information needed to identify and communicate securely with other Lockboxes.

Lockbox 298 uses random number generation circuitry 283 to generate any random or pseudorandom key data (or other random or pseudorandom data) that it needs, e.g., to perform authentication exchanges. Preferably, circuitry 283 is a statistically good source of randomness and is configured so that it cannot be defeated (e.g., caused to generate predictable numbers, rather than random numbers) by an attacker (e.g., by controlling the temperature or voltage conditions under which it operates). Circuitry 283 can be implemented in any of many different ways, e.g., so that the random or pseudorandom numbers indicated by its output can have any of many different lengths. E.g., one implementation of circuitry 283 could output data indicate of N-bit random or pseudorandom numbers, where N is a small number, and another implementation of circuitry 283 could output data indicate of M-byte random or pseudorandom numbers, where M is a large number.

Alternatively, circuitry 283 could be replaced by a sequencer, or Lockbox 298 could include both circuitry 283 and a sequencer. Sequencers are similar to randomizers, and provide essentially the same function. A sequencer does not operate in random or pseudorandom fashion, however, and instead follows a pre-determined sequence. A simple counter is one example of a sequencer. The dispersion inherent in an encryption protocol implemented by the Lockbox could essentially randomize the influence of a sequencer, and provide the desired protection against replay and known-text attacks. Such protection would be most effective when the sequence is sufficiently long, and when the position in the sequence remains secret and cannot be reset or re-initialized by an attacker. Sequencers can be used to convey information related to the ordering or synchronization of blocks and/or keys. They can also be used to implement various rolling-code mechanisms where keys are not stored, but can be re-derived as needed.

Nondecreasing (i.e., monotonically increasing) counter 291 is provided to prevent replay attacks on Lockbox 298, and to prevent other attacks in which an attacker powers down (and powers up) Lockbox 298 with appropriate timing in an attempt to obtain unauthorized access to content after a key (needed for access to the content) is scheduled to expire. In an attempted replay attack, software within a PDN might save messages (e.g., legitimate, signed messages from an Ingress or Egress Node) that the software delivered to Lockbox 298, and later redelivers the messages to Lockbox 298 in an effort to emulate the Ingress or Egress Node. Nondecreasing counter 291 (which could alternatively be replaced by a tamper resistant clock or other timer) could be used in accordance with standard cryptographic means, to prevent such replay attacks.

Nondecreasing counter 291 (or a tamper resistant clock or other timer in place of it) can also be used by Lockbox 298 (e.g., by microprocessor 280 of Lockbox 298) to delete a secret (e.g., key data) at a predetermined time, for example in the case that Lockbox 298 had received the secret from an external source (e.g., a content provider) with the restriction that its use is authorized only for a specified time, so that the secret has a predetermined expiration time. Preferably, counter 291 is configured as simply as possible to allow Lockbox 298 to accomplish such function in a cost-effective way. For example, counter 291 can be implemented using simple, inexpensive circuitry that allows Lockbox 298 to prevent unauthorized use of a secret beyond an predetermined expiration time rounded up to the nearest integral number of multi-second (e.g., 10-second) intervals, where counter 291 would need to be implemented in a much more complicated and expensive manner to allow Lockbox 298 to prevent unauthorized use of the secret by a fraction of a second beyond the exact predetermined expiration time. For another example, counter 291 could be implemented as a simple, inexpensive circuit that allows Lockbox 298 to prevent unauthorized use of a secret for not more than a few seconds beyond expiration of an authorized use period of on the order of days, where counter 291 would need to be implemented as a much more expensive circuit to prevent unauthorized use of the secret for no more than a fraction of a second beyond expiration of the authorized use period. Counter 291 might be implemented to provide only limited protection from attacks of the described types. For example, counter 291 could have most significant digits that do not reset at power up (or power down) and least significant digits that do reset at power up or power down, so that an attacker could obtain a short (e.g., a few seconds worth) amount of extra, unauthorized access to content by powering Lockbox up and down with appropriate timing.

Counter 291 can be a monotonically increasing counter whose count does not return to zero upon power down of the Lockbox. Alternatively, Lockbox 298 can include a tamper resistant clock (which does not reset upon power down of the Lockbox) as a substitute for counter 291.

Alternatively, Lockbox 298 includes neither counter 291 nor a timer and is instead configured to access an external tamper resistant clock periodically (or upon power up) to obtain current time data, e.g., for use in determining when to delete a key having an expiration time or to prevent replay attacks. For example, Lockbox 298 can be configured to use SSL termination circuitry 293 to cause software of a PDN to log on to the Internet to access the correct time whenever Lockbox 298 powers up, and to receive and decrypt the desired "time data" relayed by the software to Lockbox 298 from the Internet.

SSL termination circuitry 293 provides Lockbox 298 with capability to communicate with other devices, whether internal or external to the PDN. A typical implementation of circuitry 293 allows Lockbox 298 to communicate via PDN software (e.g., over a PCI bus, if Lockbox 298 and a PC executing the software are connected along the bus). For example, Lockbox 298 could use SSL termination circuitry 293 to cause PDN software to log on to the Internet, using PDN capabilities external to Lockbox 298 (e.g., TCP/IP functions of a PC of the PDN), and send messages Lockbox 298 over the Internet. Or, Lockbox 298 could use SSL termination circuitry 293 to cause PDN software otherwise to relay communications between Lockbox 298 and one or more devices within or external to the PDN. Lockbox 298 might use SSL termination circuitry 293 to cause PDN software to relay communications between Lockbox 298 and another lockbox in the PDN. A personal computer of a PDN can be configured in a conventional manner to communicate over the Internet, using a TCP layer to set up the communication and an SSL layer to perform cryptographic functions (e.g., any necessary authentication) as needed to accomplish the communication. A device external to Lockbox 298 could cause operating system software (e.g., a Windows operating system) running on a PC (of a PDN) to perform TCP layer functions needed for the device to send an encrypted message over the Internet to SSL termination circuitry 293 of Lockbox 298. Circuitry 293 would perform the SSL layer functions needed to decrypt the message and encrypt Lockbox 298's response (to be sent over the Internet via the operating system software). Circuitry 293 need not be configured to implement a TCP/IP layer. Rather, PDN software could run the TCP stack as required and forward the payload out of the TCP stack to circuitry 293, so that circuitry 293 need implement only the top level SSL protocol. Interface circuitry 295 could be configured to initiate communications via circuitry 293 and PDN software with devices external to Lockbox 298.

Interface circuitry 295 provides capability for communication between Lockbox 298 and other devices (whether internal or external to a PDN). For example, interface circuitry 295 can be configured to enable communication between Lockbox 298 and an external device via a single link (e.g., one of a USB link, a 1394 link, a WiFi or other wireless link, and an Ethernet link). In other embodiments, interface circuitry 295 is configured to enable communication between Lockbox 298 and an external device via any of two or more different links (e.g., a USB link, a 1394 link, a WiFi link, and an Ethernet link).

Many variations on the structure of the Lockbox of FIG. 22 are contemplated. For example, in some such variations, one or more of elements 283, 284, 291, 293, and 295 are omitted.

Figure 23:
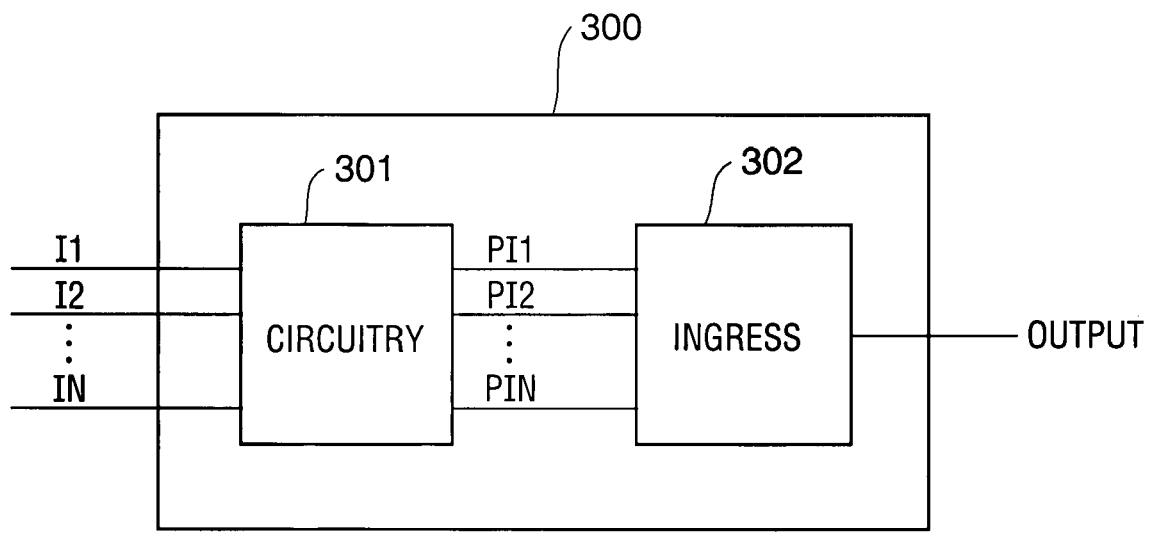
FIG. 23 is a block diagram of a device (e.g., a set top box) including Ingress circuitry configured to transcrypt content having any of N different formats, and to output transcrypted content having a single format.

In a class of embodiments, the invention is a device (e.g., set top box for receiving content from a remote source, or video receiver or processor) configured for use in a PDN (e.g., as a Node of the PDN). Each such device includes Lockbox circuitry and also Ingress (or Egress) circuitry configured for use in at least one embodiment of the inventive PDN. Device 300 of FIG. 23 is an example of such a device. Device 300, which can but need not be a set top box for receiving content from up to N different remote sources, includes interface circuitry 301 and circuitry 302 connected as shown. Circuitry 302 includes lockbox circuitry and ingress circuitry (and is sometimes referred to as ingress unit 302). Device 300 optionally also includes other components (not shown). Interface circuitry 301 is configured to receive and optionally perform initial processing upon any of N input content streams (I1, I2, . . . , and IN), and to assert to ingress circuitry within unit 302 one of content streams PI1, PI2, . . . , and PIN in response to a received one of the input content streams. Circuitry 301 asserts the "m"th content stream ("PIm") to an input of Ingress unit 302 in response the "m"th one ("Im") of the input content streams. Each of the input content streams has a different format, and each can be encrypted in accordance with a different content protection protocol. For example, one input content stream may be digital video received from a satellite, another may be content in HDMI format content received over an HDMI link, and so on. Each content stream "PIm" asserted to Ingress unit 302 can be identical to the corresponding input content stream ("Im") or can be a processed version of the corresponding input content stream. An input interface within ingress unit 302 (e.g., an implementation of interface 247 of FIG. 20) is configured to receive any of the content streams asserted to ingress unit 302 from circuitry 301, and to assert each received content stream to transcryption circuitry within ingress unit 302. The transcryption circuitry within unit 302 is configured to output a transcrypted content stream ("OUTPUT") having a single format in response to any of the content streams PIm. The transcrypted content stream has same format regardless of which of the N different content streams PIm is transcrypted by ingress unit 302.

Figure 24:
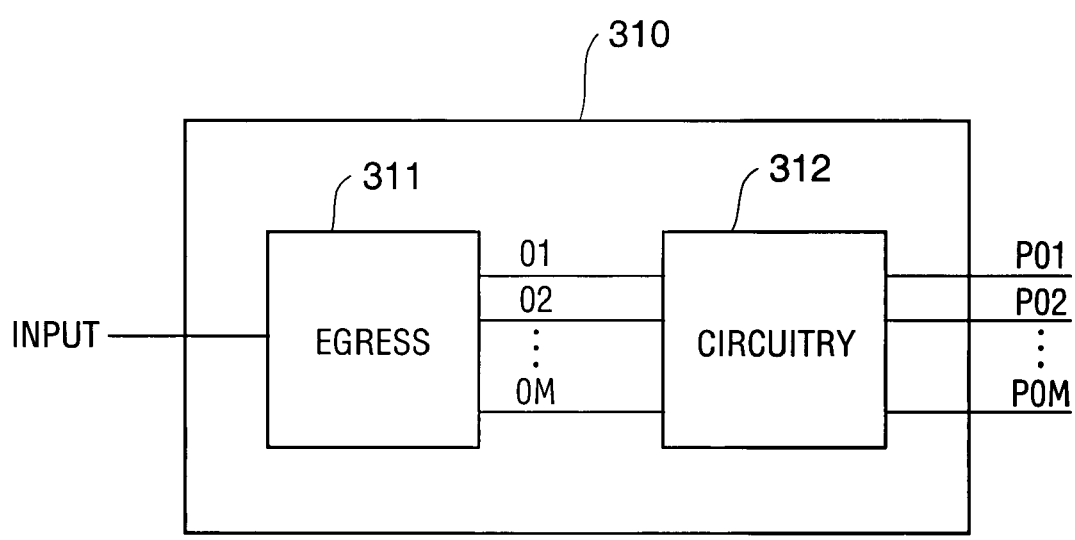
FIG. 24 is a block diagram of a device (e.g., a video processor) including Egress circuitry configured to receive controlled content having a single format and generate a decrypted (plaintext) version of the controlled content, and to process (e.g., re-encrypt and optionally also additionally process) the plaintext content to produce processed content having any of M different formats.

Device 310 of FIG. 24 is another exemplary device in the class described in the previous paragraph. Device 310, which can but need not be a video processor, includes circuitry 311 and interface circuitry 312 connected as shown. Circuitry 311 includes lockbox circuitry and egress circuitry (and is sometimes referred to as egress unit 311). Device 310 may also include other components (not shown). Egress unit 311 is configured to receive and decrypt a single controlled content stream ("INPUT") to generate a plaintext version of such content stream. The controlled content stream asserted to unit 311 could be a transcrypted content stream output from ingress unit 302 of FIG. 23. Egress unit 311 includes circuitry configured to output M streams of content (O1, O2, . . . , and OM) in response to a single input stream received by device 310. Typically, each of the M output streams O1, O2, . . . , and OM, has a different format, and egress unit 311 is configured to perform operations (e.g., re-encryption) in addition to decryption and formatting to produce the output streams O1, O2, . . . , and OM. Interface circuitry 312 is configured to receive and operate upon (e.g., to reformat and/or amplify) each of the content streams O1, O2, . . . , OM it receives from egress unit 311, and to output M processed output streams PO1, PO2, . . . , and POM in response to the content streams it receives from unit 311. Circuitry 312 asserts the "m"th content stream "POm" in response the "m"th content stream ("Om") from unit 311. The "m"th content stream "POm" can be identical to the corresponding input stream ("Om") or can be a processed version of the corresponding input stream ("Om"). Typically, each of the output streams (PO1, PO2, . . . , and POM) has a different format (for example, one such output stream may be content in DVI format for transmission over a DVI link, another may be content in HDMI format content received over an HDMI link, and so on), and each of the output streams can be encrypted in accordance with a different content protection protocol. Thus, device 310 includes Egress circuitry configured to receive controlled content having a single format, to generate a decrypted (plaintext) version of the controlled content, and to perform additional operations on the plaintext content (e.g., formatting and optionally also re-encryption) to produce M output content streams. Each of the M output content streams can have a different format and can be encrypted in accordance with a different content protection protocol.

Because each of devices 300 and 310 is configured in accordance with the invention (so that each ingress unit thereof outputs, and each egress unit thereof receives, controlled content that has been encrypted in accordance with a single content protection protocol), these devices can be coupled together (with the output stream generated by device 300 asserted to the input of device 310) to generate a device pair capable of receiving content having any of N different formats, generating in response output content having any of M different formats, and protecting the content by never exposing a plaintext version of the content outside secure hardware (e.g., outside integrated ingress circuitry within one device or integrated egress circuitry within the other device). Each device of such a device pair can be implemented in a simple manner in the sense that it has no more than N-fold complexity (capability to generate an output having any of N formats in response to input having a single format, or to generate an output having a single format in response to input having any of N formats) or M-fold complexity (capability to generate an output having any of M formats in response to input having a single format, or to generate an output having a single format in response to input having any of M formats). In contrast, a conventional device capable of receiving content having any of N different formats and generating in response output content having any of M different formats, while protecting the protecting the content by never exposing a plaintext version of the content outside the device, would have greater complexity (i.e., (N*M)-fold complexity). Thus, assuming that each of N and M is greater than one and at least one of N and M is greater than two, the conventional device would be more complex than two of the inventive devices (considered together) having the same overall capability as the conventional device. The conventional device would be much more complex than such pair of the inventive devices (considered together) when each of N and M is much greater than two.

If a PDN is implemented in accordance with the present invention, a plaintext version of content to be protected in the PDN is never present at any externally visible (accessible) link, interface, or node of the PDN. The PDN is preferably also implemented so that no secret present in Ingress or Egress circuitry thereof, for use or transfer by the Ingress or Egress circuitry (e.g., key data used in Ingress circuitry for transcryption of content received by the PDN, or in Egress circuitry for decryption of controlled content), is accessible in unencrypted form to software or firmware within the PDN or to any entity external to the PDN. Otherwise, the PDN would be vulnerable to attack. In preferred embodiments, software running on any device of the PDN can never have access to a plaintext version of the content to be protected or to a plaintext version of key data employed to protect the content within the PDN.

Another aspect of the invention a content protection method and apparatus for performing encryption and decryption of content securely in hardware subsystems of a system (where the system includes both hardware and software), but uses software of the system as a harmless entity (a "man in the middle") that delivers messages (which can typically, encrypted messages) between the hardware subsystems but cannot understand the messages. The messages can be encrypted messages indicative of encrypted secrets (e.g., content keys for use by one or more of the hardware subsystems) but the software does not have the keys needed to decrypt the messages and is otherwise incapable of decrypting the messages. The software can be used to implement secure channels between secure hardware subsystems of the overall system, and these secure channels are immune to "man in the middle" attacks on the content to be protected. However, the system uses software as a man in the middle to deliver messages.

In a class of embodiments, the invention is a method for content protection in a PDN, including the steps of: transcrypting content that enters the PDN in ingress hardware of the PDN, thereby generating controlled content; and decrypting the controlled content in egress hardware of the PDN to generate decrypted content, such that neither the content in plaintext form, nor any secret used by at least one of the ingress hardware and the egress hardware to perform an authorized operation on either of the content and the controlled content, is accessible by software or firmware running on any element of the PDN, and such that the content is never present in plaintext form within the PDN except within secure hardware, whereby the controlled content can be transferred freely among elements of the PDN and stored within the PDN. In some such embodiments, the ingress hardware is an integrated circuit, the egress hardware is another integrated circuit, and the content is maintained within the PDN such that the content is never present in plaintext form within the PDN except within an integrated circuit.

In another class of embodiments, the invention is a content protection method including the steps of: transcrypting content that enters a PDN in ingress hardware of the PDN, thereby generating controlled content; decrypting the controlled content in egress hardware of the PDN to generate decrypted content; and asserting at least one of the decrypted content and a processed version of the decrypted content from the egress hardware to an entity (e.g., a device or system) external to the PDN, such that neither the decrypted content, nor any secret used by either of the ingress hardware and the egress hardware to perform an authorized operation on either of the content and the controlled content, is accessible by software or firmware (except that an encrypted version of such a secret could be accessible by software or firmware). Typically, the ingress hardware is an integrated circuit and the egress hardware is another integrated circuit.

Other aspects of the invention are methods for protecting content in a PDN (e.g., an open computing system), methods that can be implemented by any embodiment of the inventive PDN (or one or more of Lockbox circuitry, Ingress circuitry, and Egress circuitry), Lockbox circuitry (e.g., a Lockbox chip) for use in a PDN, Ingress circuitry (e.g., an Ingress chip) for use in a PDN, Egress circuitry (e.g., an Egress chip) for use in a PDN, cards (e.g., multimedia graphics cards) including Ingress, Lockbox, and Egress chips connected along a bus (e.g., a PCI bus) for use in a personal computer, and devices (e.g., set top boxes, video receivers, or video processors) configured for use in a PDN and including at least one of Lockbox circuitry, Ingress circuitry, and Egress circuitry.

Next, we set forth specific examples of exchanges that can be performed between Lockboxes (e.g., to establish secure channels between them) in accordance with the invention. Lockboxes can form links, channels, or connections between themselves (e.g., to mutually authenticate Nodes containing the Lockboxes, and to exchange data). Such links, channels, or connections ("relationships") are formed, changed, broken, and reformed as necessary to accomplish the desired goals.

The following notation will be used in some of the examples:

"PuKi[text]" indicates that the text is encrypted with the Public key of the initiator;

"PrKi[text]" indicates that the text is encrypted with the Private key of the initiator;

"PuKr[text]" indicates that the text is encrypted with the Public key of the respondent;

"PrKr[text]" indicates that the text is encrypted with the Private key of the respondent; and "SHA-1 [text]" indicates that a SHA-1 digest of the text is formed.

In some embodiments, message digests are generated using some variant of the CBC-MAC-AES mode (rather than the SHA-1 mode). In such embodiments, an AES encryptor which is used to encrypt messages (e.g., messages to be transmitted between Nodes) is also used to produce a "Message Authentication Code" (digest) of each message. In the expression "CBC-MAC-AES," "CBC" refers to "Cipher Block Chaining" which contemplates that the cipher output of one block is used as a key for the next block.

In some embodiments, Lockboxes perform an initial "mutual introduction" exchange when one Lockbox seeks to communicate with another Lockbox. Such an exchange can include a publication phase, followed by an initiation phase, and a response phase.

In such a publication phase, one Lockbox "publishes" some information about itself in a way that is accessible to other Lockboxes (within other Nodes of a PDN) that may need to use it. This information can include a "public" key of the Node that includes the Lockbox, and network address information (e.g., IP address, port, proxy information, and the like). The published information can be signed in the following way:

[PuKi+Information+PrKi[SHA-1[Information]]]

While none of the published information must remain secret, it preferably should not be promiscuously shared for privacy and security reasons. Therefore, in some embodiments, the "publication" of information specifically does not mean publication to the world at large, and instead it only means publication by a first Node to at least one other Node with which the first Node wishes to communicate. This could occur at the behest of a controlling user, who could push a button or turn a key or type a password as necessary to verify the operation.

After publication, one Node can initiate a relationship with another Node by sending an initiation message. The initiation message preferably contains the following information:

The public key of the initiator Node;

optionally, a certificate of the initiator Node (the certificate should be included unless the initiation phase is known to be a refresh of a prior relationship);

the initiator Node's capabilities;

the type of relationship desired (e.g., an information exchange, a "join network" relationship, a refresh prior relationship (e.g., to exchange new key data, update status, or update duration), or a cancellation of a prior relationship); and the requested duration (e.g., one-time (just for this exchange), temporary (for a brief interval or time period), or ongoing (until canceled));

In the initiation message, the public key and the certificate (if included) are not encrypted. The remainder of the data can be asymmetrically encrypted. Thus, the final form can be:

[PuKi+PrKi[PuKr[PuKi+Message]]]+
    Certificate(if included)]

Upon receiving an initiation message, the respondent Node decrypts the message and verifies the contents (by checking for the expected form). Once satisfied that the request has the proper form, the respondent analyzes the request and may return any of the following results:

yes (signifying that the connection is accepted;

no (the connection is refused); or retry (the connection cannot be accepted at this time for a temporary reason, e.g., because a certificate needs to be verified, or because a controlling user needs to be asked for guidance).

Such a "yes" response can include a session key to be used for subsequent communication, an interval code that limits the scope of the session key, and (optionally) a certificate of the respondent. The certificate should be included, unless the response is known to be a refresh of a prior relationship.

A "no" response can include an explanation code, and/or can indicate alternate status/capabilities under which the connection may be acceptable.

A "retry" response can include an explanation code, and/or a suggested interval code.

Each response (whether a "yes," "no," and "retry" response) can be signed and encrypted as follows:

[PuKr+PrKr[PuKi[PuKr+Message]]]+
    Certificate(if included)]

In another type of exchange between Lockboxes, a certificate is requested or at least one certificate is exchanged. Such an exchange could be implemented in hierarchical fashion (e.g., one Lockbox could request a certificate from a second Lockbox, and the second Lockbox could relay the request to a third Lockbox and relay back the third Lockbox's response). Exchanges of the certificate request/exchange type could be performed to simplify the method for implementing revocations in a PDN, e.g., by attaching expiration dates to all certificates (except an ultimate certificate, which could essentially be hard-coded into a chip). Such an ultimate certificate can be a public key of a certificate authority, and there can be more than one ultimate certificate).

Certificates used by Lockboxes can contain the following information:

a public key of the certified entity;

information identifying the device type of the certified entity;

an expiration date and time;

a public key of a certificate authority; and a digital signature for each certificate, produced by the certificate authority.

In another type of exchange between Lockboxes, information is requested or exchanged. Any Node that joins a PDN will typically need to learn more about the other members of the PDN, to facilitate the sharing of content and keys efficiently, and with high security. This process can be referred to as "bootstrapping", and takes place as each Node is introduced to the other Nodes of the PDN (as allowed), and each pair of Nodes is allowed to perform an authentication exchange. The information that defines a Node is preferably itself treated in the same way as is content (to be protected) within a PDN (e.g., this information can be encrypted in accordance with the same protocol used to transcrypt content, and can be protected by the same usage rules that apply to content).

Examples of specific types of information that can be requested by or exchanged between Lockboxes of a PDN include the following:

network tree structure information (e.g., the number and kind of Nodes in the PDN and their geographical locations);

node identification and address information (e.g., IP address, proxies, email and domains, device name and description, and geographical location);

user identification and personal information (e.g., information for implementing "parental" controls or other access controls, and/or personal viewing histories); and information for controlling user ID and address information (e.g., credit card numbers for use in paying for on-the-spot transactions).

It is contemplated that embodiments of the present invention can be configured to transcrypt content of one or more of many different types, and that the transcrypted content can have any of many different formats. While embodiments of the present invention can be configured to handle content having commonly used format(s), it is contemplated that (over time), such embodiments can be modified or supplemented to handle other formats of content and to implement more conversions between content formats, e.g., as it becomes necessary to protect new forms of content and/or to provide new types of intellectual property protection to content.

The expression that a first item "comprises" a second item is used herein (including in the claims) to denote that the first item is or includes the second item.

It should be understood that while some embodiments of the present invention are illustrated and described herein, the invention is defined by the claims and is not to be limited to the specific embodiments described and shown.

What is claimed is:

1. A device configured for use in a personal digital network, said device including:
    a lockbox circuitry; and
    an egress hardware configured to decrypt controlled content using key data obtained from the lockbox circuitry for decrypting the controlled content, thereby generating a plaintext version of the content, and to output at least one of the plaintext version of the content and a processed version of said plaintext version of the content, wherein
        the lockbox circuitry and the egress hardware are included in a secure subsystem of the personal digital network,
        the device is configured to include
            a rights data indicating that the device is authorized to decrypt the controlled content,
            a license certificate data indicating the device is licensed to become an authorized element of the personal digital network, and
            a marriage certificate data indicating that the device is an authorized element of the personal digital network,
        the lockbox circuitry is configured to perform an exchange with an external lockbox circuitry in which said lockbox circuitry obtains, from the external lockbox circuitry, the key data for decrypting the controlled content and the rights data indicating that the device is authorized to decrypt the controlled content, and
        the personal digital network is configured such that neither the decrypted controlled content, nor any key data for use in decryption of data used by the egress hardware, is present in plaintext form within the personal digital network except within the secure subsystem of the personal digital network.

2. The device of claim 1, further comprising ingress hardware to transmit controlled content to the egress hardware of the device.

3. The device of claim 1 wherein the controlled content includes digital video data, digital audio content data, or both.

4. The device of claim 1, wherein the controlled content is decrypted according to the HDCP (High-bandwidth Digital Content Protection) protocol.

5. The device of claim 1, wherein the lockbox circuitry and the external lockbox circuitry exchange the key data and the rights data over a secure communication channel.

6. The device of claim 1, wherein the egress hardware is configured to transfer at least one of the plaintext version of the content that enters the personal digital network and a processed version of said plaintext version of the content that enters the personal digital network to a display device.

7. The device of claim 1, wherein the content that enters the device is compressed, and further wherein the egress hardware is configured to decompress the compressed content.

8. The device of claim 1, wherein the egress hardware does not persistently store the key data obtained from the lockbox.

9. A device configured for use in a personal digital network, said device including:
    a lockbox circuitry; and
    an ingress hardware configured to transcrypt content that enters the device using key data obtained from the lockbox circuitry for transcrypting the content that enters the device, thereby generating controlled content, wherein
        the lockbox circuitry and the egress hardware are included in a secure subsystem of the personal digital network,
        the device is configured to include
            a rights data indicating that the device is authorized to transcrypt the content that enters the device,
            a license certificate data indicating the device is licensed to become an authorized element of the personal digital network, and
            a marriage certificate data indicating that the device is an authorized element of the personal digital network,
        the lockbox circuitry is configured to perform an exchange with an external lockbox circuitry in which said lockbox circuitry obtains, from the external lockbox circuitry, the key data for transcrypting the content that enters the device and the rights data indicating that the device is authorized to transcrypt the content that enters the device, and
        the personal digital network is configured such that neither the transcrypted controlled content, nor any key data for use in the transcryption of data used by the ingress hardware, is present in plaintext form within the personal digital network except within the secure subsystem of the personal digital network.

10. The device of claim 9 wherein the controlled content that enters the device includes digital video content data, digital audio content data, or both.

11. The device of claim 9, wherein the content that enters the device is high-definition digital video data.

12. The device of claim 11, wherein the content is transcrypted into data encrypted according to the HDCP (High-bandwidth Digital Content Protection) protocol.

13. The device of claim 9, wherein the content that enters the device is received from a source external to the device.

14. The device of claim 13, wherein the source external to the apparatus is the Internet.

15. The device of claim 13, wherein the source external to the device is a disk comprising digital video data.

16. The device of claim 9, wherein the lockbox circuitry and the external lockbox circuitry exchange the key data and the rights data over a secure communication channel.

* * * * *